US012659682B2

(12) United States Patent
Hartung

(10) Patent No.: US 12,659,682 B2
(45) Date of Patent: Jun. 16, 2026

(54) CALIBRATION USING MULTIPLE RECORDING DEVICES

(71) Applicant: Sonos, Inc., Santa Barbara, CA (US)

(72) Inventor: Klaus Hartung, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 207 days.

(21) Appl. No.: 18/463,762

(22) Filed: Sep. 8, 2023

(65) Prior Publication Data

US 2024/0080636 A1 Mar. 7, 2024

Related U.S. Application Data

(63) Continuation of application No. 17/816,238, filed on Jul. 29, 2022, now Pat. No. 11,800,306, which is a (Continued)

(51) Int. Cl.

| | |
|---|---|
| ***H04R 29/00*** | (2006.01) |
| ***H04R 27/00*** | (2006.01) |
| ***H04S 7/00*** | (2006.01) |

(52) U.S. Cl.

CPC .......... *H04R 29/007* (2013.01); *H04R 27/00* (2013.01); *H04S 7/301* (2013.01); *H04R 2227/003* (2013.01); *H04R 2227/005* (2013.01)

(58) Field of Classification Search

CPC .... H04R 29/001; H04R 29/007; H04R 27/00; H04R 2227/003; H04S 7/30; H04S 7/301

(Continued)

(56) References Cited

U.S. PATENT DOCUMENTS

| | | | |
|---|---|---|---|
| 4,306,113 | A | 12/1981 | Morton |
| 4,342,104 | A | 7/1982 | Jack |

(Continued)

FOREIGN PATENT DOCUMENTS

| | | | |
|---|---|---|---|
| CN | 1369188 | A | 9/2002 |
| CN | 1447624 | A | 10/2003 |

(Continued)

OTHER PUBLICATIONS

Final Office Action mailed on Dec. 2, 2019, issued in connection with U.S. Appl. No. 15/005,496, filed Jan. 25, 2016, 19 pages.

(Continued)

*Primary Examiner* — Disler Paul
(74) *Attorney, Agent, or Firm* — FORTEM IP LLP

(57) ABSTRACT

Example techniques may involve calibration with multiple recording devices. An implementation may include a mobile device receiving data indicating that a calibration sequence for multiple playback devices has been initiated in a venue. The mobile device displays a prompt to include the first mobile device in the calibration sequence for the multiple playback devices and a particular selectable control that, when selected, includes the first mobile device in the calibration sequence. During the calibration sequence, the mobile device records calibration audio as played back by the multiple playback devices and transmits data representing the recorded calibration audio to a computing device. The computing device determines a calibration for the multiple playback devices in the venue based on the data representing the calibration audio recorded by the first mobile device and data representing calibration audio recorded by second mobile devices while the multiple playback devices played back the calibration audio.

20 Claims, 15 Drawing Sheets

Related U.S. Application Data continuation of application No. 17/098,134, filed on Nov. 13, 2020, now Pat. No. 11,432,089, which is a continuation of application No. 16/556,297, filed on Aug. 30, 2019, now Pat. No. 10,841,719, which is a continuation of application No. 16/113,032, filed on Aug. 27, 2018, now Pat. No. 10,405,117, which is a continuation of application No. 15/650,386, filed on Jul. 14, 2017, now Pat. No. 10,063,983, which is a continuation of application No. 14/997,868, filed on Jan. 18, 2016, now Pat. No. 9,743,207.

(58) Field of Classification Search
USPC .................................................... 381/58–59
See application file for complete search history.

(56) References Cited

U.S. PATENT DOCUMENTS 4,504,704 A 3/1985 Ohyaba et al.
4,592,088 A 5/1986 Shimada
4,628,530 A 12/1986 Op De Beek et al.
4,631,749 A 12/1986 Rapaich
4,694,484 A 9/1987 Atkinson et al.
4,773,094 A 9/1988 Dolby
4,885,782 A 12/1989 Eberbach
4,995,778 A 2/1991 Bruessel
5,218,710 A 6/1993 Yamaki et al.
5,255,326 A 10/1993 Stevenson
5,323,257 A 6/1994 Abe et al.
5,386,478 A 1/1995 Plunkett
5,440,644 A 8/1995 Farinelli et al.
5,553,147 A 9/1996 Pineau
5,581,621 A 12/1996 Koyama et al.
5,586,172 A 12/1996 Sakurai et al.
5,717,768 A 2/1998 Laroche
5,754,774 A 5/1998 Bittinger et al.
5,757,927 A 5/1998 Gerzon et al.
5,761,320 A 6/1998 Farinelli et al.
5,857,172 A 1/1999 Rozak
5,910,991 A 6/1999 Farrar
5,923,902 A 7/1999 Inagaki
5,939,656 A 8/1999 Suda
6,018,376 A 1/2000 Nakatani
6,032,202 A 2/2000 Lea et al.
6,072,879 A 6/2000 Ouchi et al.
6,111,957 A 8/2000 Thomasson
6,256,554 B1 7/2001 DiLorenzo
6,363,155 B1 3/2002 Horbach
6,404,811 B1 6/2002 Cvetko et al.
6,469,633 B1 10/2002 Wachter
6,522,886 B1 2/2003 Youngs et al.
6,548,967 B1 4/2003 Dowling et al.
6,573,067 B1 6/2003 Dib-Hajj et al.
6,611,537 B1 8/2003 Edens et al.
6,631,179 B1 10/2003 Sifuentes
6,631,410 B1 10/2003 Kowalski et al.
6,639,989 B1 10/2003 Zacharov et al.
6,643,744 B1 11/2003 Cheng
6,704,421 B1 3/2004 Kitamura
6,721,428 B1 4/2004 Allred et al.
6,731,760 B2 5/2004 Pedersen
6,757,517 B2 6/2004 Chang
6,760,451 B1 7/2004 Craven et al.
6,766,025 B1 7/2004 Levy et al.
6,778,869 B2 8/2004 Champion
6,798,889 B1 9/2004 Dicker et al.
6,862,440 B2 3/2005 Sampath
6,916,980 B2 7/2005 Ishida et al.
6,931,134 B1 8/2005 Waller, Jr. et al.
6,985,694 B1 1/2006 De Bonet et al.
6,990,211 B2 1/2006 Parker
7,031,476 B1 4/2006 Chrisop et al.
7,039,212 B2 5/2006 Poling et al.
7,058,186 B2 6/2006 Tanaka
7,072,477 B1 7/2006 Kincaid
7,092,535 B1 8/2006 Pedersen et al.
7,092,537 B1 8/2006 Allred et al.
7,103,187 B1 9/2006 Neuman
7,130,608 B2 10/2006 Hollstrom et al.
7,130,616 B2 10/2006 Janik
7,143,939 B2 12/2006 Henzerling
7,187,947 B1 3/2007 White et al.
7,236,773 B2 6/2007 Thomas
7,289,637 B2 10/2007 Montag et al.
7,295,548 B2 11/2007 Blank et al.
7,312,785 B2 12/2007 Tsuk et al.
D559,197 S 1/2008 Lim et al.
7,391,791 B2 6/2008 Balassanian et al.
D575,801 S 8/2008 Kusano et al.
D582,429 S 12/2008 Kusano et al.
7,477,751 B2 1/2009 Lyon et al.
7,483,538 B2 1/2009 McCarty et al.
7,483,540 B2 1/2009 Rabinowitz et al.
7,489,784 B2 2/2009 Yoshino
7,490,044 B2 2/2009 Kulkarni
7,492,909 B2 2/2009 Carter et al.
7,496,205 B2 * 2/2009 Kuhnel .................. H04R 25/70
381/60
7,519,188 B2 4/2009 Berardi et al.
7,529,377 B2 5/2009 Nackvi et al.
7,571,014 B1 8/2009 Lambourne et al.
7,590,772 B2 9/2009 Marriott et al.
7,630,500 B1 12/2009 Beckman et al.
7,630,501 B2 12/2009 Blank et al.
7,643,894 B2 1/2010 Braithwaite et al.
7,657,910 B1 2/2010 McAulay et al.
7,664,276 B2 2/2010 McKee
7,676,044 B2 3/2010 Sasaki et al.
7,689,305 B2 3/2010 Kreifeldt et al.
7,697,701 B2 4/2010 Pedersen et al.
7,720,237 B2 5/2010 Bharitkar et al.
7,742,740 B2 6/2010 Goldberg et al.
7,769,183 B2 8/2010 Bharitkar et al.
7,792,311 B1 9/2010 Holmgren et al.
7,796,068 B2 9/2010 Raz et al.
7,835,689 B2 11/2010 Goldberg et al.
7,853,341 B2 12/2010 McCarty et al.
7,876,903 B2 1/2011 Sauk
7,925,203 B2 4/2011 Lane et al.
7,949,140 B2 5/2011 Kino
7,949,707 B2 5/2011 McDowall et al.
7,961,893 B2 6/2011 Kino
7,970,922 B2 6/2011 Svendsen
7,987,294 B2 7/2011 Bryce et al.
8,005,228 B2 8/2011 Bharitkar et al.
8,014,423 B2 9/2011 Thaler et al.
8,042,961 B2 10/2011 Massara et al.
8,045,721 B2 10/2011 Burgan et al.
8,045,952 B2 10/2011 Qureshey et al.
8,050,652 B2 11/2011 Qureshey et al.
8,063,698 B2 11/2011 Howard
8,074,253 B1 12/2011 Nathan
8,103,009 B2 1/2012 McCarty et al.
8,116,476 B2 2/2012 Inohara
8,126,156 B2 2/2012 Corbett et al.
8,126,172 B2 2/2012 Horbach et al.
8,131,390 B2 3/2012 Braithwaite et al.
8,139,774 B2 3/2012 Berardi et al.
8,144,883 B2 3/2012 Pdersen et al.
8,160,276 B2 4/2012 Liao et al.
8,160,281 B2 4/2012 Kim et al.
8,170,260 B2 5/2012 Reining et al.
8,175,292 B2 5/2012 Aylward et al.
8,175,297 B1 5/2012 Ho et al.
8,194,874 B2 6/2012 Starobin et al.
8,229,125 B2 7/2012 Short
8,233,632 B1 7/2012 MacDonald et al.
8,234,395 B2 7/2012 Millington
8,238,547 B2 8/2012 Ohki et al.
8,238,578 B2 8/2012 Aylward
8,239,206 B1 8/2012 Lebeau et al.
8,243,961 B1 8/2012 Morrill
8,264,408 B2 9/2012 Kainulainen et al.

(56) References Cited

U.S. PATENT DOCUMENTS

| | | | |
|---|---|---|---|
| 8,265,310 | B2 | 9/2012 | Berardi et al. |
| 8,270,620 | B2 | 9/2012 | Christensen |
| 8,279,709 | B2 | 10/2012 | Choisel et al. |
| 8,281,001 | B2 | 10/2012 | Busam et al. |
| 8,290,185 | B2 | 10/2012 | Kim |
| 8,291,349 | B1 | 10/2012 | Park et al. |
| 8,300,845 | B2 | 10/2012 | Zurek et al. |
| 8,306,235 | B2 | 11/2012 | Mahowald |
| 8,325,909 | B2 | 12/2012 | Tashev et al. |
| 8,325,931 | B2 | 12/2012 | Howard et al. |
| 8,325,935 | B2 | 12/2012 | Rutschman |
| 8,325,944 | B1 | 12/2012 | Duwenhorst et al. |
| 8,331,585 | B2 | 12/2012 | Hagen et al. |
| 8,332,414 | B2 | 12/2012 | Nguyen et al. |
| 8,340,975 | B1 | 12/2012 | Rosenberger |
| 8,379,876 | B2 | 2/2013 | Zhang |
| 8,385,557 | B2 | 2/2013 | Tashev et al. |
| 8,391,501 | B2 | 3/2013 | Khawand et al. |
| 8,392,505 | B2 | 3/2013 | Haughay et al. |
| 8,401,202 | B2 | 3/2013 | Brooking |
| 8,423,893 | B2 | 4/2013 | Ramsay et al. |
| 8,433,076 | B2 | 4/2013 | Zurek et al. |
| 8,452,020 | B2 | 5/2013 | Gregg et al. |
| 8,463,184 | B2 | 6/2013 | Dua |
| 8,483,853 | B1 | 7/2013 | Lambourne |
| 8,488,799 | B2 | 7/2013 | Goldstein et al. |
| 8,503,669 | B2 | 8/2013 | Mao |
| 8,527,876 | B2 | 9/2013 | Wood et al. |
| 8,577,045 | B2 | 11/2013 | Gibbs |
| 8,577,048 | B2 | 11/2013 | Chaikin et al. |
| 8,600,075 | B2 | 12/2013 | Lim |
| 8,620,006 | B2 | 12/2013 | Berardi et al. |
| 8,682,002 | B2 | 3/2014 | Wihardja et al. |
| 8,731,206 | B1 | 5/2014 | Park |
| 8,755,538 | B2 | 6/2014 | Kwon |
| 8,762,156 | B2 | 6/2014 | Chen |
| 8,798,280 | B2 | 8/2014 | Goldberg et al. |
| 8,819,554 | B2 | 8/2014 | Basso et al. |
| 8,831,244 | B2 | 9/2014 | Apfel |
| 8,855,319 | B2 | 10/2014 | Liu et al. |
| 8,862,273 | B2 | 10/2014 | Karr |
| 8,879,761 | B2 | 11/2014 | Johnson et al. |
| 8,903,526 | B2 | 12/2014 | Beckhardt et al. |
| 8,914,559 | B2 | 12/2014 | Kalayjian et al. |
| 8,930,005 | B2 | 1/2015 | Reimann |
| 8,934,647 | B2 | 1/2015 | Joyce et al. |
| 8,934,655 | B2 | 1/2015 | Breen et al. |
| 8,942,252 | B2 | 1/2015 | Balassanian et al. |
| 8,948,426 | B2 | 2/2015 | Thomasson et al. |
| 8,965,033 | B2 | 2/2015 | Wiggins |
| 8,965,546 | B2 | 2/2015 | Visser et al. |
| 8,977,974 | B2 | 3/2015 | Kraut |
| 8,984,442 | B2 | 3/2015 | Pirnack et al. |
| 8,989,406 | B2 | 3/2015 | Wong et al. |
| 8,995,687 | B2 | 3/2015 | Marino, Jr. et al. |
| 8,995,688 | B1 | 3/2015 | Chemtob et al. |
| 8,996,370 | B2 | 3/2015 | Ansell |
| 9,002,024 | B2 | 4/2015 | Nakadai et al. |
| 9,014,380 | B2 | 4/2015 | Gautama et al. |
| 9,020,153 | B2 | 4/2015 | Britt, Jr. |
| 9,021,153 | B2 | 4/2015 | Lu |
| 9,042,556 | B2 | 5/2015 | Kallai et al. |
| 9,047,857 | B1 | 6/2015 | Barton |
| 9,065,929 | B2 | 6/2015 | Chen et al. |
| 9,084,058 | B2 | 7/2015 | Reilly et al. |
| 9,088,336 | B2 | 7/2015 | Mani et al. |
| 9,094,768 | B2 | 7/2015 | LaBosco |
| 9,100,766 | B2 | 8/2015 | Soulodre et al. |
| 9,106,192 | B2 | 8/2015 | Sheen et al. |
| 9,148,742 | B1 | 9/2015 | Koulomzin et al. |
| 9,179,233 | B2 | 11/2015 | Kang |
| 9,215,545 | B2 | 12/2015 | Dublin et al. |
| 9,219,460 | B2 | 12/2015 | Bush |
| 9,231,545 | B2 | 1/2016 | Agustin et al. |
| 9,247,365 | B1 | 1/2016 | Ellis et al. |
| 9,264,839 | B2 | 2/2016 | Oishi et al. |
| 9,286,384 | B2 | 3/2016 | Kuper et al. |
| 9,288,596 | B2 | 3/2016 | Gossain et al. |
| 9,288,597 | B2 | 3/2016 | Carlsson et al. |
| 9,300,266 | B2 | 3/2016 | Grokop |
| 9,307,340 | B2 | 4/2016 | Seefeldt |
| 9,319,816 | B1 | 4/2016 | Narayanan |
| 9,332,371 | B2 | 5/2016 | De Bruijn |
| 9,348,824 | B2 | 5/2016 | Coburn, IV |
| 9,355,555 | B2 | 5/2016 | Reichert et al. |
| 9,398,392 | B2 * | 7/2016 | Ridihalgh ............... H04S 7/303 |
| 9,401,058 | B2 | 7/2016 | De La Fuente et al. |
| 9,431,021 | B1 | 8/2016 | Scalise et al. |
| 9,431,029 | B2 | 8/2016 | Yook et al. |
| 9,438,996 | B2 * | 9/2016 | Maher ...................... H04R 3/04 |
| 9,451,377 | B2 | 9/2016 | Massey et al. |
| 9,456,279 | B1 | 9/2016 | Murdoch |
| 9,462,399 | B2 | 10/2016 | Bharitkar et al. |
| 9,467,779 | B2 | 10/2016 | Iyengar et al. |
| 9,472,201 | B1 | 10/2016 | Sleator |
| 9,473,207 | B2 | 10/2016 | McCormack et al. |
| 9,489,948 | B1 | 11/2016 | Chu et al. |
| 9,491,499 | B2 | 11/2016 | Wagenaar et al. |
| 9,516,444 | B2 * | 12/2016 | Riggi ...................... H04W 4/80 |
| 9,524,098 | B2 | 12/2016 | Griffiths et al. |
| 9,538,305 | B2 | 1/2017 | Lehnert et al. |
| 9,538,308 | B2 | 1/2017 | Isaac et al. |
| 9,544,701 | B1 | 1/2017 | Rappoport |
| 9,560,449 | B2 | 1/2017 | Carlsson et al. |
| 9,560,460 | B2 | 1/2017 | Chaikin et al. |
| 9,569,073 | B2 | 2/2017 | Tan |
| 9,575,615 | B1 | 2/2017 | Nicholls et al. |
| 9,584,915 | B2 | 2/2017 | Fullam et al. |
| 9,596,531 | B1 | 3/2017 | Zhang |
| 9,609,383 | B1 | 3/2017 | Hirst |
| 9,615,171 | B1 | 4/2017 | O'Neill et al. |
| 9,628,911 | B2 | 4/2017 | Rabinowitz et al. |
| 9,632,748 | B2 | 4/2017 | Faaborg |
| 9,648,422 | B2 | 5/2017 | Sheen et al. |
| 9,654,073 | B2 | 5/2017 | Apodaca |
| 9,654,545 | B2 | 5/2017 | Gossain |
| 9,672,812 | B1 | 6/2017 | Watanabe et al. |
| 9,674,625 | B2 | 6/2017 | Armstrong-Muntner et al. |
| 9,678,708 | B2 | 6/2017 | Bierbower et al. |
| 9,686,625 | B2 | 6/2017 | Patel |
| 9,689,960 | B1 | 6/2017 | Barton et al. |
| 9,690,271 | B2 | 6/2017 | Sheen et al. |
| 9,690,539 | B2 | 6/2017 | Sheen et al. |
| 9,691,384 | B1 | 6/2017 | Wang et al. |
| 9,693,165 | B2 | 6/2017 | Downing et al. |
| 9,699,582 | B2 | 7/2017 | Sheerin et al. |
| 9,706,319 | B2 | 7/2017 | Peters et al. |
| 9,706,323 | B2 | 7/2017 | Sheen et al. |
| 9,715,365 | B2 | 7/2017 | Kusano et al. |
| 9,723,420 | B2 | 8/2017 | Family et al. |
| 9,729,984 | B2 | 8/2017 | Tan et al. |
| 9,736,584 | B2 | 8/2017 | Sheen et al. |
| 9,743,207 | B1 | 8/2017 | Hartung |
| 9,743,208 | B2 | 8/2017 | Oishi et al. |
| 9,749,763 | B2 | 8/2017 | Sheen |
| 9,763,018 | B1 | 9/2017 | McPherson et al. |
| 9,769,580 | B2 | 9/2017 | Rabinowitz et al. |
| 9,781,532 | B2 | 10/2017 | Sheen |
| 9,788,113 | B2 | 10/2017 | Wilberding et al. |
| 9,794,722 | B2 | 10/2017 | Petrov |
| 9,807,536 | B2 | 10/2017 | Liu et al. |
| 9,810,784 | B2 | 11/2017 | Altman et al. |
| 9,817,549 | B2 | 11/2017 | Chandrasekaran |
| 9,842,584 | B1 | 12/2017 | Hart et al. |
| 9,860,662 | B2 | 1/2018 | Jarvis et al. |
| 9,864,574 | B2 | 1/2018 | Hartung et al. |
| 9,866,964 | B1 * | 1/2018 | Haskin ................... H04R 27/00 |
| 9,898,250 | B1 | 2/2018 | Williams et al. |
| 9,900,723 | B1 | 2/2018 | Choisel et al. |
| 9,910,634 | B2 | 3/2018 | Sheen et al. |
| 9,913,056 | B2 | 3/2018 | Master et al. |
| 9,916,126 | B2 | 3/2018 | Lang |
| 9,916,839 | B1 | 3/2018 | Scalise et al. |
| 9,952,825 | B2 | 4/2018 | Sheen |

(56) References Cited

U.S. PATENT DOCUMENTS 9,984,703 B2 5/2018 Ur et al.
9,997,151 B1 6/2018 Ayrapetian et al.
10,002,259 B1 6/2018 Mai
10,007,481 B2 6/2018 Daly et al.
10,028,069 B1 7/2018 Lang
10,045,142 B2 8/2018 McPherson et al.
10,074,371 B1 9/2018 Wang et al.
10,097,919 B2 10/2018 Jarvis et al.
10,111,002 B1 10/2018 Poulad
10,114,605 B2 10/2018 Gossain et al.
10,125,006 B2 11/2018 Jacobsen et al.
10,127,006 B2 11/2018 Sheen
10,152,969 B2 12/2018 Reilly et al.
10,154,359 B2 12/2018 Sheen
10,200,800 B2 2/2019 Thomson
10,206,052 B2 2/2019 Perianu
10,248,376 B2 4/2019 Keyser-Allen et al.
10,249,205 B2 4/2019 Hammersley et al.
10,275,213 B2 4/2019 Daly
10,299,054 B2 5/2019 McPherson et al.
10,299,061 B1 5/2019 Sheen
10,304,440 B1 5/2019 Panchapagesan et al.
10,402,154 B2 9/2019 Hartung et al.
10,440,492 B2 10/2019 Crockett
10,555,077 B2 2/2020 Jarvis et al.
10,567,900 B2 2/2020 Tanaka et al.
10,567,901 B2 2/2020 Po et al.
10,586,534 B1 3/2020 Argyropoulos et al.
10,720,173 B2 7/2020 Freeman et al.
10,791,407 B2 9/2020 Oishi et al.
10,811,015 B2 10/2020 Smith et al.
10,817,249 B2 10/2020 Tanaka et al.
10,847,137 B1 11/2020 Mandal et al.
10,853,022 B2 12/2020 Wilberding
10,853,027 B2 12/2020 Shih et al.
10,863,295 B2 12/2020 Bush
10,904,691 B2 1/2021 Tu et al.
10,986,460 B2 4/2021 Reilly et al.
11,062,705 B2 7/2021 Watanabe et al.
11,184,704 B2 11/2021 Jarvis et al.
11,184,726 B2 11/2021 Hartung et al.
11,197,117 B2 12/2021 Reilly et al.
11,295,754 B2 4/2022 Eubank et al.
11,356,520 B2 * 6/2022 Starobin ................ H04R 27/00
11,513,216 B1 11/2022 Kamath Koteshwara et al.
11,540,073 B2 12/2022 Oishi et al.
11,696,074 B2 7/2023 Woo et al.
11,696,081 B2 7/2023 Bush
11,700,139 B2 7/2023 Drake
11,727,936 B2 8/2023 Smith et al.
11,736,877 B2 8/2023 Jarvis et al.
11,803,350 B2 10/2023 Sheen
11,816,393 B2 11/2023 Vega-Zayas et al.
11,825,290 B2 11/2023 Reilly et al.
11,832,068 B2 11/2023 Jarvis et al.
11,849,299 B2 12/2023 Reilly et al.
11,889,276 B2 1/2024 McPherson et al.
2001/0038702 A1 11/2001 Lavoie et al.
2001/0042107 A1 11/2001 Palm
2001/0043592 A1 11/2001 Jimenez et al.
2001/0053228 A1 12/2001 Jones
2002/0022453 A1 2/2002 Balog et al.
2002/0026442 A1 2/2002 Lipscomb et al.
2002/0054685 A1 5/2002 Avendano et al.
2002/0055950 A1 5/2002 Witteman
2002/0072816 A1 6/2002 Shdema et al.
2002/0078161 A1 6/2002 Cheng
2002/0089529 A1 7/2002 Robbin
2002/0124097 A1 9/2002 Isely et al.
2002/0126852 A1 9/2002 Kashani
2002/0136414 A1 9/2002 Jordan et al.
2002/0146136 A1 10/2002 Carter, Jr.
2002/0169583 A1 11/2002 Gutta et al.
2003/0002689 A1 1/2003 Folio
2003/0031334 A1 2/2003 Layton et al.
2003/0081115 A1 5/2003 Curry et al.
2003/0108212 A1 6/2003 Yun
2003/0157951 A1 8/2003 Hasty, Jr.
2003/0159569 A1 8/2003 Ohta
2003/0161479 A1 8/2003 Yang et al.
2003/0161492 A1 8/2003 Miller et al.
2003/0179891 A1 9/2003 Rabinowitz et al.
2003/0235311 A1 12/2003 Grancea et al.
2004/0024478 A1 2/2004 Hans et al.
2004/0071294 A1 4/2004 Halgas, Jr. et al.
2004/0114771 A1 6/2004 Vaughan et al.
2004/0131338 A1 7/2004 Asada et al.
2004/0153321 A1 8/2004 Chung et al.
2004/0237750 A1 12/2004 Smith et al.
2005/0021470 A1 1/2005 Martin et al.
2005/0031143 A1 2/2005 Devantier et al.
2005/0063554 A1 3/2005 Devantier et al.
2005/0129254 A1 6/2005 Connor et al.
2005/0131558 A1 6/2005 Braithwaite et al.
2005/0147261 A1 7/2005 Yeh
2005/0157885 A1 7/2005 Olney et al.
2005/0276425 A1 12/2005 Forrester et al.
2006/0008256 A1 1/2006 Khedouri et al.
2006/0013197 A1 1/2006 Anderson
2006/0026521 A1 2/2006 Hotelling et al.
2006/0032357 A1 2/2006 Roovers et al.
2006/0093998 A1 5/2006 Vertegaal et al.
2006/0104454 A1 5/2006 Guitarte Perez et al.
2006/0147057 A1 7/2006 Aggarwal et al.
2006/0153391 A1 7/2006 Hooley et al.
2006/0161964 A1 7/2006 Chung
2006/0195480 A1 8/2006 Spiegelman et al.
2006/0209197 A1 9/2006 Vanhatalo
2006/0225097 A1 10/2006 Lawrence-Apfelbaum
2006/0238877 A1 10/2006 Ashkenazi et al.
2007/0003067 A1 1/2007 Gierl et al.
2007/0022207 A1 1/2007 Millington
2007/0025559 A1 2/2007 Mihelich et al.
2007/0032895 A1 2/2007 Nackvi et al.
2007/0038999 A1 2/2007 Millington
2007/0086597 A1 4/2007 Kino
2007/0087686 A1 4/2007 Holm et al.
2007/0116254 A1 5/2007 Looney et al.
2007/0121955 A1 5/2007 Johnston et al.
2007/0135061 A1 6/2007 Buck et al.
2007/0142944 A1 6/2007 Goldberg et al.
2007/0217619 A1 9/2007 Hall et al.
2008/0002839 A1 1/2008 Eng
2008/0014989 A1 1/2008 Sandegard et al.
2008/0031475 A1 2/2008 Goldstein
2008/0045140 A1 2/2008 Korhonen
2008/0065247 A1 3/2008 Igoe
2008/0069378 A1 3/2008 Rabinowitz et al.
2008/0077261 A1 3/2008 Baudino et al.
2008/0098027 A1 4/2008 Aarts
2008/0107128 A1 5/2008 Lo et al.
2008/0136623 A1 6/2008 Calvarese
2008/0144864 A1 6/2008 Huon et al.
2008/0146289 A1 6/2008 Korneluk et al.
2008/0147461 A1 6/2008 Lee et al.
2008/0160977 A1 7/2008 Ahmaniemi et al.
2008/0175411 A1 7/2008 Greve
2008/0192946 A1 8/2008 Faller
2008/0214160 A1 9/2008 Jonsson
2008/0232603 A1 9/2008 Soulodre
2008/0266385 A1 10/2008 Smith et al.
2008/0268823 A1 10/2008 Shalev et al.
2008/0281523 A1 11/2008 Dahl et al.
2008/0316863 A1 12/2008 Walley
2009/0003613 A1 1/2009 Christensen
2009/0013255 A1 1/2009 Yuschik et al.
2009/0024662 A1 1/2009 Park et al.
2009/0047993 A1 2/2009 Vasa
2009/0063274 A1 3/2009 Dublin, III et al.
2009/0089054 A1 4/2009 Wang et al.
2009/0110218 A1 4/2009 Swain
2009/0138507 A1 5/2009 Burckart et al.
2009/0147134 A1 6/2009 Iwamatsu
2009/0169025 A1 7/2009 Chen

(56) References Cited

U.S. PATENT DOCUMENTS

2009/0175216 A1 7/2009 Bozarth et al.
2009/0175476 A1 7/2009 Bottum
2009/0175510 A1 7/2009 Grim, III et al.
2009/0180632 A1 7/2009 Goldberg et al.
2009/0196428 A1 8/2009 Kim
2009/0202082 A1 8/2009 Bharitkar et al.
2009/0204410 A1 8/2009 Mozer et al.
2009/0214048 A1 8/2009 Stokes, III et al.
2009/0232481 A1 9/2009 Baalbergen et al.
2009/0235236 A1 9/2009 Nickerson et al.
2009/0252481 A1 10/2009 Ekstrand
2009/0285404 A1 11/2009 Hsu et al.
2009/0304194 A1 12/2009 Eggleston et al.
2009/0304205 A1 12/2009 Hardacker et al.
2009/0316923 A1 12/2009 Tashev et al.
2009/0326949 A1 12/2009 Douthitt et al.
2010/0013550 A1 1/2010 Tanaka
2010/0095332 A1 4/2010 Gran et al.
2010/0104114 A1 4/2010 Chapman
2010/0114944 A1 5/2010 Adler et al.
2010/0128902 A1 5/2010 Liu et al.
2010/0131642 A1 5/2010 Chalikouras et al.
2010/0135501 A1 6/2010 Corbett et al.
2010/0136952 A1 6/2010 Rofougaran
2010/0142735 A1 6/2010 Yoon et al.
2010/0146445 A1 6/2010 Kraut
2010/0162117 A1 6/2010 Basso et al.
2010/0189203 A1 7/2010 Wilhelmsson et al.
2010/0195846 A1 8/2010 Yokoyama
2010/0260348 A1 10/2010 Bhow et al.
2010/0272270 A1 10/2010 Chaikin et al.
2010/0290643 A1 11/2010 Mihelich et al.
2010/0296659 A1 11/2010 Tanaka
2010/0299639 A1 11/2010 Ramsay et al.
2010/0303248 A1 12/2010 Tawada
2010/0303250 A1 12/2010 Goldberg et al.
2010/0317332 A1 12/2010 Bathiche et al.
2010/0323793 A1 12/2010 Andall
2010/0329472 A1 12/2010 Nakadai et al.
2011/0002471 A1 1/2011 Wihardja et al.
2011/0007904 A1 1/2011 Tomoda et al.
2011/0007905 A1 1/2011 Sato et al.
2011/0019833 A1 1/2011 Kuech et al.
2011/0029111 A1 2/2011 Sabin et al.
2011/0044461 A1 2/2011 Kuech et al.
2011/0064232 A1* 3/2011 Ruwisch ............. H04M 1/6075 381/59
2011/0087842 A1 4/2011 Lu et al.
2011/0091055 A1 4/2011 Leblanc
2011/0135103 A1 6/2011 Sun et al.
2011/0150228 A1 6/2011 Yoon et al.
2011/0150230 A1 6/2011 Tanaka
2011/0150247 A1 6/2011 Oliveras
2011/0157168 A1 6/2011 Bennett et al.
2011/0164188 A1 7/2011 Karaoguz et al.
2011/0170710 A1 7/2011 Son
2011/0176687 A1 7/2011 Birkenes
2011/0216093 A1 9/2011 Griffin
2011/0216924 A1 9/2011 Berardi et al.
2011/0234480 A1 9/2011 Fino et al.
2011/0235808 A1 9/2011 Kon
2011/0267985 A1 11/2011 Wilkinson et al.
2011/0268281 A1 11/2011 Florencio et al.
2011/0286601 A1 11/2011 Fukui et al.
2011/0293123 A1 12/2011 Neumeyer et al.
2012/0027218 A1 2/2012 Every et al.
2012/0032928 A1 2/2012 Alberth et al.
2012/0051558 A1 3/2012 Kim et al.
2012/0057724 A1 3/2012 Rabinowitz et al.
2012/0063615 A1 3/2012 Crockett et al.
2012/0076308 A1 3/2012 Kuech et al.
2012/0093320 A1 4/2012 Flaks et al.
2012/0114152 A1 5/2012 Nguyen et al.
2012/0127831 A1 5/2012 Gicklhorn et al.
2012/0140936 A1 6/2012 Bonnick et al.
2012/0148075 A1 6/2012 Goh et al.
2012/0183156 A1 7/2012 Schlessinger et al.
2012/0184335 A1 7/2012 Kim et al.
2012/0213391 A1 8/2012 Usami et al.
2012/0215530 A1 8/2012 Harsch
2012/0224457 A1 9/2012 Kim et al.
2012/0237037 A1 9/2012 Ninan et al.
2012/0237047 A1 9/2012 Neal et al.
2012/0243697 A1 9/2012 Frye et al.
2012/0254220 A1 10/2012 Verthein et al.
2012/0263325 A1 10/2012 Freeman et al.
2012/0268145 A1 10/2012 Chandra et al.
2012/0269356 A1 10/2012 Sheerin et al.
2012/0270653 A1 10/2012 Kareemi et al.
2012/0275613 A1 11/2012 Soulodre
2012/0283593 A1 11/2012 Searchfield et al.
2012/0288124 A1 11/2012 Fejzo et al.
2013/0003981 A1 1/2013 Lane
2013/0010970 A1 1/2013 Hegarty et al.
2013/0019193 A1 1/2013 Rhee et al.
2013/0024880 A1 1/2013 Moloney-Egnatios et al.
2013/0028443 A1 1/2013 Pance et al.
2013/0051572 A1 2/2013 Goh et al.
2013/0066453 A1 3/2013 Seefeldt
2013/0080167 A1 3/2013 Mozer
2013/0080171 A1 3/2013 Mozer et al.
2013/0083948 A1 4/2013 Schmidt
2013/0108055 A1 5/2013 Hanna et al.
2013/0111347 A1 5/2013 Reilly et al.
2013/0129100 A1 5/2013 Sorensen
2013/0129102 A1 5/2013 Li et al.
2013/0129122 A1 5/2013 Johnson et al.
2013/0166227 A1 6/2013 Hermann et al.
2013/0170363 A1 7/2013 Millington et al.
2013/0170647 A1 7/2013 Reilly et al.
2013/0173794 A1 7/2013 Agerbak et al.
2013/0177188 A1* 7/2013 Apfel .................. A61B 5/0022 381/315
2013/0179535 A1 7/2013 Baalu et al.
2013/0202131 A1 8/2013 Kemmochi et al.
2013/0211843 A1 8/2013 Clarkson
2013/0216071 A1 8/2013 Maher et al.
2013/0223642 A1 8/2013 Warren et al.
2013/0230175 A1 9/2013 Bech et al.
2013/0259254 A1 10/2013 Xiang et al.
2013/0279706 A1 10/2013 Marti et al.
2013/0283169 A1 10/2013 Van Wie
2013/0289994 A1 10/2013 Newman et al.
2013/0305152 A1 11/2013 Griffiths et al.
2013/0308794 A1 11/2013 Jochim et al.
2013/0315405 A1 11/2013 Kanishima et al.
2013/0329896 A1 12/2013 Krishnaswamy et al.
2013/0331970 A1 12/2013 Beckhardt et al.
2013/0336499 A1 12/2013 Beckhardt et al.
2013/0339028 A1 12/2013 Rosner et al.
2013/0346559 A1 12/2013 Van Erven et al.
2014/0003611 A1 1/2014 Mohammad et al.
2014/0003622 A1 1/2014 Ikizyan et al.
2014/0003623 A1 1/2014 Lang
2014/0003625 A1 1/2014 Sheen et al.
2014/0003626 A1 1/2014 Holman et al.
2014/0003635 A1 1/2014 Mohammad et al.
2014/0006587 A1 1/2014 Kusano
2014/0016784 A1 1/2014 Sen et al.
2014/0016786 A1 1/2014 Sen
2014/0016802 A1 1/2014 Sen
2014/0023196 A1 1/2014 Xiang et al.
2014/0029201 A1 1/2014 Yang et al.
2014/0032709 A1 1/2014 Saussy et al.
2014/0037097 A1 2/2014 Labosco
2014/0037107 A1 2/2014 Marino, Jr. et al.
2014/0052770 A1 2/2014 Gran et al.
2014/0064501 A1 3/2014 Olsen et al.
2014/0075308 A1 3/2014 Sanders et al.
2014/0079242 A1 3/2014 Nguyen et al.
2014/0084014 A1 3/2014 Sim et al.
2014/0086423 A1 3/2014 Domingo et al.
2014/0093093 A1 4/2014 Dusan et al.
2014/0094151 A1 4/2014 Klappert et al.

(56) References Cited

U.S. PATENT DOCUMENTS

| | | | |
|---|---|---|---|
| 2014/0112481 | A1 | 4/2014 | Li et al. |
| 2014/0112502 | A1 | 4/2014 | Lee |
| 2014/0119551 | A1 | 5/2014 | Bharitkar et al. |
| 2014/0122075 | A1 | 5/2014 | Bak et al. |
| 2014/0126730 | A1 | 5/2014 | Crawley et al. |
| 2014/0154993 | A1 | 6/2014 | Bates et al. |
| 2014/0161265 | A1 | 6/2014 | Chaikin et al. |
| 2014/0169569 | A1 | 6/2014 | Toivanen et al. |
| 2014/0170979 | A1 | 6/2014 | Samanta Singhar |
| 2014/0180684 | A1 | 6/2014 | Strub |
| 2014/0180697 | A1 | 6/2014 | Torok et al. |
| 2014/0188476 | A1 | 7/2014 | Li et al. |
| 2014/0192986 | A1 | 7/2014 | Lee et al. |
| 2014/0219456 | A1 | 8/2014 | Morrell et al. |
| 2014/0219483 | A1 | 8/2014 | Hong |
| 2014/0226823 | A1 | 8/2014 | Sen et al. |
| 2014/0226837 | A1 | 8/2014 | Grokop |
| 2014/0242913 | A1 | 8/2014 | Pang |
| 2014/0244712 | A1 | 8/2014 | Walters et al. |
| 2014/0267148 | A1 | 9/2014 | Luna et al. |
| 2014/0270202 | A1 | 9/2014 | Ivanov et al. |
| 2014/0270216 | A1 | 9/2014 | Tsilfidis et al. |
| 2014/0270248 | A1 | 9/2014 | Ivanov et al. |
| 2014/0270282 | A1 | 9/2014 | Tammi et al. |
| 2014/0273859 | A1 | 9/2014 | Luna et al. |
| 2014/0274203 | A1 | 9/2014 | Ganong, III et al. |
| 2014/0274212 | A1 | 9/2014 | Zurek et al. |
| 2014/0278343 | A1 | 9/2014 | Tran |
| 2014/0279889 | A1 | 9/2014 | Luna |
| 2014/0285313 | A1 | 9/2014 | Luna et al. |
| 2014/0286496 | A1 | 9/2014 | Luna et al. |
| 2014/0294200 | A1 | 10/2014 | Baumgarte et al. |
| 2014/0294201 | A1 | 10/2014 | Johnson et al. |
| 2014/0310269 | A1 | 10/2014 | Zhang et al. |
| 2014/0321670 | A1 | 10/2014 | Nystrom et al. |
| 2014/0323036 | A1 | 10/2014 | Daley et al. |
| 2014/0334644 | A1 | 11/2014 | Selig et al. |
| 2014/0341399 | A1 | 11/2014 | Dusse et al. |
| 2014/0344689 | A1 | 11/2014 | Scott et al. |
| 2014/0355768 | A1 | 12/2014 | Sen et al. |
| 2014/0355794 | A1 | 12/2014 | Morrell et al. |
| 2014/0363022 | A1 | 12/2014 | Dizon et al. |
| 2014/0364056 | A1 | 12/2014 | Belk et al. |
| 2014/0369519 | A1 | 12/2014 | Leschka et al. |
| 2015/0006176 | A1 | 1/2015 | Pogue et al. |
| 2015/0011195 | A1 | 1/2015 | Li |
| 2015/0016642 | A1 | 1/2015 | Walsh et al. |
| 2015/0018992 | A1 | 1/2015 | Griffiths et al. |
| 2015/0023509 | A1 | 1/2015 | Devantier et al. |
| 2015/0023521 | A1 | 1/2015 | Jones et al. |
| 2015/0031287 | A1 | 1/2015 | Pang et al. |
| 2015/0032844 | A1 | 1/2015 | Tarr et al. |
| 2015/0036847 | A1 | 2/2015 | Donaldson |
| 2015/0036848 | A1 | 2/2015 | Donaldson |
| 2015/0039303 | A1 | 2/2015 | Lesso et al. |
| 2015/0039310 | A1 | 2/2015 | Clark et al. |
| 2015/0039311 | A1 | 2/2015 | Clark et al. |
| 2015/0043736 | A1 | 2/2015 | Olsen et al. |
| 2015/0051723 | A1 | 2/2015 | Bates et al. |
| 2015/0063610 | A1 | 3/2015 | Mossner |
| 2015/0073807 | A1 | 3/2015 | Kumar |
| 2015/0078586 | A1 | 3/2015 | Ang et al. |
| 2015/0078596 | A1 | 3/2015 | Sprogis |
| 2015/0086034 | A1 | 3/2015 | Lombardi et al. |
| 2015/0100991 | A1 | 4/2015 | Risberg et al. |
| 2015/0106085 | A1 | 4/2015 | Lindahl |
| 2015/0112672 | A1 | 4/2015 | Giacobello et al. |
| 2015/0124975 | A1 | 5/2015 | Pontoppidan |
| 2015/0126255 | A1 | 5/2015 | Yang et al. |
| 2015/0146886 | A1 | 5/2015 | Baumgarte |
| 2015/0149943 | A1 | 5/2015 | Nguyen et al. |
| 2015/0154953 | A1 | 6/2015 | Bapat et al. |
| 2015/0161360 | A1 | 6/2015 | Paruchuri et al. |
| 2015/0195666 | A1 | 7/2015 | Massey et al. |
| 2015/0200923 | A1 | 7/2015 | Triplett |
| 2015/0201274 | A1 | 7/2015 | Ellner et al. |
| 2015/0208184 | A1 | 7/2015 | Tan et al. |
| 2015/0208188 | A1 | 7/2015 | Carlsson et al. |
| 2015/0215382 | A1 | 7/2015 | Arora et al. |
| 2015/0220558 | A1 | 8/2015 | Snibbe et al. |
| 2015/0222563 | A1 | 8/2015 | Burns et al. |
| 2015/0223002 | A1 | 8/2015 | Mehta et al. |
| 2015/0223004 | A1 | 8/2015 | Deprez et al. |
| 2015/0229699 | A1 | 8/2015 | Liu |
| 2015/0260754 | A1 | 9/2015 | Perotti et al. |
| 2015/0263692 | A1 | 9/2015 | Bush |
| 2015/0264023 | A1 | 9/2015 | Reno |
| 2015/0271593 | A1 | 9/2015 | Sun et al. |
| 2015/0271616 | A1 | 9/2015 | Kechichian et al. |
| 2015/0271620 | A1 | 9/2015 | Lando et al. |
| 2015/0281866 | A1 | 10/2015 | Williams et al. |
| 2015/0286360 | A1 | 10/2015 | Wachter |
| 2015/0289064 | A1 | 10/2015 | Jensen et al. |
| 2015/0350766 | A1 | 12/2015 | Schobel et al. |
| 2015/0358756 | A1 | 12/2015 | Harma et al. |
| 2015/0382128 | A1 | 12/2015 | Ridihalgh et al. |
| 2016/0007116 | A1 | 1/2016 | Holman |
| 2016/0011846 | A1 | 1/2016 | Sheen |
| 2016/0011850 | A1 | 1/2016 | Sheen et al. |
| 2016/0014509 | A1 | 1/2016 | Hansson et al. |
| 2016/0014510 | A1 | 1/2016 | Sheen |
| 2016/0014511 | A1 | 1/2016 | Sheen et al. |
| 2016/0014534 | A1 | 1/2016 | Sheen |
| 2016/0014535 | A1 | 1/2016 | Wilberding et al. |
| 2016/0014536 | A1 | 1/2016 | Sheen |
| 2016/0021458 | A1 | 1/2016 | Johnson et al. |
| 2016/0021473 | A1 | 1/2016 | Riggi et al. |
| 2016/0021481 | A1 | 1/2016 | Johnson et al. |
| 2016/0027440 | A1 | 1/2016 | Gelfenbeyn et al. |
| 2016/0027467 | A1 | 1/2016 | Proud |
| 2016/0029142 | A1 | 1/2016 | Isaac et al. |
| 2016/0034448 | A1 | 2/2016 | Tran |
| 2016/0035337 | A1 | 2/2016 | Aggarwal et al. |
| 2016/0036404 | A1 | 2/2016 | Fleischmann et al. |
| 2016/0036881 | A1 | 2/2016 | Tembey et al. |
| 2016/0037277 | A1 | 2/2016 | Matsumoto et al. |
| 2016/0061597 | A1 | 3/2016 | De et al. |
| 2016/0066087 | A1 | 3/2016 | Solbach et al. |
| 2016/0070525 | A1 | 3/2016 | Sheen et al. |
| 2016/0070526 | A1 | 3/2016 | Sheen |
| 2016/0073210 | A1 | 3/2016 | Sheen |
| 2016/0088438 | A1 | 3/2016 | O'Keeffe |
| 2016/0093281 | A1 | 3/2016 | Kuo et al. |
| 2016/0098393 | A1 | 4/2016 | Hebert |
| 2016/0098992 | A1 | 4/2016 | Renard et al. |
| 2016/0118048 | A1 | 4/2016 | Heide |
| 2016/0119730 | A1 | 4/2016 | Virtanen |
| 2016/0140969 | A1 | 5/2016 | Srinivasan et al. |
| 2016/0142849 | A1 | 5/2016 | Satheesh et al. |
| 2016/0148612 | A1 | 5/2016 | Guo et al. |
| 2016/0154089 | A1 | 6/2016 | Altman |
| 2016/0155443 | A1 | 6/2016 | Khan et al. |
| 2016/0165297 | A1 | 6/2016 | Jamal-Syed et al. |
| 2016/0192098 | A1 | 6/2016 | Oishi et al. |
| 2016/0192099 | A1 | 6/2016 | Oishi et al. |
| 2016/0192100 | A1 | 6/2016 | Rabinowitz et al. |
| 2016/0212535 | A1 | 7/2016 | Le Nerriec et al. |
| 2016/0239255 | A1 | 8/2016 | Chavez et al. |
| 2016/0241907 | A1 | 8/2016 | Pearson |
| 2016/0246449 | A1 | 8/2016 | Jarske |
| 2016/0254696 | A1 | 9/2016 | Plumb et al. |
| 2016/0260140 | A1 | 9/2016 | Shirley et al. |
| 2016/0309276 | A1 | 10/2016 | Ridihalgh et al. |
| 2016/0316502 | A1 | 10/2016 | DeCicco |
| 2016/0330562 | A1 | 11/2016 | Crockett |
| 2016/0342201 | A1 | 11/2016 | Jehan |
| 2016/0353018 | A1 | 12/2016 | Anderson et al. |
| 2016/0366517 | A1 | 12/2016 | Chandran et al. |
| 2016/0373860 | A1 | 12/2016 | Leschka et al. |
| 2017/0026769 | A1 | 1/2017 | Patel |
| 2017/0041724 | A1 | 2/2017 | Master et al. |
| 2017/0069338 | A1 | 3/2017 | Elliot et al. |
| 2017/0070826 | A1 | 3/2017 | Pedersen et al. |
| 2017/0083279 | A1 | 3/2017 | Sheen |

(56) References Cited

U.S. PATENT DOCUMENTS

| | | | |
|---|---|---|---|
| 2017/0084278 | A1 | 3/2017 | Jung |
| 2017/0084292 | A1 | 3/2017 | Yoo |
| 2017/0086003 | A1 | 3/2017 | Rabinowitz et al. |
| 2017/0090864 | A1 | 3/2017 | Jorgovanovic |
| 2017/0103754 | A1 | 4/2017 | Higbie et al. |
| 2017/0105084 | A1 | 4/2017 | Holman |
| 2017/0110130 | A1 | 4/2017 | Sharifi et al. |
| 2017/0110144 | A1 | 4/2017 | Sharifi et al. |
| 2017/0133011 | A1 | 5/2017 | Chen et al. |
| 2017/0142532 | A1 | 5/2017 | Pan |
| 2017/0207762 | A1 | 7/2017 | Porter et al. |
| 2017/0215017 | A1 | 7/2017 | Hartung et al. |
| 2017/0223447 | A1 | 8/2017 | Johnson et al. |
| 2017/0230772 | A1 | 8/2017 | Johnson et al. |
| 2017/0236512 | A1 | 8/2017 | Williams et al. |
| 2017/0242653 | A1 | 8/2017 | Lang et al. |
| 2017/0242657 | A1 | 8/2017 | Jarvis et al. |
| 2017/0257722 | A1 | 9/2017 | Kerdranvat et al. |
| 2017/0269975 | A1 | 9/2017 | Wood et al. |
| 2017/0280265 | A1 | 9/2017 | Po |
| 2017/0286052 | A1 | 10/2017 | Hartung et al. |
| 2017/0287496 | A1 | 10/2017 | Heitkamp et al. |
| 2017/0303039 | A1 | 10/2017 | Iyer et al. |
| 2017/0311108 | A1 | 10/2017 | Patel |
| 2017/0332168 | A1 | 11/2017 | Moghimi et al. |
| 2017/0353789 | A1 | 12/2017 | Kim et al. |
| 2017/0358313 | A1 | 12/2017 | Shih |
| 2017/0365247 | A1 | 12/2017 | Ushakov |
| 2017/0374482 | A1 | 12/2017 | McPherson et al. |
| 2018/0033428 | A1 | 2/2018 | Kim et al. |
| 2018/0033429 | A1 | 2/2018 | Makke et al. |
| 2018/0039530 | A1 | 2/2018 | Ciabarra, Jr. et al. |
| 2018/0040324 | A1 | 2/2018 | Wilberding |
| 2018/0061409 | A1 | 3/2018 | Valentine et al. |
| 2018/0084367 | A1 | 3/2018 | Greff et al. |
| 2018/0091898 | A1 | 3/2018 | Yoon et al. |
| 2018/0096460 | A1 | 4/2018 | Tripp |
| 2018/0096678 | A1 | 4/2018 | Zhou et al. |
| 2018/0108351 | A1 | 4/2018 | Beckhardt et al. |
| 2018/0122378 | A1 | 5/2018 | Mixter et al. |
| 2018/0132298 | A1 | 5/2018 | Birnam et al. |
| 2018/0137857 | A1 | 5/2018 | Zhou et al. |
| 2018/0165055 | A1 | 6/2018 | Yu et al. |
| 2018/0167981 | A1 | 6/2018 | Jonna et al. |
| 2018/0182390 | A1 | 6/2018 | Hughes et al. |
| 2018/0182410 | A1 | 6/2018 | Kaskari et al. |
| 2018/0197533 | A1 | 7/2018 | Lyon et al. |
| 2018/0233137 | A1 | 8/2018 | Torok et al. |
| 2018/0277107 | A1 | 9/2018 | Kim |
| 2018/0277113 | A1 | 9/2018 | Hartung et al. |
| 2018/0336892 | A1 | 11/2018 | Kim et al. |
| 2018/0350356 | A1 | 12/2018 | Garcia |
| 2018/0350379 | A1 | 12/2018 | Wung et al. |
| 2018/0352334 | A1 | 12/2018 | Family et al. |
| 2018/0358019 | A1 | 12/2018 | Mont-Reynaud |
| 2018/0367944 | A1 | 12/2018 | Heo et al. |
| 2018/0376268 | A1 | 12/2018 | Kerdranvat et al. |
| 2019/0013019 | A1 | 1/2019 | Lawrence |
| 2019/0035404 | A1 | 1/2019 | Gabel et al. |
| 2019/0037328 | A1 | 1/2019 | McPherson et al. |
| 2019/0058942 | A1 | 2/2019 | Garner et al. |
| 2019/0066710 | A1 | 2/2019 | Bryan et al. |
| 2019/0073999 | A1 | 3/2019 | Prémont et al. |
| 2019/0081507 | A1 | 3/2019 | Ide |
| 2019/0104373 | A1 | 4/2019 | Wodrich et al. |
| 2019/0122662 | A1 | 4/2019 | Chang et al. |
| 2019/0156847 | A1 | 5/2019 | Bryan et al. |
| 2019/0172476 | A1 | 6/2019 | Wung et al. |
| 2019/0237069 | A1 | 8/2019 | Zhao et al. |
| 2019/0237089 | A1 | 8/2019 | Shin |
| 2019/0251960 | A1 | 8/2019 | Maker et al. |
| 2019/0259408 | A1 | 8/2019 | Freeman et al. |
| 2019/0287536 | A1 | 9/2019 | Sharifi et al. |
| 2019/0295563 | A1 | 9/2019 | Kamdar et al. |
| 2019/0311715 | A1 | 10/2019 | Pfeffinger et al. |
| 2019/0311718 | A1 | 10/2019 | Huber et al. |
| 2019/0311722 | A1 | 10/2019 | Caldwell |
| 2019/0318729 | A1 | 10/2019 | Chao et al. |
| 2019/0320278 | A1 | 10/2019 | McPherson et al. |
| 2019/0325870 | A1 | 10/2019 | Mitic |
| 2019/0325888 | A1 | 10/2019 | Geng |
| 2019/0341037 | A1 | 11/2019 | Bromand et al. |
| 2019/0341038 | A1 | 11/2019 | Bromand et al. |
| 2019/0371324 | A1 | 12/2019 | Powell et al. |
| 2019/0392832 | A1 | 12/2019 | Mitsui et al. |
| 2020/0005830 | A1 | 1/2020 | Wasada et al. |
| 2020/0090644 | A1 | 3/2020 | Klingler et al. |
| 2020/0090646 | A1 | 3/2020 | Smith et al. |
| 2020/0098354 | A1 | 3/2020 | Lin et al. |
| 2020/0135194 | A1 | 4/2020 | Jeong |
| 2020/0249346 | A1 | 8/2020 | Lim et al. |
| 2020/0382888 | A1 | 12/2020 | McPherson et al. |
| 2021/0118429 | A1 | 4/2021 | Shan |
| 2021/0141050 | A1 | 5/2021 | Janssen et al. |
| 2021/0287670 | A1 | 9/2021 | Regan et al. |
| 2021/0295833 | A1 | 9/2021 | Rastrow et al. |
| 2022/0036882 | A1 | 2/2022 | Ahn et al. |
| 2022/0083136 | A1 | 3/2022 | DeLeeuw |
| 2023/0362566 | A1 | 11/2023 | Bush |

FOREIGN PATENT DOCUMENTS

| | | | |
|---|---|---|---|
| CN | 1622694 | A | 6/2005 |
| CN | 1984507 | A | 6/2007 |
| CN | 101032187 | A | 9/2007 |
| CN | 101047777 | A | 10/2007 |
| CN | 101366177 | A | 2/2009 |
| CN | 101478296 | A | 7/2009 |
| CN | 101491116 | A | 7/2009 |
| CN | 101681219 | A | 3/2010 |
| CN | 101754087 | A | 6/2010 |
| CN | 101800051 | A | 8/2010 |
| CN | 102004823 | A | 4/2011 |
| CN | 102318325 | A | 1/2012 |
| CN | 102823277 | A | 12/2012 |
| CN | 102893633 | A | 1/2013 |
| CN | 103491397 | A | 1/2014 |
| CN | 103811010 | A | 5/2014 |
| CN | 103988523 | A | 8/2014 |
| CN | 104219604 | A | 12/2014 |
| CN | 104247461 | A | 12/2014 |
| CN | 104284291 | A | 1/2015 |
| CN | 104584061 | A | 4/2015 |
| CN | 104967953 | A | 10/2015 |
| CN | 105163221 | A | 12/2015 |
| CN | 107465974 | A | 12/2017 |
| DE | 102007032281 | A1 | 1/2009 |
| EP | 0505949 | A1 | 9/1992 |
| EP | 0772374 | A2 | 5/1997 |
| EP | 1133896 | B1 | 8/2002 |
| EP | 1349427 | A2 | 10/2003 |
| EP | 1389853 | A1 | 2/2004 |
| EP | 2043381 | A2 | 4/2009 |
| EP | 1349427 | B1 | 12/2009 |
| EP | 2161950 | A2 | 3/2010 |
| EP | 2194471 | A1 | 6/2010 |
| EP | 2197220 | A2 | 6/2010 |
| EP | 2288178 | A1 | 2/2011 |
| EP | 2429155 | A1 | 3/2012 |
| EP | 1825713 | B1 | 10/2012 |
| EP | 2613573 | A1 | 7/2013 |
| EP | 2591617 | B1 | 6/2014 |
| EP | 2747081 | A1 | 6/2014 |
| EP | 2835989 | A2 | 2/2015 |
| EP | 2860992 | A1 | 4/2015 |
| EP | 2874413 | A1 | 5/2015 |
| EP | 3128767 | A2 | 2/2017 |
| EP | 3142107 | A1 | 3/2017 |
| EP | 2974382 | B1 | 4/2017 |
| EP | 2986034 | B1 | 5/2017 |
| EP | 3285502 | A1 | 2/2018 |
| JP | H02280199 | A | 11/1990 |
| JP | H05199593 | A | 8/1993 |
| JP | H05211700 | A | 8/1993 |

(56) References Cited

FOREIGN PATENT DOCUMENTS

| | | | |
|---|---|---|---|
| JP | H06327089 | A | 11/1994 |
| JP | H0723490 | A | 1/1995 |
| JP | H1069280 | A | 3/1998 |
| JP | H10307592 | A | 11/1998 |
| JP | 2001286000 | A | 10/2001 |
| JP | 2002502193 | A | 1/2002 |
| JP | 2002067815 | A | 3/2002 |
| JP | 2002101500 | A | 4/2002 |
| JP | 2003143252 | A | 5/2003 |
| JP | 2003223188 | A | 8/2003 |
| JP | 2003304590 | A | 10/2003 |
| JP | 2004163590 | A | 6/2004 |
| JP | 2005086686 | A | 3/2005 |
| JP | 2005538633 | A | 12/2005 |
| JP | 2006017893 | A | 1/2006 |
| JP | 2006086380 | A | 3/2006 |
| JP | 2006180039 | A | 7/2006 |
| JP | 2006191562 | A | 7/2006 |
| JP | 2006340285 | A | 12/2006 |
| JP | 2007068125 | A | 3/2007 |
| JP | 2007271802 | A | 10/2007 |
| JP | 2007325073 | A | 12/2007 |
| JP | 2008035254 | A | 2/2008 |
| JP | 2008217444 | A | 9/2008 |
| JP | 2008228133 | A | 9/2008 |
| JP | 2009188474 | A | 8/2009 |
| JP | 2009288260 | A | 12/2009 |
| JP | 2010056970 | A | 3/2010 |
| JP | 2010081124 | A | 4/2010 |
| JP | 2010141892 | A | 6/2010 |
| JP | 2011123376 | A | 6/2011 |
| JP | 2011130212 | A | 6/2011 |
| JP | 2011164166 | A | 8/2011 |
| JP | 2011215378 | A | 10/2011 |
| JP | 2011217068 | A | 10/2011 |
| JP | 2013247456 | A | 12/2013 |
| JP | 2013253884 | A | 12/2013 |
| JP | 2014519274 | A | 8/2014 |
| JP | 2014523165 | A | 9/2014 |
| JP | 2015022268 | A | 2/2015 |
| JP | 2016009193 | A | 1/2016 |
| JP | 2016024652 | A | 2/2016 |
| JP | 2016095383 | A | 5/2016 |
| JP | 2016524193 | A | 8/2016 |
| JP | 2016212312 | A | 12/2016 |
| JP | 2018500529 | A | 1/2018 |
| JP | 6356331 | B2 | 7/2018 |
| JP | 6567735 | B2 | 8/2019 |
| JP | 2020048867 | A | 4/2020 |
| JP | 2022001030 | A | 1/2022 |
| JP | 2022046752 | A | 3/2022 |
| KR | 1020060116383 | | 11/2006 |
| KR | 1020080011831 | | 2/2008 |
| KR | 100966415 | B1 | 6/2010 |
| KR | 20120111130 | A | 10/2012 |
| KR | 20130050987 | A | 5/2013 |
| KR | 20140111859 | A | 9/2014 |
| KR | 20160005045 | A | 1/2016 |
| KR | 20160007527 | A | 1/2016 |
| KR | 20160101198 | A | 8/2016 |
| KR | 20160145634 | A | 12/2016 |
| WO | 200153994 | | 7/2001 |
| WO | 0182650 | A2 | 11/2001 |
| WO | 200182650 | | 11/2001 |
| WO | 2003093950 | A2 | 11/2003 |
| WO | 2004066673 | A1 | 8/2004 |
| WO | 2007016465 | A2 | 2/2007 |
| WO | 2011139502 | A1 | 11/2011 |
| WO | 2013006323 | A2 | 1/2013 |
| WO | 2013016500 | A1 | 1/2013 |
| WO | 2013126603 | A1 | 8/2013 |
| WO | 2014032709 | | 3/2014 |
| WO | 2014032709 | A1 | 3/2014 |
| WO | 2014036121 | A1 | 3/2014 |
| WO | 2014040667 | A1 | 3/2014 |
| WO | 2015024881 | A1 | 2/2015 |
| WO | 2015108794 | A1 | 7/2015 |
| WO | 2015178950 | A1 | 11/2015 |
| WO | 2016003509 | A1 | 1/2016 |
| WO | 2016014686 | A1 | 1/2016 |
| WO | 2016040324 | A1 | 3/2016 |
| WO | 2016054090 | A1 | 4/2016 |
| WO | 2016085775 | A2 | 6/2016 |
| WO | 2016118327 | A1 | 7/2016 |
| WO | 2016171956 | A1 | 10/2016 |
| WO | 2016189285 | A1 | 12/2016 |
| WO | 2017049169 | A1 | 3/2017 |
| WO | 2017058654 | A1 | 4/2017 |
| WO | 2017147081 | A1 | 8/2017 |
| WO | 2020006410 | A1 | 1/2020 |
| WO | 2020252163 | A1 | 12/2020 |
| WO | 2021030334 | A1 | 2/2021 |

OTHER PUBLICATIONS

Final Office Action mailed on Apr. 3, 2017, issued in connection with U.S. Appl. No. 14/678,248, filed Apr. 3, 2015, 22 pages.
Final Office Action mailed on Jul. 13, 2017, issued in connection with U.S. Appl. No. 14/726,921, filed Jun. 1, 2015, 10 pages.
Final Office Action mailed on Jun. 13, 2017, issued in connection with U.S. Appl. No. 14/481,505, filed Sep. 9, 2014, 22 pages.
Final Office Action mailed on Dec. 14, 2020, issued in connection with U.S. Appl. No. 16/812,618, filed Mar. 9, 2020, 17 pages.
Final Office Action mailed on Feb. 14, 2019, issued in connection with U.S. Appl. No. 15/005,496, filed Jan. 25, 2016, 16 pages.
Final Office Action mailed on Feb. 14, 2019, issued in connection with U.S. Appl. No. 15/217,399, filed Jul. 22, 2016, 37 pages.
Final Office Action mailed on Oct. 14, 2016, issued in connection with U.S. Appl. No. 14/682,182, filed Apr. 9, 2015, 16 pages.
Final Office Action mailed on Oct. 17, 2016, issued in connection with U.S. Appl. No. 14/678,248, filed Apr. 3, 2015, 22 pages.
Final Office Action mailed on Sep. 17, 2021, issued in connection with U.S. Appl. No. 16/564,766, filed Sep. 9, 2019, 8 pages.
Final Office Action mailed on Apr. 18, 2017, issued in connection with U.S. Appl. No. 14/678,263, filed Apr. 3, 2015, 16 pages.
Final Office Action mailed on Apr. 18, 2018, issued in connection with U.S. Appl. No. 15/056,553, filed Feb. 29, 2016, 8 pages.
Final Office Action mailed on Dec. 18, 2014, issued in connection with U.S. Appl. No. 13/340,126, filed Dec. 29, 2011, 12 pages.
Final Office Action mailed on Jan. 19, 2017, issued in connection with U.S. Appl. No. 14/940,779, filed Nov. 13, 2015, 15 pages.
Final Office Action mailed on Apr. 2, 2018, issued in connection with U.S. Appl. No. 15/166,241, filed May 26, 2016, 14 pages.
Final Office Action mailed on Aug. 20, 2021, issued in connection with U.S. Appl. No. 16/919,467, filed Jul. 2, 2020, 22 pages.
Final Office Action mailed on Sep. 20, 2023, issued in connection with U.S. Appl. No. 17/810,549, filed Jul. 1, 2022, 18 pages.
Final Office Action mailed on Oct. 21, 2016, issued in connection with U.S. Appl. No. 14/696,014, filed Apr. 24, 2015, 13 pages.
Final Office Action mailed on Sep. 22, 2020, issued in connection with U.S. Appl. No. 15/005,496, filed Jan. 25, 2016, 17 pages.
Final Office Action mailed on Jan. 25, 2018, issued in connection with U.S. Appl. No. 15/005,496, filed Jan. 25, 2016, 17 pages.
Final Office Action mailed on Mar. 25, 2019, issued in connection with U.S. Appl. No. 15/856,791, filed Dec. 28, 2017, 11 pages.
Final Office Action mailed on Oct. 28, 2019, issued in connection with U.S. Appl. No. 16/181,865, filed Nov. 6, 2018, 17 pages.
Final Office Action mailed on Apr. 3, 2018, issued in connection with U.S. Appl. No. 15/235,598, filed Aug. 12, 2016, 12 pages.
Final Office Action mailed on Mar. 3, 2020, issued in connection with U.S. Appl. No. 16/115,525, filed Aug. 28, 2018, 13 pages.
Final Office Action mailed on Aug. 30, 2022, issued in connection with U.S. Appl. No. 17/107,157, filed Nov. 30, 2020, 32 pages.
Final Office Action mailed on Oct. 30, 2023, issued in connection with U.S. Appl. No. 17/458,673, filed Aug. 27, 2021, 20 pages.
Final Office Action mailed on Feb. 5, 2018, issued in connection with U.S. Appl. No. 15/229,693, filed Aug. 5, 2016, 21 pages.

(56) References Cited

OTHER PUBLICATIONS

Final Office Action mailed on Mar. 5, 2019, issued in connection with U.S. Appl. No. 15/056,553, filed Feb. 29, 2016, 9 pages.
Final Office Action mailed on Dec. 6, 2018, issued in connection with U.S. Appl. No. 15/806,126, filed Nov. 7, 2017, 18 pages.
Final Office Action mailed on Apr. 9, 2019, issued in connection with U.S. Appl. No. 15/229,693, filed Aug. 5, 2016, 33 pages.
First Action Interview Office Action mailed on Mar. 3, 2017, issued in connection with U.S. Appl. No. 14/726,921, filed Jun. 1, 2015, 9 pages.
First Action Interview Office Action mailed on Jul. 12, 2016, issued in connection with U.S. Appl. No. 14/481,514, filed Sep. 9, 2014, 10 pages.
First Action Interview Office Action mailed on Jun. 30, 2016, issued in connection with U.S. Appl. No. 14/481,505, filed Sep. 9, 2014, 9 pages.
First Action Interview Pilot Program Pre-Interview Communication mailed on Apr. 5, 2017, issued in connection with U.S. Appl. No. 14/793,190, filed Jul. 7, 2015, 4 pages.
First Action Interview Pilot Program Pre-Interview Communication mailed on Oct. 7, 2015, issued in connection with U.S. Appl. No. 14/216,306, filed Mar. 17, 2014, 5 pages.
First Action Interview Pilot Program Pre-Interview Communication mailed on Feb. 16, 2016, issued in connection with U.S. Appl. No. 14/681,465, filed Apr. 8, 2015, 5 pages.
Gonzalez et al., "Simultaneous Measurement of Multichannel Acoustic Systems," J. Audio Eng. Soc., 2004, pp. 26-42, vol. 52, No. 1/2.
*Google LLC* v. *Sonos, Inc.*, Declaration of Jeffery S. Vipperman, PHD. In Support of Petition for Inter Partes Review of U.S. Pat. No. 9,219,460, IPR2021-00475, Feb. 2, 2021, 92 pages.
*Google LLC* v. *Sonos, Inc.*, Declaration of Michael T. Johnson, Ph.D. Exhibit 2016 in Patent Owner Response to Petition for Inter Partes Review of U.S. Pat. No. 9,219,460, IPR2021-00475, Jun. 13, 2022, 117 pages.
*Google LLC* v. *Sonos, Inc.*, Deposition of Jeffrey S. Vipperman, Ph.D. Exhibit 2017 in Patent Owner Response to Petition for Inter Partes Review of U.S. Pat. No. 9,219,460, IPR2021-00475, Jun. 13, 2022, 183 pages.
*Google LLC* v. *Sonos, Inc.*, File History of U.S. Appl. No. 61/601,529 Maher. Exhibit 2018 in Patent Owner Response to Petition for Inter Partes Review of U.S. Pat. No. 9,219,460, IPR2021-00475, Jun. 13, 2022, 14 pages.
*Google LLC* v. *Sonos, Inc.*, Judgment. Final Written Decision Determining All Challenged Claims Unpatentable for IPR of U.S. Pat. No. 9,219,460, IPR2021-00475, Feb. 15, 2023, 45 pages.
*Google LLC* v. *Sonos, Inc.*, Patent Owner Response to Petition for Inter Partes Review of U.S. Pat. No. 9,219,460, IPR2021-00475, Jun. 13, 2022, 49 pages.
*Google LLC* v. *Sonos, Inc.*, Patent Owner Sur-Reply to Petitioner's Reply for Inter Partes Review of U.S. Pat. No. 9,219,460, IPR2021-00475, Oct. 12, 2022, 32 pages.
*Google LLC* v. *Sonos, Inc.*, Petition for IPR of U.S. Pat. No. 9,219,460, IPR2021-00475, Feb. 5, 2021, 88 pages.
*Google LLC* v. *Sonos, Inc.*, Petitioner's Reply for Inter Partes Review of U.S. Pat. No. 9,219,460, IPR2021-00475, Sep. 6, 2022, 30 pages.
*Google LLC* v. *Sonos, Inc.*, Record of Oral Hearing for IPR of U.S. Pat. No. 9,219,460, IPR2021-00475, Dec. 14, 2022, 60 pages.
International Bureau, International Preliminary Report on Patentability and Written Opinion, mailed on Jan. 15, 2019, issued in connection with International Application No. PCT/US2017/042191, filed on Jul. 14, 2017, 10 pages.
International Bureau, International Preliminary Report on Patentability and Written Opinion, mailed on Mar. 20, 2018, issued in connection with International Application No. PCT/US2016/052264, filed on Sep. 16, 2016, 10 pages.
International Bureau, International Preliminary Report on Patentability and Written Opinion, mailed on Mar. 20, 2018, issued in connection with International Application No. PCT/US2016/052266, filed on Sep. 16, 2016, 7 pages.
Dell, Inc. "Start Here," Jun. 2000, 2 pages.
"Denon 2003-2004 Product Catalog," Denon, 2003-2004, 44 pages.
European Patent Office, European EPC Article 94.3 and Rule 164(2)(b) mailed on Nov. 23, 2023, issued in connection with European Application No. 20761443.9, 15 pages.
European Patent Office, European EPC Article 94.3 mailed on Aug. 16, 2021, issued in connection with European Application No. 19765920.4, 5 pages.
European Patent Office, European EPC Article 94.3 mailed on Feb. 2, 2024, issued in connection with European Application No. 21171959.6, 9 pages.
European Patent Office, European EPC Article 94.3 mailed on Oct. 29, 2021, issued in connection with European Application No. 20196286.7, 5 pages.
European Patent Office, European EPC Article 94.3 mailed on Feb. 3, 2023, issued in connection with European Application No. 19765920.4, 5 pages.
European Patent Office, European EPC Article 94.3 mailed on Apr. 30, 2021, issued in connection with European Application No. 20196286.7, 5 pages.
European Patent Office, European Examination Report mailed on May 11, 2018, issued in connection with European Application No. 16748186.0, 6 pages.
European Patent Office, European Extended Search Report mailed on Jun. 10, 2022, issued in connection with European Application No. 22155834.9, 8 pages.
European Patent Office, European Extended Search Report mailed on Dec. 11, 2020, issued in connection with European Application No. 20196286.7, 6 pages.
European Patent Office, European Extended Search Report mailed on Jan. 14, 2022, issued in connection with European Application No. 21171959.6, 12 pages.
European Patent Office, European Extended Search Report mailed on Mar. 16, 2020, issued in connection with European Application No. 19209551.1, 7 pages.
European Patent Office, European Extended Search Report mailed on Oct. 16, 2018, issued in connection with European Application No. 17185193.4, 6 pages.
European Patent Office, European Extended Search Report mailed on Jul. 17, 2019, issued in connection with European Application No. 19167365.6, 7 pages.
European Patent Office, European Extended Search Report mailed on Mar. 25, 2020, issued in connection with European Application No. 19215348.4, 10 pages.
European Patent Office, European Extended Search Report mailed on Jun. 26, 2018, issued in connection with European Application No. 18171206.8, 9 pages.
European Patent Office, European Extended Search Report mailed on Sep. 8, 2017, issued in connection with European Application No. 17000460.0, 8 pages.
European Patent Office, European Office Action mailed on Nov. 10, 2020, issued in connection with European Application No. 19168800.1, 5 pages.
European Patent Office, European Office Action mailed on Dec. 11, 2018, issued in connection with European Application No. 15778787.0, 6 pages.
European Patent Office, European Office Action mailed on Jul. 11, 2019, issued in connection with European Application No. 15778787.0, 10 pages.
European Patent Office, European Office Action mailed on Sep. 16, 2020, issued in connection with European Application No. 15778787.0, 7 pages.
European Patent Office, European Office Action mailed on Aug. 19, 2020, issued in connection with European Application No. 17754501.9, 6 pages.
European Patent Office, European Office Action mailed on Nov. 2, 2018, issued in connection with European Application No. 18171206.8, 6 pages.
European Patent Office, European Office Action mailed on Jan. 3, 2020, issued in connection with European Application No. 17703876.7, 8 pages.

(56) References Cited

OTHER PUBLICATIONS

European Patent Office, European Office Action mailed on Feb. 4, 2019, issued in connection with European Application No. 17703876.7, 9 pages.
European Patent Office, European Office Action mailed on Sep. 7, 2020, issued in connection with European Application No. 19161826.3, 6 pages.
European Patent Office, European Office Action mailed on Jul. 9, 2020, issued in connection with European Application No. 19167365.6, 4 pages.
European Patent Office, European Office Action mailed on May 9, 2019, issued in connection with European Application No. 18171206.8, 7 pages.
European Patent Office, European Partial Search Report mailed on Jun. 7, 2019, issued in connection with European Application No. 19161826.3, 17 pages.
European Patent Office, European Search Report mailed on Jun. 13, 2019, issued in connection with European Application No. 18204450.3, 11 pages.
European Patent Office, European Search Report mailed on Sep. 13, 2019, issued in connection with European Application No. 19161826.3, 13 pages.
European Patent Office, European Search Report mailed on Oct. 17, 2023, issued in connection with European Application No. 23178432.3, 8 pages.
European Patent Office, European Search Report mailed on Jan. 18, 2018, issued in connection with European Patent Application No. 17185193.4, 9 pages.
European Patent Office, European Search Report mailed on Jul. 9, 2019, issued in connection with European Application No. 19168800.1, 12 pages.
European Patent Office, Examination Report mailed on Jul. 12, 2021, issued in connection with European Patent Application No. 17754501.9 6 pages.
European Patent Office, Extended European Search Report mailed on Jan. 5, 2017, issued in connection with European Patent Application No. 15765555.6, 8 pages.
European Patent Office, Extended Search Report mailed on Jan. 25, 2017, issued in connection with European Application No. 15765548.1, 7 pages.
European Patent Office, Extended Search Report mailed on Apr. 26, 2017, issued in connection with European Application No. 15765548.1, 10 pages.
European Patent Office, Office Action mailed on Nov. 12, 2018, issued in connection with European Application No. 17000460.0, 6 pages.
European Patent Office, Office Action mailed on Jun. 13, 2017, issued in connection with European patent application No. 17000484.0, 10 pages.
European Patent Office, Office Action mailed on Dec. 15, 2016, issued in connection with European Application No. 15766998.7, 7 pages.
European Patent Office, Summons to Attend Oral Proceedings mailed on Nov. 15, 2018, issued in connection with European Application No. 16748186.0, 57 pages.
European Patent Office, Summons to Attend Oral Proceedings mailed on Apr. 22, 2022, issued in connection with European Application No. 15778787.0, 6 pages.
European Patent Office, Summons to Attend Oral Proceedings mailed on Sep. 24, 2019, issued in connection with European Application No. 17000460.0, 5 pages.
Ex Parte Quayle Office Action mailed on Apr. 15, 2019, issued in connection with U.S. Appl. No. 15/235,598, filed Aug. 12, 2016, 7 pages.
Ex Parte Quayle Office Action mailed on Dec. 26, 2019, issued in connection with U.S. Appl. No. 16/542,418, filed Aug. 16, 2019, 7 pages.
Excerpts from Andrew Tanenbaum, Computer Networks. 4th Edition. Copyright 2003, 87 pages [produced by Google in IPR of U.S. Pat. No. 9,219,460, IPR2021-00475 on Feb. 5, 2021].
Excerpts from Morfey, Christopher L., Dictionary of Acoustics. Copyright 2001, 4 pages [produced by Google in IPR of U.S. Pat. No. 9,219,460, IPR2021-00475 on Feb. 5, 2021].
Final Office Action mailed on Jul. 1, 2022, issued in connection with U.S. Appl. No. 17/033,818, filed Sep. 27, 2020, 13 pages.
Non-Final Office Action mailed on Jul. 13, 2016, issued in connection with U.S. Appl. No. 14/940,779, filed Nov. 13, 2015, 16 pages.
Non-Final Office Action mailed on Mar. 13, 2020, issued in connection with U.S. Appl. No. 15/005,496, filed Jan. 25, 2016, 20 pages.
Non-Final Office Action mailed on Dec. 14, 2016, issued in connection with U.S. Appl. No. 14/481,505, filed Sep. 9, 2014, 19 pages.
Non-Final Office Action mailed on Mar. 14, 2017, issued in connection with U.S. Appl. No. 15/096,827, filed Apr. 12, 2016, 12 pages.
Non-Final Office Action mailed on May 14, 2019, issued in connection with U.S. Appl. No. 15/955,545, filed Apr. 17, 2018, 15 pages.
Non-Final Office Action mailed on Oct. 14, 2015, issued in connection with U.S. Appl. No. 14/216,325, filed Mar. 17, 2014, 7 pages.
Non-Final Office Action mailed on Dec. 15, 2022, issued in connection with U.S. Appl. No. 17/807,595, filed Jun. 17, 2022, 16 pages.
Non-Final Office Action mailed on May 15, 2018, issued in connection with U.S. Appl. No. 15/806,126, filed Nov. 7, 2017, 17 pages.
Non-Final Office Action mailed on May 15, 2023, issued in connection with U.S. Appl. No. 17/567,311, filed Jan. 3, 2022, 12 pages.
Non-Final Office Action mailed on Nov. 15, 2021, issued in connection with U.S. Appl. No. 17/135,308, filed Dec. 28, 2020, 19 pages.
Non-Final Office Action mailed on Jun. 16, 2017, issued in connection with U.S. Appl. No. 15/005,496, filed Jan. 25, 2016, 15 pages.
Non-Final Office Action mailed on Nov. 16, 2018, issued in connection with U.S. Appl. No. 15/996,878, filed Jun. 4, 2018, 8 pages.
Non-Final Office Action mailed on Sep. 16, 2020, issued in connection with U.S. Appl. No. 16/115,525, filed Aug. 28, 2018, 11 pages.
Non-Final Office Action mailed on Jan. 17, 2023, issued in connection with U.S. Appl. No. 17/407,793, filed Aug. 20, 2021, 9 pages.
Non-Final Office Action mailed on Aug. 18, 2020, issued in connection with U.S. Appl. No. 16/827,143, filed Mar. 23, 2020, 8 pages.
Non-Final Office Action mailed on Dec. 18, 2018, issued in connection with U.S. Appl. No. 16/011,402, filed Jun. 18, 2018, 10 pages.
Non-Final Office Action mailed on Feb. 18, 2016, issued in connection with U.S. Appl. No. 14/644,136, filed Mar. 10, 2015, 10 pages.
Non-Final Office Action mailed on Jun. 18, 2019, issued in connection with U.S. Appl. No. 15/005,496, filed Jan. 25, 2016, 15 pages.
Non-Final Office Action mailed on Mar. 18, 2022, issued in connection with U.S. Appl. No. 17/033,818, filed Sep. 27, 2020, 12 pages.
Non-Final Office Action mailed on Apr. 19, 2023, issued in connection with U.S. Appl. No. 17/807,270, filed Jun. 16, 2022, 19 pages.
Non-Final Office Action mailed on Aug. 19, 2021, issued in connection with U.S. Appl. No. 17/357,302, filed Jun. 24, 2021, 16 pages.
Non-Final Office Action mailed on Feb. 19, 2020, issued in connection with U.S. Appl. No. 16/665,415, filed Oct. 28, 2019, 53 pages.
Non-Final Office Action mailed on Jan. 19, 2024, issued in connection with U.S. Appl. No. 18/308,087, filed Apr. 27, 2023, 22 pages.

(56) References Cited

OTHER PUBLICATIONS

Non-Final Office Action mailed on Jul. 19, 2023, issued in connection with U.S. Appl. No. 18/066,077, filed Dec. 14, 2022, 36 pages.
Non-Final Office Action mailed on Jun. 19, 2020, issued in connection with U.S. Appl. No. 16/403,077, filed May 3, 2019, 6 pages.
Non-Final Office Action mailed on Sep. 19, 2017, issued in connection with U.S. Appl. No. 15/056,553, filed Feb. 29, 2016, 7 pages.
Non-Final Office Action mailed on Apr. 2, 2018, issued in connection with U.S. Appl. No. 15/872,979, filed Jan. 16, 2018, 6 pages.
Non-Final Office Action mailed on Aug. 2, 2017, issued in connection with U.S. Appl. No. 15/298,115, filed Oct. 19, 2016, 22 pages.
Non-Final Office Action mailed on Feb. 2, 2024, issued in connection with U.S. Appl. No. 18/297,214, filed Apr. 7, 2023, 13 pages.
Non-Final Office Action mailed on Apr. 20, 2017, issued in connection with U.S. Appl. No. 15/005,853, filed Jan. 25, 2016, 8 pages.
Non-Final Office Action mailed on Jul. 20, 2016, issued in connection with U.S. Appl. No. 14/682,182, filed Apr. 9, 2015, 13 pages.
Non-Final Office Action mailed on Jun. 20, 2017, issued in connection with U.S. Appl. No. 15/207,682, filed Jul. 12, 2016, 17 pages.
Non-Final Office Action mailed on Dec. 21, 2018, issued in connection with U.S. Appl. No. 16/181,213, filed Nov. 5, 2018, 13 pages.
Non-Final Office Action mailed on Jun. 21, 2016, issued in connection with U.S. Appl. No. 14/678,248, filed Apr. 3, 2015, 10 pages.
Non-Final Office Action mailed on Jun. 21, 2019, issued in connection with U.S. Appl. No. 16/181,865, filed Nov. 6, 2018, 12 pages.
Non-Final Office Action mailed on Nov. 21, 2014, issued in connection with U.S. Appl. No. 13/536,493, filed Jun. 28, 2012, 20 pages.
Non-Final Office Action mailed on Sep. 21, 2023, issued in connection with U.S. Appl. No. 18/352,394, filed Jul. 14, 2023, 6 pages.
Non-Final Office Action mailed on Jun. 22, 2018, issued in connection with U.S. Appl. No. 15/217,399, filed Jul. 22, 2016, 33 pages.
Non-Final Office Action mailed on Jun. 22, 2020, issued in connection with U.S. Appl. No. 16/555,832, filed Aug. 29, 2019, 15 pages.
Non-Final Office Action mailed on Oct. 22, 2019, issued in connection with U.S. Appl. No. 16/416,619, filed May 20, 2019, 12 pages.
Non-Final Office Action mailed on Oct. 22, 2021, issued in connection with U.S. Appl. No. 16/949,951, filed Nov. 20, 2020, 10 pages.
Non-Final Office Action mailed on Jan. 23, 2019, issued in connection with U.S. Appl. No. 16/113,032, filed Aug. 27, 2018, 8 pages.
Non-Final Office Action mailed on Jun. 23, 2023, issued in connection with U.S. Appl. No. 18/189,869, filed Mar. 24, 2023, 13 pages.
Non-Final Office Action mailed on Jan. 24, 2024, issued in connection with U.S. Appl. No. 18/189,863, filed Mar. 24, 2023, 28 pages.
Non-Final Office Action mailed on Jun. 24, 2022, issued in connection with U.S. Appl. No. 17/373,179, filed Jul. 12, 2021, 8 pages.
Non-Final Office Action mailed on May 24, 2019, issued in connection with U.S. Appl. No. 16/401,981, filed May 2, 2019, 14 pages.
Non-Final Office Action mailed on May 24, 2023, issued in connection with U.S. Appl. No. 18/175,283, filed Feb. 27, 2023, 13 pages.
Non-Final Office Action mailed on Feb. 25, 2022, issued in connection with U.S. Appl. No. 17/107,157, filed Nov. 30, 2020, 30 pages.
Non-Final Office Action mailed on Jan. 25, 2023, issued in connection with U.S. Appl. No. 17/816,238, filed Jul. 29, 2022, 10 pages.
Non-Final Office Action mailed on Oct. 25, 2016, issued in connection with U.S. Appl. No. 14/864,506, filed Sep. 24, 2015, 9 pages.
Non-Final Office Action mailed on Oct. 25, 2023, issued in connection with U.S. Appl. No. 18/308,065, filed Apr. 27, 2023, 15 pages.
Non-Final Office Action mailed on Jun. 26, 2023, issued in connection with U.S. Appl. No. 17/543,014, filed Dec. 6, 2021, 17 pages.
Non-Final Office Action mailed on Sep. 26, 2018, issued in connection with U.S. Appl. No. 15/229,693, filed Aug. 5, 2016, 25 pages.
Non-Final Office Action mailed on Dec. 27, 2017, issued in connection with U.S. Appl. No. 15/357,520, filed Nov. 21, 2016, 28 pages.
Non-Final Office Action mailed on Feb. 27, 2018, issued in connection with U.S. Appl. No. 14/864,393, filed Sep. 24, 2015, 19 pages.
Non-Final Office Action mailed on Feb. 27, 2018, issued in connection with U.S. Appl. No. 15/718,556, filed Sep. 28, 2017, 19 pages.
Non-Final Office Action mailed on Feb. 27, 2024, issued in connection with U.S. Appl. No. 18/343,487, filed Jun. 28, 2023, 42 pages.
Non-Final Office Action mailed on Jul. 27, 2016, issued in connection with U.S. Appl. No. 14/696,014, filed Apr. 24, 2015, 11 pages.
Non-Final Office Action mailed on Mar. 27, 2017, issued in connection with U.S. Appl. No. 15/211,835, filed Jul. 15, 2016, 30 pages.
Non-Final Office Action mailed on Mar. 27, 2018, issued in connection with U.S. Appl. No. 15/785,088, filed Oct. 16, 2017, 11 pages.
Non-Final Office Action mailed on Jul. 28, 2016, issued in connection with U.S. Appl. No. 14/884,001, filed Oct. 15, 2015, 8 pages.
Non-Final Office Action mailed on May 28, 2021, issued in connection with U.S. Appl. No. 17/098,134, filed Nov. 13, 2020, 14 pages.
Non-Final Office Action mailed on Nov. 28, 2017, issued in connection with U.S. Appl. No. 15/673,170, filed Aug. 9, 2017, 7 pages.
Non-Final Office Action mailed on Sep. 28, 2018, issued in connection with U.S. Appl. No. 15/588,186, filed May 5, 2017, 12 pages.
Non-Final Office Action mailed on Sep. 28, 2018, issued in connection with U.S. Appl. No. 15/595,519, filed May 15, 2017, 12 pages.
Non-Final Office Action mailed on Mar. 29, 2018, issued in connection with U.S. Appl. No. 15/716,313, filed Sep. 26, 2017, 16 pages.
Non-Final Office Action mailed on Sep. 29, 2022, issued in connection with U.S. Appl. No. 17/340,353, filed Jun. 7, 2021, 8 pages.
Non-Final Office Action mailed on May 3, 2021, issued in connection with U.S. Appl. No. 16/564,766, filed Sep. 9, 2019, 16 pages.
Non-Final Office Action mailed on Aug. 30, 2019, issued in connection with U.S. Appl. No. 16/115,525, filed Aug. 28, 2018, 13 pages.
Non-Final Office Action mailed on May 30, 2017, issued in connection with U.S. Appl. No. 15/478,770, filed Apr. 4, 2017, 9 pages.
Non-Final Office Action mailed on Sep. 30, 2022, issued in connection with U.S. Appl. No. 17/113,799, filed Dec. 7, 2020, 79 pages.
Non-Final Office Action mailed on Mar. 31, 2021, issued in connection with U.S. Appl. No. 16/919,467, filed Jul. 2, 2020, 10 pages.
Non-Final Office Action mailed on May 31, 2019, issued in connection with U.S. Appl. No. 16/185,906, filed Nov. 9, 2018, 7 pages.
Non-Final Office Action mailed on May 31, 2023, issued in connection with U.S. Appl. No. 17/810,549, filed Jul. 1, 2022, 19 pages.
Non-Final Office Action mailed on Mar. 4, 2020, issued in connection with U.S. Appl. No. 15/966,534, filed Apr. 30, 2018, 11 pages.

(56) References Cited

OTHER PUBLICATIONS

Non-Final Office Action mailed on Jan. 5, 2021, issued in connection with U.S. Appl. No. 17/078,382, filed Oct. 23, 2020, 11 pages.
Non-Final Office Action mailed on Jul. 6, 2020, issued in connection with U.S. Appl. No. 16/812,618, filed Mar. 9, 2020, 15 pages.
Non-Final Office Action mailed on Nov. 6, 2018, issued in connection with U.S. Appl. No. 15/235,598, filed Aug. 12, 2016, 13 pages.
Non-Final Office Action mailed on Aug. 7, 2023, issued in connection with U.S. Appl. No. 17/807,270, filed Jun. 16, 2022, 20 pages.
Non-Final Office Action mailed on Feb. 7, 2019, issued in connection with U.S. Appl. No. 15/859,311, filed Dec. 29, 2017, 9 pages.
Non-Final Office Action mailed on Feb. 7, 2019, issued in connection with U.S. Appl. No. 15/865,221, filed Jan. 8, 2018, 10 pages.
Non-Final Office Action mailed on Mar. 7, 2024, issued in connection with U.S. Appl. No. 17/458,673, filed Aug. 27, 2021, 26 pages.
Non-Final Office Action mailed on Mar. 7, 2024, issued in connection with U.S. Appl. No. 18/338,841, filed Jun. 21, 2023, 15 pages.
Non-Final Office Action mailed on Jun. 8, 2021, issued in connection with U.S. Appl. No. 17/207,640, filed Mar. 20, 2021, 17 pages.
Non-Final Office Action mailed on Dec. 9, 2022, issued in connection with U.S. Appl. No. 17/662,282, filed May 6, 2022, 12 pages.
Non-Final Office Action mailed on Jan. 9, 2018, issued in connection with U.S. Appl. No. 15/698,283, filed Sep. 7, 2017, 18 pages.
Non-Final Office Action mailed on Jan. 9, 2018, issued in connection with U.S. Appl. No. 15/727,913, filed Oct. 9, 2017, 8 pages.
Notice of Allowance mailed Jul. 21, 2021, issued in connection with U.S. Appl. No. 16/944,884, filed Jul. 31, 2020, 8 pages.
Notice of Allowance mailed Aug. 4, 2021, issued in connection with U.S. Appl. No. 17/104,466, filed Nov. 25, 2020, 9 pages.
Notice of Allowance mailed on May 1, 2017, issued in connection with U.S. Appl. No. 14/805,140, filed Jul. 21, 2015, 13 pages.
Notice of Allowance mailed on Nov. 2, 2016, issued in connection with U.S. Appl. No. 14/884,001, filed Oct. 15, 2015, 8 pages.
Notice of Allowance mailed on Jun. 3, 2016, issued in connection with U.S. Appl. No. 14/921,799, filed Oct. 23, 2015, 8 pages.
Notice of Allowance mailed on Nov. 4, 2016, issued in connection with U.S. Appl. No. 14/481,514, filed Sep. 9, 2014, 10 pages.
Notice of Allowance mailed on Jun. 6, 2018, issued in connection with U.S. Appl. No. 15/727,913, filed Oct. 9, 2017, 5 pages.
Notice of Allowance mailed on Oct. 6, 2022, issued in connection with U.S. Appl. No. 17/582,317, filed Jan. 24, 2022, 9 pages.
Notice of Allowance mailed on Dec. 7, 2015, issued in connection with U.S. Appl. No. 14/216,325, filed Mar. 17, 2014, 7 pages.
Notice of Allowance mailed on Dec. 8, 2022, issued in connection with U.S. Appl. No. 17/340,353, filed Jun. 7, 2021, 9 pages.
Notice of Allowance mailed on Nov. 9, 2016, issued in connection with U.S. Appl. No. 14/805,340, filed Jul. 21, 2015, 13 pages.
Notice of Allowance mailed on Feb. 1, 2018, issued in connection with U.S. Appl. No. 15/480,265, filed Apr. 5, 2017, 8 pages.
Notice of Allowance mailed on Nov. 1, 2021, issued in connection with U.S. Appl. No. 17/103,556, filed Nov. 24, 2020, 5 pages.
Notice of Allowance mailed on May 5, 2017, issued in connection with U.S. Appl. No. 14/826,873, filed Aug. 14, 2015, 5 pages.
Notice of Allowance mailed on May 5, 2022, issued in connection with U.S. Appl. No. 17/316,371, filed May 10, 2021, 10 pages.
Notice of Allowance mailed on Oct. 5, 2018, issued in connection with U.S. Appl. No. 16/115,524, filed Aug. 28, 2018, 10 pages.
Notice of Allowance mailed on Aug. 6, 2020, issued in connection with U.S. Appl. No. 16/564,684, filed Sep. 9, 2019, 8 pages.
Notice of Allowance mailed on Feb. 6, 2019, issued in connection with U.S. Appl. No. 15/996,878, filed Jun. 4, 2018, 8 pages.
Notice of Allowance mailed on Apr. 8, 2019, issued in connection with U.S. Appl. No. 16/011,402, filed Jun. 18, 2018, 8 pages.
Notice of Allowance mailed on Jul. 8, 2019, issued in connection with U.S. Appl. No. 15/856,791, filed Dec. 28, 2017, 5 pages.
Notice of Allowance mailed on Jun. 8, 2020, issued in connection with U.S. Appl. No. 16/658,896, filed Oct. 21, 2019, 8 pages.
Notice of Allowance mailed on Jun. 8, 2021, issued in connection with U.S. Appl. No. 17/104,466, filed Nov. 25, 2020, 8 pages.
Notice of Allowance mailed on May 8, 2018, issued in connection with U.S. Appl. No. 15/650,386, filed Jul. 14, 2017, 13 pages.
Notice of Allowance mailed on Apr. 9, 2020, issued in connection with U.S. Appl. No. 16/416,593, filed May 20, 2019, 9 pages.
Notice of Allowance mailed on Jun. 9, 2020, issued in connection with U.S. Appl. No. 15/966,534, filed Apr. 30, 2018, 16 pages.
Notice of Allowance mailed on May 9, 2019, issued in connection with U.S. Appl. No. 15/996,878, filed Jun. 4, 2018, 7 pages.
Notice of Allowance mailed on Apr. 19, 2017, issued in connection with U.S. Appl. No. 14/481,511, filed Sep. 9, 2014, 10 pages.
Palm, Inc., "Handbook for the Palm VII Handheld," May 2000, 311 pages.
Papp Istvan et al. "Adaptive Microphone Array for Unknown Desired Speaker's Transfer Function", The Journal of the Acoustical Society of America, American Institute of Physics for the Acoustical Society of America, New York, NY vol. 122, No. 2, Jul. 19, 2007, pp. 44-49.
Pre-Brief Appeal Conference Decision mailed on Mar. 19, 2019, issued in connection with U.S. Appl. No. 15/806,126, filed Nov. 7, 2017, 2 pages.
Preinterview First Office Action mailed on Oct. 6, 2016, issued in connection with U.S. Appl. No. 14/726,921, filed Jun. 1, 2015, 6 pages.
Preinterview First Office Action mailed on Jul. 12, 2017, issued in connection with U.S. Appl. No. 14/793,205, filed Jul. 7, 2015, 5 pages.
Preinterview First Office Action mailed on May 17, 2016, issued in connection with U.S. Appl. No. 14/481,505, filed Sep. 9, 2014, 7 pages.
Preinterview First Office Action mailed on May 25, 2016, issued in connection with U.S. Appl. No. 14/481,514, filed Sep. 9, 2014, 7 pages.
Presentations at WinHEC 2000, May 2000, 138 pages.
PRISMIQ, Inc., "PRISMIQ Media Player User Guide," 2003, 44 pages.
Rosenblatt, Jonathan et al. On the Optimality of Averaging in Distributed Statistical Learning. Information and Inference, Department of Computer Science and Applied Mathematics, Weizmann Institute of Science, vol. 5, No. 4, Jun. 16, 2015, 30 pages. Retrieved from the Internet: URL:https://arxiv.org/pdf/1407.2724.pdf.
Ross, Alex, "Wizards of Sound: Retouching acoustics, from the restaurant to the concert hall," The New Yorker, Feb. 23, 2015. Web. Feb. 26, 2015, 9 pages.
*Sonos, Inc.* v. *Google LLC*, WDTX Case No. 6:20-cv-00881, Google's Answer and Counterclaims; dated Jan. 8, 2021, 39 pages.
Supplemental Notice of Allowability mailed on Oct. 27, 2016, issued in connection with U.S. Appl. No. 14/481,511, filed Sep. 9, 2014, 6 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Wikipedia, Server(Computing) https://web.archive.org/web/20160703173710/https://en.wikipedia.org/wiki/Server_(computing), published Jul. 3, 2016, 7 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
International Bureau, International Preliminary Report on Patentability and Written Opinion, mailed on Jan. 23, 2018, issued in connection with International Application No. PCT/US2016/043109, filed on Jul. 20, 2016, 7 pages.
International Bureau, International Preliminary Report on Patentability and Written Opinion, mailed on Jan. 23, 2018, issued in

(56) References Cited

OTHER PUBLICATIONS connection with International Application No. PCT/US2016/043116, filed on Jul. 20, 2016, 8 pages.
International Bureau, International Preliminary Report on Patentability and Written Opinion, mailed on Oct. 24, 2017, issued in connection with International Application No. PCT/US2016/028997, filed on Apr. 22, 2016, 7 pages.
International Bureau, International Preliminary Report on Patentability and Written Opinion, mailed on Jan. 9, 2018, issued in connection with International Application No. PCT/US2016/041179, filed on Jul. 6, 2016, 6 pages.
International Bureau, International Preliminary Report on Patentability, mailed on Mar. 2, 2021, issued in connection with International Application No. PCT/US2019/048366, filed on Aug. 27, 2019, 7 pages.
International Bureau, International Preliminary Report on Patentability, mailed on Mar. 2, 2021, issued in connection with International Application No. PCT/US2019/048569, filed on Aug. 28, 2019, 11 pages.
International Bureau, International Preliminary Report on Patentability, mailed on Sep. 24, 2015, issued in connection with International Application No. PCT/US2014/030560, filed on Mar. 17, 2014, 7 pages.
International Bureau, International Preliminary Report on Patentability mailed on Sep. 29, 2016, issued in connection with International Application No. PCT/US2015/020993, filed on Mar. 17, 2015, 8 pages.
International Bureau, International Preliminary Report on Patentability mailed on Sep. 29, 2016, issued in connection with International Application No. PCT/US2015/021000, filed on Mar. 17, 2015, 9 pages.
International Bureau, International Preliminary Report on Patentability, mailed on Aug. 9, 2018, issued in connection with International Application No. PCT/US2017/014596, filed on Jan. 23, 2017, 11 pages.
International Bureau, International Search Report and Written Opinion mailed on Dec. 15, 2020, issued in connection with International Application No. PCT/US2020/045746, filed on Aug. 11, 2020, 23 pages.
International Bureau, International Search Report and Written Opinion mailed on Nov. 25, 2019, issued in connection with International Application No. PCT/US2019/048569, filed on Aug. 28, 2019, 13 pages.
International Bureau, International Search Report and Written Opinion mailed on Nov. 7, 2019, issued in connection with International Application No. PCT/US2019/048366, filed on Aug. 27, 2019, 9 pages.
International Searching Authority, International Preliminary Report on Patentability mailed on Mar. 23, 2017, issued in connection with International Patent Application No. PCT/US2015/048944, filed on Sep. 8, 2015, 8 pages.
International Searching Authority, International Preliminary Report on Patentability mailed on Oct. 24, 2017, issued in connection with International Application No. PCT/US2016/028994 filed on Apr. 22, 2016, 7 pages.
International Searching Authority, International Search Report and Written Opinion mailed on Jul. 4, 2016, issued in connection with International Application No. PCT/US2016/028994, filed on Apr. 22, 2016, 12 pages.
International Searching Authority, International Search Report and Written Opinion mailed on Jul. 5, 2016, issued in connection with International Application No. PCT/US2016/028997, filed on Apr. 22, 2016, 13 pages.
International Searching Authority, International Search Report and Written Opinion mailed on Jun. 5, 2015, issued in connection with International Application No. PCT/US2015/021000, filed on Mar. 17, 2015, 12 pages.
International Searching Authority, International Search Report and Written Opinion mailed on Oct. 12, 2016, issued in connection with International Application No. PCT/US2016/041179 filed on Jul. 6, 2016, 9 pages.
International Searching Authority, International Search Report and Written Opinion mailed on Jun. 16, 2015, issued in connection with International Application No. PCT/US2015/020993, filed on Mar. 17, 2015, 11 pages.
International Searching Authority, International Search Report and Written Opinion mailed on Nov. 18, 2015, issued in connection with International Application No. PCT/US2015/048954, filed on Sep. 8, 2015, 11 pages.
International Searching Authority, International Search Report and Written Opinion mailed on Oct. 18, 2016, issued in connection with International Application No. PCT/US2016/043116, filed on Jul. 20, 2016, 14 pages.
International Searching Authority, International Search Report and Written Opinion mailed on Oct. 18, 2016, issued in connection with International Application No. PCT/US2016/043840, filed on Jul. 25, 2016, 14 pages.
International Searching Authority, International Search Report and Written Opinion mailed on Nov. 23, 2015, issued in connection with International Application No. PCT/US2015/048942, filed on Sep. 8, 2015, 14 pages.
International Searching Authority, International Search Report and Written Opinion mailed on Nov. 23, 2015, issued in connection with International Application No. PCT/US2015/048944, filed on Sep. 8, 2015, 12 pages.
International Searching Authority, International Search Report and Written Opinion mailed on Nov. 23, 2016, issued in connection with International Patent Application No. PCT/US2016/052266, filed on Sep. 16, 2016, 11 pages.
International Searching Authority, International Search Report and Written Opinion mailed on Jan. 24, 2017, issued in connection with International Application No. PCT/US2016/052264, filed on Sep. 16, 2016, 17 pages.
International Searching Authority, International Search Report and Written Opinion mailed on Oct. 25, 2016, issued in connection with International Application No. PCT/US2016/043109, filed on Jul. 20, 2016, 12 pages.
International Searching Authority, International Search Report and Written Opinion mailed on Sep. 25, 2017, issued in connection with International Application No. PCT/US2017/042191, filed on Jul. 14, 2017, 16 pages.
International Searching Authority, International Search Report and Written Opinion mailed on Aug. 3, 2017, in connection with International Application No. PCT/U.S. Pat. No. 2017014596, 20 pages.
Japanese Patent Office, English Translation of Office Action mailed on May 8, 2018, issued in connection with Japanese Application No. 2017-513241, 4 pages.
Japanese Patent Office, Examination Report and Translation mailed on Dec. 7, 2021, issued in connection with Japanese Patent Application No. 2020-185230, 10 pages.
Japanese Patent Office, Japanese Office Action mailed on Oct. 3, 2017, issued in connection with Japanese Application No. 2017-501082, 7 pages.
Japanese Patent Office, Non-Final Office Action and Translation mailed on Dec. 10, 2019, issued in connection with Japanese Patent Application No. 2018-213477, 8 pages.
Japanese Patent Office, Non-Final Office Action with Translation mailed on Apr. 25, 2017, issued in connection with Japanese Patent Application No. 2016-568888, 7 pages.
Japanese Patent Office, Non-Final Office Action with Translation mailed on Oct. 3, 2017, issued in connection with Japanese Patent Application No. 2017-501082, 3 pages.
Japanese Patent Office, Notice of Reasons for Refusal and Translation mailed on Oct. 5, 2021, issued in connection with Japanese Patent Application No. 2020-134012, 10 pages.
Japanese Patent Office, Office Action and Translation mailed on Jun. 12, 2020, issued in connection with Japanese Patent Application No. 2019-056360, 6 pages.

(56) References Cited

OTHER PUBLICATIONS

Japanese Patent Office, Office Action and Translation mailed on Apr. 13, 2021, issued in connection with Japanese Patent Application No. 2020-048867, 4 pages.
Japanese Patent Office, Office Action and Translation mailed on Nov. 4, 2020, issued in connection with Japanese Patent Application No. 2019-141349, 6 pages.
Japanese Patent Office, Office Action and Translation mailed on Sep. 5, 2023, issued in connection with Japanese Application No. 2022-115789, 6 pages.
Japanese Patent Office, Office Action and Translation mailed on Mar. 7, 2023, issued in connection with Japanese Application No. 2022-001030, 11 pages.
Japanese Patent Office, Office Action mailed on Dec. 7, 2021, issued in connection with Japanese Patent Application No. 2020-185230, 8 pages.
Japanese Patent Office, Office Action mailed on Jun. 12, 2018, issued in connection with Japanese Application No. 2018-502729, 4 pages.
Japanese Patent Office, Office Action mailed on May 14, 2019, issued in connection with Japanese Patent Application No. 2018-500529, 8 pages.
Japanese Patent Office, Office Action mailed on Aug. 21, 2018, issued in connection with Japanese Application No. 2018-514418, 7 pages.
Japanese Patent Office, Office Action mailed on Jul. 24, 2018, issued in connection with Japanese Application No. 2018-514419, 5 pages.
Japanese Patent Office, Office Action mailed on Feb. 4, 2020, issued in connection with Japanese Patent Application No. 2018-500529, 6 pages.
Japanese Patent Office, Office Action mailed on Jun. 4, 2019, issued in connection with Japanese Patent Application No. 2018-112810, 4 pages.
Japanese Patent Office, Office Action mailed on May 8, 2018, issued in connection with Japanese Application No. 2017-513241, 8 pages.
Japanese Patent Office, Office Action with English Summary mailed on Jul. 18, 2017, issued in connection with Japanese Patent Application No. 2017-513171, 4 pages.
Japanese Patent Office, Translation of Office Action mailed on May 14, 2019, issued in connection with Japanese Patent Application No. 2018-500529, 5 pages.
Jo et al., "Synchronized One-to-many Media Streaming with Adaptive Playout Control," Proceedings of SPIE, 2002, pp. 71-82, vol. 4861.
John Mark and Paul Hufnagel "What is 1451.4, what are its uses and how does it work?" IEEE Standards Association, The IEEE 1451.4 Standard for Smart Transducers, 14pages.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Lei et al. An Audio Frequency Acquision and Release System Based on TMS320VC5509, Instrumentation Technology, Editorial Department Email, Issue 02, 2007, 4 pages.
Louderback, Jim, "Affordable Audio Receiver Furnishes Homes With MP3," TechTV Vault. Jun. 28, 2000 retrieved Jul. 10, 2014, 2 pages.
Microsoft Corporation, "Using Microsoft Outlook 2003," Cambridge College, 2003.
Motorola, "Simplefi, Wireless Digital Audio Receiver, Installation and User Guide," Dec. 31, 2001, 111 pages.
Mulcahy, John, "Room EQ Wizard: Room Acoustics Software," REW, 2014, retrieved Oct. 10, 2014, 4 pages.
Non-Final Action mailed on Jan. 29, 2016, issued in connection with U.S. Appl. No. 14/481,511, filed Sep. 9, 2014, 10 pages.
Non-Final Office Action mailed Sep. 16, 2021, issued in connection with U.S. Appl. No. 17/098,134, filed Nov. 13, 2020, 10 pages.
Non-Final Office Action mailed Jul. 21, 2021, issued in connection with U.S. Appl. No. 16/570,679, filed Sep. 13, 2019, 18 pages.
Non-Final Office Action mailed Sep. 7, 2021, issued in connection with U.S. Appl. No. 16/994,627, filed Aug. 16, 2020, 11 pages.
Non-Final Office Action mailed on Mar. 1, 2017, issued in connection with U.S. Appl. No. 15/344,069, filed Nov. 4, 2016, 20 pages.
Non-Final Office Action mailed on Nov. 1, 2017, issued in connection with U.S. Appl. No. 15/235,598, filed Aug. 12, 2016, 15 pages.
Non-Final Office Action mailed on Jun. 2, 2014, issued in connection with U.S. Appl. No. 13/340,126, filed Dec. 29, 2011, 14 pages.
Non-Final Office Action mailed on Jun. 2, 2017, issued in connection with U.S. Appl. No. 15/229,693, filed Aug. 5, 2016, 18 pages.
Non-Final Office Action mailed on Nov. 2, 2017, issued in connection with U.S. Appl. No. 15/166,241, filed May 26, 2016, 12 pages.
Non-Final Office Action mailed on Oct. 2, 2017, issued in connection with U.S. Appl. No. 15/005,853, filed Jan. 25, 2016, 8 pages.
Non-Final Office Action mailed on Feb. 3, 2016, issued in connection with U.S. Appl. No. 14/481,522, filed Sep. 9, 2014, 12 pages.
Non-Final Office Action mailed on Jul. 3, 2018, issued in connection with U.S. Appl. No. 15/909,327, filed Mar. 1, 2018, 30 pages.
Non-Final Office Action mailed on Jan. 4, 2017, issued in connection with U.S. Appl. No. 15/207,682, filed Jul. 12, 2016, 6 pages.
Non-Final Office Action mailed on Nov. 4, 2016, issued in connection with U.S. Appl. No. 14/826,856, filed Aug. 14, 2015, 10 pages.
Non-Final Office Action mailed on Sep. 4, 2019, issued in connection with U.S. Appl. No. 16/213,552, filed Dec. 7, 2018, 16 pages.
Non-Final Office Action mailed on Jul. 5, 2017, issued in connection with U.S. Appl. No. 14/481,522, filed Sep. 9, 2014, 8 pages.
Non-Final Office Action mailed on Jul. 6, 2016, issued in connection with U.S. Appl. No. 15/070,160, filed Mar. 15, 2016, 6 pages.
Non-Final Office Action mailed on Jun. 6, 2018, issued in connection with U.S. Appl. No. 15/005,496, filed Jan. 25, 2016, 16 pages.
Non-Final Office Action mailed on Oct. 6, 2016, issued in connection with U.S. Appl. No. 14/678,263, filed Apr. 3, 2015, 30 pages.
Non-Final Office Action mailed on Dec. 7, 2015, issued in connection with U.S. Appl. No. 14/921,762, filed Oct. 23, 2015, 5 pages.
Non-Final Office Action mailed on Jul. 7, 2016, issued in connection with U.S. Appl. No. 15/066,049, filed Mar. 10, 2016, 6 pages.
Non-Final Office Action mailed on Mar. 7, 2017, issued in connection with U.S. Appl. No. 14/481,514, filed Sep. 9, 2014, 24 pages.
Non-Final Office Action mailed on Sep. 7, 2016, issued in connection with U.S. Appl. No. 14/826,873, filed Aug. 14, 2015, 12 pages.
Non-Final Office Action mailed on Jul. 8, 2016, issued in connection with U.S. Appl. No. 15/066,072, filed Mar. 10, 2016, 6 pages.
Non-Final Office Action mailed on Dec. 9, 2016, issued in connection with U.S. Appl. No. 14/678,248, filed Apr. 3, 2015, 22 pages.
Non-Final Office Action mailed on Apr. 10, 2018, issued in connection with U.S. Appl. No. 15/909,529, filed Mar. 1, 2018, 8 pages.
Non-Final Office Action mailed on Mar. 10, 2017, issued in connection with U.S. Appl. No. 14/997,868, filed Jan. 18, 2016, 10 pages.
Non-Final Office Action mailed on Sep. 10, 2018, issued in connection with U.S. Appl. No. 15/056,553, filed Feb. 29, 2016, 8 pages.
Non-Final Office Action mailed on Apr. 11, 2017, issued in connection with U.S. Appl. No. 15/088,994, filed Apr. 1, 2016, 13 pages.
Non-Final Office Action mailed on Apr. 11, 2017, issued in connection with U.S. Appl. No. 15/089,004, filed Apr. 1, 2016, 9 pages.
Non-Final Office Action mailed on Dec. 11, 2019, issued in connection with U.S. Appl. No. 16/556,297, filed Aug. 30, 2019, 9 pages.
Non-Final Office Action mailed on Dec. 11, 2019, issued in connection with U.S. Appl. No. 16/658,896, filed Oct. 21, 2019, 14 pages.
Non-Final Office Action mailed on Feb. 11, 2021, issued in connection with U.S. Appl. No. 17/104,466, filed Nov. 25, 2020, 39 pages.
Non-Final Office Action mailed on May 11, 2023, issued in connection with U.S. Appl. No. 17/458,673, filed Aug. 27, 2021, 18 pages.
Non-Final Office Action mailed on Oct. 11, 2017, issued in connection with U.S. Appl. No. 15/480,265, filed Apr. 5, 2017, 8 pages.

(56) References Cited

OTHER PUBLICATIONS

Non-Final Office Action mailed on Oct. 11, 2018, issued in connection with U.S. Appl. No. 15/856,791, filed Dec. 28, 2017, 13 pages.
Non-Final Office Action mailed on Mar. 12, 2020, issued in connection with U.S. Appl. No. 16/796,496, filed Feb. 20, 2020, 13 pages.
Non-Final Office Action mailed on Sep. 12, 2016, issued in connection with U.S. Appl. No. 14/811,587, filed Jul. 28, 2015, 24 pages.
Non-Final Office Action mailed on Aug. 13, 2021, issued in connection with U.S. Appl. No. 16/994,874, filed Aug. 17, 2020, 10 pages.
Notice of Allowance mailed on Apr. 10, 2015, issued in connection with U.S. Appl. No. 13/536,493, filed Jun. 28, 2012, 8 pages.
Notice of Allowance mailed on Aug. 10, 2018, issued in connection with U.S. Appl. No. 15/785,088, filed Oct. 16, 2017, 6 pages.
Notice of Allowance mailed on Jan. 10, 2024, issued in connection with U.S. Appl. No. 18/069,042, filed Dec. 20, 2022, 18 pages.
Notice of Allowance mailed on Jul. 10, 2018, issued in connection with U.S. Appl. No. 15/673,170, filed Aug. 9, 2017, 2 pages.
Notice of Allowance mailed on Jun. 10, 2020, issued in connection with U.S. Appl. No. 16/713,858, filed Dec. 13, 2019, 8 pages.
Notice of Allowance mailed on Dec. 11, 2018, issued in connection with U.S. Appl. No. 15/909,327, filed Mar. 1, 2018, 10 pages.
Notice of Allowance mailed on Feb. 11, 2019, issued in connection with U.S. Appl. No. 15/588,186, filed May 5, 2017, 5 pages.
Notice of Allowance mailed on Jul. 11, 2017, issued in connection with U.S. Appl. No. 14/678,248, filed Apr. 3, 2015, 11 pages.
Notice of Allowance mailed on Mar. 11, 2015, issued in connection with U.S. Appl. No. 13/340,126, filed Dec. 29, 2011, 7 pages.
Notice of Allowance mailed on May 11, 2023, issued in connection with U.S. Appl. No. 17/804,372, filed May 27, 2022, 8 pages.
Notice of Allowance mailed on Apr. 12, 2016, issued in connection with U.S. Appl. No. 14/681,465, filed Apr. 8, 2015, 13 pages.
Notice of Allowance mailed on Apr. 12, 2024, issued in connection with U.S. Appl. No. 18/358,710, filed Jul. 25, 2023, 9 pages.
Notice of Allowance mailed on Aug. 12, 2019, issued in connection with U.S. Appl. No. 16/416,648, filed May 20, 2019, 7 pages.
Notice of Allowance mailed on Dec. 12, 2016, issued in connection with U.S. Appl. No. 14/805,140, filed Jul. 21, 2015, 24 pages.
Notice of Allowance mailed on Dec. 12, 2017, issued in connection with U.S. Appl. No. 14/481,505, filed Sep. 9, 2014, 9 pages.
Notice of Allowance mailed on Jan. 12, 2022, issued in connection with U.S. Appl. No. 16/994,627, filed Aug. 16, 2020, 7 pages.
Notice of Allowance mailed on Nov. 12, 2019, issued in connection with U.S. Appl. No. 15/955,545, filed Apr. 17, 2018, 9 pages.
Notice of Allowance mailed on Sep. 12, 2016, issued in connection with U.S. Appl. No. 15/066,072, filed Mar. 10, 2016, 7 pages.
Notice of Allowance mailed on Sep. 12, 2017, issued in connection with U.S. Appl. No. 15/207,682, filed Jul. 12, 2016, 8 pages.
Notice of Allowance mailed on Apr. 13, 2020, issued in connection with U.S. Appl. No. 16/181,865, filed Nov. 6, 2018, 10 pages.
Notice of Allowance mailed on Apr. 13, 2023, issued in connection with U.S. Appl. No. 18/058,639, filed Nov. 23, 2022, 15 pages.
Notice of Allowance mailed on Feb. 13, 2017, issued in connection with U.S. Appl. No. 14/864,506, filed Sep. 24, 2015, 8 pages.
Notice of Allowance mailed on Feb. 13, 2023, issued in connection with U.S. Appl. No. 17/543,430, filed Dec. 6, 2021, 10 pages.
Notice of Allowance mailed on Jul. 13, 2022, issued in connection with U.S. Appl. No. 17/033,821, filed Sep. 27, 2020, 8 pages.
Notice of Allowance mailed on Nov. 13, 2017, issued in connection with U.S. Appl. No. 14/726,921, filed Jun. 1, 2015, 8 pages.
Notice of Allowance mailed on Sep. 13, 2023, issued in connection with U.S. Appl. No. 17/543,014, filed Dec. 6, 2021, 9 pages.
Notice of Allowance mailed on Jul. 14, 2020, issued in connection with U.S. Appl. No. 16/556,297, filed Aug. 30, 2019, 11 pages.
Notice of Allowance mailed on Jun. 14, 2023, issued in connection with U.S. Appl. No. 17/816,238, filed Jul. 29, 2022, 11 pages.
Notice of Allowance mailed on Mar. 14, 2019, issued in connection with U.S. Appl. No. 15/343,996, filed Nov. 4, 2016, 8 pages.
Notice of Allowance mailed on Oct. 14, 2021, issued in connection with U.S. Appl. No. 16/115,525, filed Aug. 28, 2018, 5 pages.
Notice of Allowance mailed on Jan. 15, 2019, issued in connection with U.S. Appl. No. 16/115,524, filed Aug. 28, 2018, 8 pages.
Notice of Allowance mailed on Jun. 15, 2017, issued in connection with U.S. Appl. No. 15/096,827, filed Apr. 12, 2016, 5 pages.
Notice of Allowance mailed on Mar. 15, 2017, issued in connection with U.S. Appl. No. 14/826,856, filed Aug. 14, 2015, 7 pages.
Notice of Allowance mailed on May 15, 2019, issued in connection with U.S. Appl. No. 16/113,032, filed Aug. 27, 2018, 9 pages.
Notice of Allowance mailed on Nov. 15, 2021, issued in connection with U.S. Appl. No. 16/994,874, filed Aug. 17, 2020, 9 pages.
Notice of Allowance mailed on Oct. 15, 2018, issued in connection with U.S. Appl. No. 15/716,313, filed Sep. 26, 2017, 10 pages.
Notice of Allowance mailed on Sep. 15, 2022, issued in connection with U.S. Appl. No. 17/033,818, filed Sep. 27, 2020, 7 pages.
Notice of Allowance mailed on Feb. 16, 2022, issued in connection with U.S. Appl. No. 16/919,467, filed Jul. 2, 2020, 9 pages.
Notice of Allowance mailed on Jan. 16, 2024, issued in connection with U.S. Appl. No. 17/810,549, filed Jul. 1, 2022, 7 pages.
Notice of Allowance mailed on Jul. 16, 2020, issued in connection with U.S. Appl. No. 16/530,324, filed Aug. 2, 2019, 9 pages.
Notice of Allowance mailed on Jun. 16, 2017, issued in connection with U.S. Appl. No. 14/884,001, filed Oct. 15, 2015, 8 pages.
Notice of Allowance mailed on May 16, 2019, issued in connection with U.S. Appl. No. 16/181,213, filed Nov. 5, 2018, 10 pages.
Notice of Allowance mailed on Oct. 16, 2017, issued in connection with U.S. Appl. No. 15/478,770, filed Apr. 4, 2017, 10 pages.
Notice of Allowance mailed on Oct. 16, 2019, issued in connection with U.S. Appl. No. 16/401,981, filed May 2, 2019, 8 pages.
Notice of Allowance mailed on Sep. 16, 2016, issued in connection with U.S. Appl. No. 15/066,049, filed Mar. 10, 2016, 7 pages.
Notice of Allowance mailed on Aug. 17, 2022, issued in connection with U.S. Appl. No. 17/316,371, filed May 10, 2021, 9 pages.
Notice of Allowance mailed on Dec. 17, 2018, issued in connection with U.S. Appl. No. 16/055,884, filed Aug. 6, 2018, 5 pages.
Notice of Allowance mailed on May 17, 2017, issued in connection with U.S. Appl. No. 15/339,260, filed Oct. 31, 2016, 7 pages.
Notice of Allowance mailed on Oct. 25, 2016, issued in connection with U.S. Appl. No. 14/826,873, filed Aug. 14, 2015, 5 pages.
Notice of Allowance mailed on Apr. 26, 2023, issued in connection with U.S. Appl. No. 18/058,667, filed Nov. 23, 2022, 8 pages.
Notice of Allowance mailed on Dec. 26, 2023, issued in connection with U.S. Appl. No. 18/066,077, filed Dec. 14, 2022, 6 pages.
Notice of Allowance mailed on Feb. 26, 2016, issued in connection with U.S. Appl. No. 14/921,762, filed Oct. 23, 2015, 7 pages.
Notice of Allowance mailed on Jul. 26, 2016, issued in connection with U.S. Appl. No. 14/481,511, filed Sep. 9, 2014, 12 pages.
Notice of Allowance mailed on Oct. 26, 2016, issued in connection with U.S. Appl. No. 14/811,587, filed Jul. 28, 2015, 11 pages.
Notice of Allowance mailed on Feb. 27, 2017, issued in connection with U.S. Appl. No. 14/805,340, filed Jul. 21, 2015, 9 pages.
Notice of Allowance mailed on Feb. 27, 2023, issued in connection with U.S. Appl. No. 17/107,157, filed Nov. 30, 2020, 13 pages.
Notice of Allowance mailed on Jul. 27, 2017, issued in connection with U.S. Appl. No. 15/005,853, filed Jan. 25, 2016, 5 pages.
Notice of Allowance mailed on Jun. 27, 2017, issued in connection with U.S. Appl. No. 15/344,069, filed Nov. 4, 2016, 8 pages.
Notice of Allowance mailed on Oct. 27, 2020, issued in connection with U.S. Appl. No. 16/555,832, filed Aug. 29, 2019, 5 pages.
Notice of Allowance mailed on Oct. 27, 2021, issued in connection with U.S. Appl. No. 17/135,293, filed Dec. 28, 2020, 11 pages.
Notice of Allowance mailed on Aug. 28, 2017, issued in connection with U.S. Appl. No. 15/089,004, filed Apr. 1, 2016, 5 pages.
Notice of Allowance mailed on Jul. 28, 2017, issued in connection with U.S. Appl. No. 14/678,263, filed Apr. 3, 2015, 10 pages.
Notice of Allowance mailed on Jul. 28, 2017, issued in connection with U.S. Appl. No. 15/211,822, filed Jul. 15, 2016, 9 pages.
Notice of Allowance mailed on Jun. 28, 2023, issued in connection with U.S. Appl. No. 18/189,876, filed Mar. 24, 2023, 20 pages.

(56) References Cited

OTHER PUBLICATIONS

Notice of Allowance mailed on Mar. 28, 2018, issued in connection with U.S. Appl. No. 15/673,170, filed Aug. 9, 2017, 5 pages.
Notice of Allowance mailed on Mar. 28, 2023, issued in connection with U.S. Appl. No. 18/058,659, filed Nov. 23, 2022, 10 pages.
Notice of Allowance mailed on Aug. 29, 2018, issued in connection with U.S. Appl. No. 15/357,520, filed Nov. 21, 2016, 11 pages.
Notice of Allowance mailed on Aug. 29, 2018, issued in connection with U.S. Appl. No. 15/718,556, filed Sep. 28, 2017, 8 pages.
Notice of Allowance mailed on Aug. 29, 2019, issued in connection with U.S. Appl. No. 16/185,906, filed Nov. 9, 2018, 8 pages.
Notice of Allowance mailed on Aug. 29, 2023, issued in connection with U.S. Appl. No. 17/804,372, filed May 27, 2022, 9 pages.
Notice of Allowance mailed on Dec. 29, 2017, issued in connection with U.S. Appl. No. 14/793,205, filed Jul. 7, 2015, 5 pages.
Notice of Allowance mailed on Jul. 29, 2016, issued in connection with U.S. Appl. No. 14/481,522, filed Sep. 9, 2014, 11 pages.
Notice of Allowance mailed on Mar. 29, 2023, issued in connection with U.S. Appl. No. 17/807,595, filed Jun. 17, 2022, 6 pages.
Notice of Allowance mailed on Oct. 29, 2015, issued in connection with U.S. Appl. No. 14/216,306, filed Mar. 17, 2014, 9 pages.
Notice of Allowance mailed on Sep. 29, 2021, issued in connection with U.S. Appl. No. 17/207,640, filed Mar. 20, 2021, 13 pages.
Notice of Allowance mailed on Mar. 3, 2021, issued in connection with U.S. Appl. No. 16/403,077, filed May 3, 2019, 6 pages.
Notice of Allowance mailed on Mar. 3, 2021, issued in connection with U.S. Appl. No. 17/078,382, filed Oct. 23, 2020, 9 pages.
Notice of Allowance mailed on Mar. 3, 2022, issued in connection with U.S. Appl. No. 17/135,308, filed Dec. 28, 2020, 7 pages.
Notice of Allowance mailed on May 3, 2019, issued in connection with U.S. Appl. No. 15/217,399, filed Jul. 22, 2016, 7 pages.
Notice of Allowance mailed on May 3, 2019, issued in connection with U.S. Appl. No. 16/181,583, filed Nov. 6, 2018, 7 pages.
Notice of Allowance mailed on Aug. 30, 2017, issued in connection with U.S. Appl. No. 15/088,994, filed Apr. 1, 2016, 10 pages.
Notice of Allowance mailed on Dec. 30, 2016, issued in connection with U.S. Appl. No. 14/696,014, filed Apr. 24, 2015, 13 pages.
Notice of Allowance mailed on Jan. 30, 2017, issued in connection with U.S. Appl. No. 15/339,260, filed Oct. 31, 2016, 8 pages.
Notice of Allowance mailed on Aug. 31, 2018, issued in connection with U.S. Appl. No. 15/872,979, filed Jan. 16, 2018, 7 pages.
Notice of Allowance mailed on Aug. 31, 2018, issued in connection with U.S. Appl. No. 16/055,884, filed Aug. 6, 2018, 8 pages.
Notice of Allowance mailed on Aug. 31, 2021, issued in connection with U.S. Appl. No. 16/944,884, filed Jul. 31, 2020, 8 pages.
Notice of Allowance mailed on Mar. 31, 2020, issued in connection with U.S. Appl. No. 16/538,629, filed Aug. 12, 2019, 9 pages.
Notice of Allowance mailed on Apr. 4, 2017, issued in connection with U.S. Appl. No. 14/682,182, filed Apr. 9, 2015, 8 pages.
Notice of Allowance mailed on Feb. 4, 2019, issued in connection with U.S. Appl. No. 15/166,241, filed Aug. 26, 2016, 8 pages.
Notice of Allowance mailed on Feb. 4, 2019, issued in connection with U.S. Appl. No. 16/181,583, filed Nov. 6, 2018, 9 pages.
Notice of Allowance mailed on Feb. 4, 2020, issued in connection with U.S. Appl. No. 16/416,619, filed May 20, 2019, 7 pages.
Notice of Allowance mailed on Oct. 4, 2018, issued in connection with U.S. Appl. No. 15/166,241, filed May 26, 2016, 7 pages.
Notice of Allowance mailed on Apr. 5, 2018, issued in connection with U.S. Appl. No. 15/681,640, filed Aug. 21, 2017, 8 pages.
Notice of Allowance mailed on Apr. 5, 2023, issued in connection with U.S. Appl. No. 17/562,465, filed Dec. 27, 2021, 10 pages.
Notice of Allowance mailed on Feb. 5, 2021, issued in connection with U.S. Appl. No. 16/827,143, filed Mar. 23, 2020, 9 pages.
Notice of Allowance mailed on Jun. 5, 2019, issued in connection with U.S. Appl. No. 15/859,311, filed Dec. 29, 2017, 8 pages.
Notice of Allowance mailed on Jun. 5, 2019, issued in connection with U.S. Appl. No. 15/865,221, filed Jan. 8, 2018, 8 pages.
Notice of Allowance mailed on Mar. 5, 2019, issued in connection with U.S. Appl. No. 16/102,499, filed Aug. 13, 2018, 8 pages.
Advisory Action mailed on Jul. 1, 2019, issued in connection with U.S. Appl. No. 15/229,693, filed Aug. 5, 2016, 2 pages.
Advisory Action mailed on Jul. 10, 2018, issued in connection with U.S. Appl. No. 15/056,553, filed Feb. 29, 2016, 3 pages.
Advisory Action mailed on Dec. 11, 2020, issued in connection with U.S. Appl. No. 15/005,496, filed Jan. 25, 2016, 3 pages.
Advisory Action mailed on Jul. 12, 2018, issued in connection with U.S. Appl. No. 15/166,241, filed May 26, 2016, 3 pages.
Advisory Action mailed on Jul. 12, 2018, issued in connection with U.S. Appl. No. 15/235,598, filed Aug. 12, 2016, 3 pages.
Advisory Action mailed on Aug. 16, 2017, issued in connection with U.S. Appl. No. 14/481,505, filed Sep. 9, 2014, 3 pages.
Advisory Action mailed on Jun. 19, 2018, issued in connection with U.S. Appl. No. 15/229,693, filed Aug. 5, 2016, 3 pages.
Advisory Action mailed on Sep. 19, 2017, issued in connection with U.S. Appl. No. 14/726,921, filed Jun. 1, 2015, 3 pages.
Advisory Action mailed on Nov. 22, 2021, issued in connection with U.S. Appl. No. 16/919,467, filed Jul. 2, 2020, 4 pages.
Advisory Action mailed on Apr. 24, 2024, issued in connection with U.S. Appl. No. 17/807,270, filed Jun. 16, 2022, 3 pages.
Advisory Action mailed on Jun. 3, 2020, issued in connection with U.S. Appl. No. 16/115,525, filed Aug. 28, 2018, 3 pages.
Advisory Action mailed on Apr. 30, 2019, issued in connection with U.S. Appl. No. 15/005,496, filed Jan. 25, 2016, 3 pages.
Advisory Action mailed on Feb. 7, 2019, issued in connection with U.S. Appl. No. 15/806,126, filed Nov. 7, 2017, 3 pages.
An Overview of IEEE 1451.4 Transducer Electronic Data Sheets (TEDS) National Instruments, 19 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
"AuEQ for the iPhone," Mar. 25, 2015, retrieved from the internet: URL:https://web.archive.org/web20150325152629/ http://www.hotto.de/mobileapps/iphoneaueq.html [retrieved on Jun. 24, 2016], 6 pages.
"AV Amplifier DSP-Z7", Yamaha, 2008 [retrieved on Jan. 3, 2022]. Retrieved from the Internet: URL: https://de.yamaha.com/files/download/other_assets/6/318616/DSP-Z7_en.pdf, pp. 1-154.
BeoLab5 User Manual. Bang Olufsen. Version 1.0, 20 pages [produced by Google in WDTX Case No. 6:20-cv-00881 Answer on Jan. 8, 2021].
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Burger, Dennis, "Automated Room Correction Explained," hometheaterreview.com, Nov. 18, 2013, http://hometheaterreview.com/automated-room-correction-explained/ Retrieved Oct. 10, 2014, 3 pages.
Canadian Patent Office, Canadian Examination Report mailed on Oct. 13, 2023, issued in connection with Canadian Application No. 3148021, 8 pages.
Chen, Trista P. et al. VRAPS: Visual Rhythm-Based Audio Playback System. IEEE, Gracenote, Inc., 2010, pp. 721-722.
Chinese Patent Office, Chinese Office Action and Translation mailed on Apr. 1, 2021, issued in connection with Chinese Application No. 201910395715.4, 8 pages.
Chinese Patent Office, First Office Action and Translation mailed on Nov. 3, 2021, issued in connection with Chinese Application No. 202011278502.2, 10 pages.
Chinese Patent Office, First Office Action and Translation mailed on Jun. 19, 2019, issued in connection with Chinese Application No. 201680054189.X, 11 pages.
Chinese Patent Office, First Office Action and Translation mailed on Feb. 22, 2021, issued in connection with Chinese Application No. 202010187024.8, 11 pages.
Chinese Patent Office, First Office Action and Translation mailed on Dec. 24, 2020, issued in connection with Chinese Application No. 201910978233.1, 15 pages.
Chinese Patent Office, First Office Action and Translation mailed on Jan. 28, 2021, issued in connection with Chinese Application No. 201680054164.X, 19 pages.

(56) References Cited

OTHER PUBLICATIONS

Chinese Patent Office, First Office Action and Translation mailed on Jun. 29, 2020, issued in connection with Chinese Application No. 201780057093.3, 11 pages.
Chinese Patent Office, First Office Action and Translation mailed on Feb. 3, 2021, issued in connection with Chinese Application No. 202010095178.4, 15 pages.
Chinese Patent Office, First Office Action and Translation mailed on Aug. 4, 2020, issued in connection with Chinese Application No. 201910395715.4, 22 pages.
Chinese Patent Office, First Office Action mailed on Aug. 11, 2017, issued in connection with Chinese Patent Application No. 201580013837.2, 8 pages.
Chinese Patent Office, First Office Action mailed on Nov. 20, 2018, issued in connection with Chinese Application No. 201580047998.3, 21 pages.
Chinese Patent Office, First Office Action mailed on Sep. 25, 2017, issued in connection with Chinese Patent Application No. 201580013894.0, 9 pages.
Chinese Patent Office, First Office Action mailed on Nov. 5, 2018, issued in connection with Chinese Application No. 201680044080.8, 5 pages.
Chinese Patent Office, Office Action mailed on Nov. 14, 2019, issued in connection with Chinese Application No. 201680040086.8, 9 pages.
Chinese Patent Office, Second Office Action and Translation mailed on Aug. 26, 2019, issued in connection with Chinese Application No. 201580047998.3, 25 pages.
Chinese Patent Office, Second Office Action mailed on Jan. 11, 2019, issued in connection with Chinese Application No. 201680044080.8, 4 pages.
Chinese Patent Office, Second Office Action mailed on Feb. 3, 2019, issued in connection with Chinese Application No. 201580048594.6, 11 pages.
Chinese Patent Office, Second Office Action mailed on May 6, 2020, issued in connection with Chinese Application No. 201680040086.8, 3 pages.
Chinese Patent Office, Second Office Action with Translation mailed on Jan. 9, 2018, issued in connection with Chinese Patent Application No. 201580013837.2, 10 pages.
Chinese Patent Office, Third Office Action mailed on Apr. 11, 2019, issued in connection with Chinese Application No. 201580048594.6, 4 pages.
"Constellation Acoustic System: a revolutionary breakthrough in acoustical design," Meyer Sound Laboratories, Inc. 2012, 32 pages.
"Constellation Microphones," Meyer Sound Laboratories, Inc. 2013, 2 pages.
Corrected Notice of Allowability mailed on Jan. 19, 2017, issued in connection with U.S. Appl. No. 14/826,873, filed Aug. 14, 2015, 11 pages.
Daddy, B., "Calibrating Your Audio with a Sound Pressure Level (SPL) Meter," Blue-ray.com, Feb. 22, 2008 Retrieved Oct. 10, 2014, 15 pages.
Dell, Inc. "Dell Digital Audio Receiver: Reference Guide," Jun. 2000, 70 pages.
Notice of Allowance mailed on Oct. 17, 2019, issued in connection with U.S. Appl. No. 16/542,433, filed Aug. 16, 2019, 9 pages.
Notice of Allowance mailed on Aug. 18, 2022, issued in connection with U.S. Appl. No. 17/660,185, filed Apr. 21, 2022, 11 pages.
Notice of Allowance mailed on Jan. 18, 2024, issued in connection with U.S. Appl. No. 18/352,394, filed Jul. 14, 2023, 7 pages.
Notice of Allowance mailed on Mar. 18, 2019, issued in connection with U.S. Appl. No. 16/056,862, filed Aug. 7, 2018, 12 pages.
Notice of Allowance mailed on Mar. 18, 2021, issued in connection with U.S. Appl. No. 15/005,496, filed Jan. 25, 2016, 8 pages.
Notice of Allowance mailed on Oct. 18, 2021, issued in connection with U.S. Appl. No. 16/570,679, filed Sep. 13, 2019, 9 pages.
Notice of Allowance mailed on Apr. 19, 2023, issued in connection with U.S. Appl. No. 17/113,799, filed Dec. 7, 2020, 7 pages.
Notice of Allowance mailed on Aug. 19, 2016, issued in connection with U.S. Appl. No. 14/644,136, filed Mar. 10, 2015, 12 pages.
Notice of Allowance mailed on Jan. 19, 2022, issued in connection with U.S. Appl. No. 17/399,294, filed Aug. 11, 2021, 11 pages.
Notice of Allowance mailed on Jun. 19, 2017, issued in connection with U.S. Appl. No. 14/793,190, filed Jul. 7, 2015, 5 pages.
Notice of Allowance mailed on Sep. 19, 2017, issued in connection with U.S. Appl. No. 14/793,205, filed Jul. 7, 2015, 16 pages.
Notice of Allowance mailed on Sep. 19, 2018, issued in connection with U.S. Appl. No. 14/864,393, filed Sep. 24, 2015, 10 pages.
Notice of Allowance mailed on Feb. 2, 2022, issued in connection with U.S. Appl. No. 16/949,951, filed Nov. 20, 2020, 8 pages.
Notice of Allowance mailed on Mar. 2, 2020, issued in connection with U.S. Appl. No. 16/213,552, filed Dec. 7, 2018, 9 pages.
Notice of Allowance mailed on Oct. 2, 2023, issued in connection with U.S. Appl. No. 18/189,869, filed Mar. 24, 2023, 8 pages.
Notice of Allowance mailed on Sep. 2, 2021, issued in connection with U.S. Appl. No. 17/357,302, filed Jun. 24, 2021, 10 pages.
Notice of Allowance mailed on Apr. 20, 2017, issued in connection with U.S. Appl. No. 14/940,779, filed Nov. 13, 2015, 11 pages.
Notice of Allowance mailed on Apr. 20, 2022, issued in connection with U.S. Appl. No. 17/098,134, filed Nov. 13, 2020, 5 pages.
Notice of Allowance mailed on Nov. 20, 2017, issued in connection with U.S. Appl. No. 15/298,115, filed Oct. 19, 2016, 10 pages.
Notice of Allowance mailed on Sep. 20, 2017, issued in connection with U.S. Appl. No. 14/481,514, filed Sep. 9, 2014, 10 pages.
Notice of Allowance mailed on Dec. 21, 2016, issued in connection with U.S. Appl. No. 14/682,182, filed Apr. 9, 2015, 8 pages.
Notice of Allowance mailed on Feb. 21, 2018, issued in connection with U.S. Appl. No. 15/005,853, filed Jan. 25, 2016, 5 pages.
Notice of Allowance mailed on Jul. 21, 2017, issued in connection with U.S. Appl. No. 15/211,835, filed Jul. 15, 2016, 10 pages.
Notice of Allowance mailed on Jun. 21, 2019, issued in connection with U.S. Appl. No. 15/235,598, filed Aug. 12, 2016, 11 pages.
Notice of Allowance mailed on Oct. 21, 2019, issued in connection with U.S. Appl. No. 16/182,886, filed Nov. 7, 2018, 10 pages.
Notice of Allowance mailed on Sep. 21, 2023, issued in connection with U.S. Appl. No. 17/567,311, filed Jan. 3, 2022, 8 pages.
Notice of Allowance mailed on Apr. 22, 2021, issued in connection with U.S. Appl. No. 16/812,618, filed Mar. 9, 2020, 12 pages.
Notice of Allowance mailed on Feb. 22, 2021, issued in connection with U.S. Appl. No. 16/944,884, filed Jul. 31, 2020, 9 pages.
Notice of Allowance mailed on Jun. 22, 2017, issued in connection with U.S. Appl. No. 14/644,136, filed Mar. 10, 2015, 12 pages.
Notice of Allowance mailed on Jun. 22, 2023, issued in connection with U.S. Appl. No. 17/407,793, filed Aug. 20, 2021, 10 pages.
Notice of Allowance mailed on Mar. 22, 2023, issued in connection with U.S. Appl. No. 17/662,282, filed May 6, 2022, 5 pages.
Notice of Allowance mailed on Aug. 23, 2018, issued in connection with U.S. Appl. No. 15/909,529, filed Mar. 1, 2018, 8 pages.
Notice of Allowance mailed on Aug. 23, 2023, issued in connection with U.S. Appl. No. 18/308,016, filed Apr. 27, 2023, 13 pages.
Notice of Allowance mailed on Feb. 23, 2021, issued in connection with U.S. Appl. No. 16/115,525, filed Aug. 28, 2018, 8 pages.
Notice of Allowance mailed on Jun. 23, 2016, issued in connection with U.S. Appl. No. 14/921,781, filed Oct. 23, 2015, 8 pages.
Notice of Allowance mailed on Mar. 23, 2020, issued in connection with U.S. Appl. No. 16/542,418, filed Aug. 16, 2019, 5 pages.
Notice of Allowance mailed on May 23, 2018, issued in connection with U.S. Appl. No. 15/698,283, filed Sep. 7, 2017, 8 pages.
Notice of Allowance mailed on Nov. 23, 2020, issued in connection with U.S. Appl. No. 16/403,077, filed May 3, 2019, 6 pages.
Notice of Allowance mailed on Oct. 23, 2017, issued in connection with U.S. Appl. No. 14/481,522, filed Sep. 9, 2014, 16 pages.
Notice of Allowance mailed on Oct. 23, 2020, issued in connection with U.S. Appl. No. 16/555,846, filed Aug. 29, 2019, 5 pages.
Notice of Allowance mailed on Sep. 23, 2016, issued in connection with U.S. Appl. No. 15/070,160, filed Mar. 15, 2016, 7 pages.
Notice of Allowance mailed on Sep. 23, 2022, issued in connection with U.S. Appl. No. 17/373,179, filed Jul. 12, 2021, 5 pages.
Notice of Allowance mailed on Jul. 24, 2019, issued in connection with U.S. Appl. No. 15/229,693, filed Aug. 5, 2016, 13 pages.

(56) References Cited

OTHER PUBLICATIONS

Notice of Allowance mailed on Jul. 24, 2020, issued in connection with U.S. Appl. No. 16/665,415, filed Oct. 28, 2019, 12 pages.
Notice of Allowance mailed on May 24, 2017, issued in connection with U.S. Appl. No. 14/997,868, filed Jan. 18, 2016, 5 pages.
Notice of Allowance mailed on Nov. 24, 2017, issued in connection with U.S. Appl. No. 15/681,640, filed Aug. 21, 2017, 8 pages.
Notice of Allowance mailed on Apr. 25, 2017, issued in connection with U.S. Appl. No. 14/696,014, filed Apr. 24, 2015, 7 pages.
Notice of Allowance mailed on Apr. 25, 2017, issued in connection with U.S. Appl. No. 15/207,682, filed Jul. 12, 2016, 7 pages.
Notice of Allowance mailed on Apr. 25, 2019, issued in connection with U.S. Appl. No. 15/806,126, filed Nov. 7, 2017, 8 pages.
Notice of Allowance mailed on Jan. 25, 2021, issued in connection with U.S. Appl. No. 17/129,670, filed Dec. 21, 2020, 10 pages.
Japanese Patent Office, Office Action and Translation mailed on Oct. 8, 2024, issued in connection with Japanese Patent Application No. 2023-118922, 9 pages.
Korean Patent Office, Korean Examination Report and Translation mailed on Jul. 17, 2024, issued in connection with Korean Application No. 10-2022-7024007, 10 pages.
Korean Patent Office, Korean Examination Report and Translation mailed on Aug. 5, 2024, issued in connection with Korean Application No. 10-2023-7031855, 10 pages.
Korean Patent Office, Korean Examination Report and Translation mailed on Nov. 6, 2024, issued in connection with Korean Application No. 10-2023-7032988, 13 pages.
Korean Patent Office, Korean Office Action and Translation mailed on Oct. 20, 2024, issued in connection with Korean Application No. 10-2023-7036702, 22 pages.
Non-Final Office Action mailed on Mar. 3, 2025, issued in connection with U.S. Appl. No. 18/308,087, filed Apr. 27, 2023, 25 pages.
Non-Final Office Action mailed on Jul. 11, 2024, issued in connection with U.S. Appl. No. 18/313,013, filed May 5, 2023, 18 pages.
Non-Final Office Action mailed on Feb. 12, 2025, issued in connection with U.S. Appl. No. 18/189,863, filed Mar. 24, 2023, 28 pages.
Non-Final Office Action mailed on Aug. 15, 2024, issued in connection with U.S. Appl. No. 18/323,039, filed May 24, 2023, 09 pages.
Non-Final Office Action mailed on Aug. 15, 2024, issued in connection with U.S. Appl. No. 18/487,290, filed Oct. 16, 2023, 13 pages.
Non-Final Office Action mailed on Sep. 17, 2024, issued in connection with U.S. Appl. No. 18/449,388, filed Aug. 14, 2023, 22 pages.
Non-Final Office Action mailed on Feb. 18, 2025, issued in connection with U.S. Appl. No. 18/600,044, filed Mar. 8, 2024, 28 pages.
Non-Final Office Action mailed on Jun. 20, 2024, issued in connection with U.S. Appl. No. 18/007,415, filed Jan. 30, 2023, 12 pages.
Non-Final Office Action mailed on Jun. 20, 2024, issued in connection with U.S. Appl. No. 18/520,336, filed Nov. 27, 2023, 20 pages.
Non-Final Office Action mailed on Mar. 20, 2025, issued in connection with U.S. Appl. No. 19/028,592, filed Jun. 21, 2023, 33 pages.
Non-Final Office Action mailed on May 20, 2024, issued in connection with U.S. Appl. No. 18/600,044, filed Mar. 8, 2024, 24 pages.
Non-Final Office Action mailed on Mar. 21, 2025, issued in connection with U.S. Appl. No. 19/029,744, filed Jan. 17, 2025, 26 pages.
Non-Final Office Action mailed on Nov. 22, 2024, issued in connection with U.S. Appl. No. 18/308,065, filed Apr. 27, 2023, 15 pages.
Non-Final Office Action mailed on Feb. 26, 2025, issued in connection with U.S. Appl. No. 18/657,019, filed May 7, 2024, 27 pages.
Non-Final Office Action mailed on Nov. 26, 2024, issued in connection with U.S. Appl. No. 18/424,041, filed Jan. 26, 2024, 07 pages.
Non-Final Office Action mailed on Feb. 27, 2025, issued in connection with U.S. Appl. No. 18/487,290, filed Oct. 16, 2023, 14 pages.
Non-Final Office Action mailed on Sep. 29, 2024, issued in connection with U.S. Appl. No. 18/356,477, filed Jul. 21, 2023, 26 pages.
Non-Final Office Action mailed on Sep. 29, 2024, issued in connection with U.S. Appl. No. 18/440,111, filed Feb. 13, 2024, 25 pages.
Non-Final Office Action mailed on Jul. 30, 2024, issued in connection with U.S. Appl. No. 17/994,577, filed Nov. 28, 2022, 13 pages.
Non-Final Office Action mailed on Aug. 6, 2024, issued in connection with U.S. Appl. No. 18/313,859, filed May 8, 2023, 20 pages.
Non-Final Office Action mailed on Aug. 7, 2024, issued in connection with U.S. Appl. No. 18/502,644, filed Nov. 6, 2023, 31 pages.
Non-Final Office Action mailed on Aug. 8, 2024, issued in connection with U.S. Appl. No. 18/463,827, filed Sep. 8, 2023, 7 pages.
Non-Final Office Action mailed on Jul. 8, 2024, issued in connection with U.S. Appl. No. 18/520,531, filed Nov. 27, 2023, 63 pages.
Notice of Allowance mailed on Aug. 1, 2025, issued in connection with U.S. Appl. No. 18/487,290, filed Oct. 16, 2023, 07 pages.
Notice of Allowance mailed on Dec. 5, 2024, issued in connection with U.S. Appl. No. 18/463,827, filed Sep. 8, 2023, 9 pages.
Notice of Allowance mailed on Aug. 7, 2024, issued in connection with U.S. Appl. No. 18/338,841, filed Jun. 21, 2023, 05 pages.
Notice of Allowance mailed on Jul. 1, 2024, issued in connection with U.S. Appl. No. 18/511,775, filed Nov. 16, 2023, 11 pages.
Notice of Allowance mailed on Jul. 10, 2024, issued in connection with U.S. Appl. No. 18/309,939, filed May 1, 2023, 5 pages.
Notice of Allowance mailed on Oct. 11, 2024, issued in connection with U.S. Appl. No. 18/351,033, filed Jul. 12, 2023, 09 pages.
Notice of Allowance mailed on Jun. 12, 2024, issued in connection with U.S. Appl. No. 17/807,270, filed Jun. 16, 2022, 10 pages.
Notice of Allowance mailed on Sep. 12, 2024, issued in connection with U.S. Appl. No. 18/432,265, filed Feb. 5, 2024, 8 pages.
Notice of Allowance mailed on Nov. 14, 2024, issued in connection with U.S. Appl. No. 18/343,487, filed Jun. 28, 2023, 12 pages.
Notice of Allowance mailed on Jan. 15, 2025, issued in connection with U.S. Appl. No. 18/449,388, filed Aug. 14, 2023, 8 pages.
Notice of Allowance mailed on Jul. 17, 2024, issued in connection with U.S. Appl. No. 18/310,025, filed May 1, 2023, 7 pages.
Notice of Allowance mailed on Jun. 18, 2024, issued in connection with U.S. Appl. No. 18/297,214, filed Apr. 7, 2023, 10 pages.
Notice of Allowance mailed on Aug. 19, 2024, issued in connection with U.S. Appl. No. 18/345,588, filed Jun. 30, 2023, 20 pages.
Notice of Allowance mailed on Jul. 19, 2024, issued in connection with U.S. Appl. No. 18/328,932, filed Jun. 5, 2023, 9 pages.
Notice of Allowance mailed on Jun. 20, 2025, issued in connection with U.S. Appl. No. 18/424,041, filed Jan. 26, 2024, 8 pages.
Notice of Allowance mailed on Nov. 21, 2024, issued in connection with U.S. Appl. No. 18/323,039, filed May 24, 2023, 07 pages.
Notice of Allowance mailed on Jul. 24, 2024, issued in connection with U.S. Appl. No. 18/456,941, filed Aug. 28, 2023, 11 pages.
Notice of Allowance mailed on Jun. 24, 2024, issued in connection with U.S. Appl. No. 18/447,075, filed Aug. 9, 2023, 11 pages.
Notice of Allowance mailed on Jul. 26, 2024, issued in connection with U.S. Appl. No. 18/408,865, filed Jan. 10, 2024, 9 pages.
Notice of Allowance mailed on Jun. 27, 2025, issued in connection with U.S. Appl. No. 18/657,019, filed May 7, 2024, 5 pages.
Notice of Allowance mailed on Aug. 28, 2024, issued in connection with U.S. Appl. No. 18/432,733, filed Feb. 5, 2024, 10 pages.
Notice of Allowance mailed on Jul. 29, 2024, issued in connection with U.S. Appl. No. 18/459,982, filed Sep. 1, 2023, 08 pages.
Notice of Allowance mailed on Jul. 3, 2024, issued in connection with U.S. Appl. No. 18/507,713, filed Nov. 13, 2023, 11 pages.
Notice of Allowance mailed on Jul. 31, 2024, issued in connection with U.S. Appl. No. 18/192,452, filed Mar. 29, 2023, 8 pages.
Notice of Allowance mailed on Jul. 31, 2024, issued in connection with U.S. Appl. No. 18/453,052, filed Aug. 21, 2023, 9 pages.

(56) References Cited

OTHER PUBLICATIONS

Notice of Allowance mailed on Aug. 7, 2024, issued in connection with U.S. Appl. No. 18/478,241, filed Sep. 29, 2023, 10 pages.
Notice of Allowance mailed on Jun. 7, 2024, issued in connection with U.S. Appl. No. 18/316,434, filed May 12, 2023, 9 pages.
PaulStamatiou., "Review: Sonos ZonePlayer S5 All-In-One Wireless Music System," PaulStamatiou.com, 2009, pp. 1-11. acquired at https://web.archive.org/web/20101127024648/https://paulstamatiou.com/review-sonos-zoneplayer-s5-all-in-one-wireless-music-system.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
The Absolute Sound., "Sonos Multi-Room Music System," 2009, pp. 1-8. Review: https://www.theabsolutesound.com/articles/sonos-multi-room-music-system/.
Bahl P., et al., "RADAR: An In-Building RF-based User Location and Tracking System," IEEE c2000, 2000, pp. 775-784.
Corrected Notice of Allowance mailed on Aug. 15, 2025, issued in connection with U.S. Appl. No. 18/487,290, filed Oct. 16, 2023, 04 pages.
European Patent Office, European Extended Search Report mailed on Aug. 2, 2025, issued in connection with European Application No. 24219860.4, 11 pages.
European Patent Office, Summons to Attend Oral Proceedings mailed on Sep. 1, 2025, issued in connection with European Application No. 21171959.6, 9 pages.
Final Office Action mailed on Oct. 2, 2025, issued in connection with U.S. Appl. No. 18/189,863, filed Mar. 24, 2023, 33 pages.
Final Office Action mailed on Aug. 6, 2025, issued in connection with U.S. Appl. No. 19/028,592, filed Jan. 17, 2025, 35 pages.
Final Office Action mailed on Oct. 7, 2025, issued in connection with U.S. Appl. No. 18/308,087, filed Apr. 27, 2023, 25 pages.
Non-Final Office Action mailed on Sep. 10, 2025, issued in connection with U.S. Appl. No. 18/356,477, filed Jul. 21, 2023, 20 pages.
Non-Final Office Action mailed on Oct. 16, 2025, issued in connection with U.S. Appl. No. 18/440,111, filed Feb. 13, 2024, 28 pages.
Non-Final Office Action mailed on Oct. 17, 2025, issued in connection with U.S. Appl. No. 18/502,349, filed Nov. 6, 2023, 09 pages.
Notice of Allowance mailed on Aug. 15, 2025, issued in connection with U.S. Appl. No. 18/600,044, filed Mar. 8, 2024, 07 pages.
Supplemental Notice of Allowance mailed on Oct. 8, 2025, issued in connection with U.S. Appl. No. 18/424,041, filed Jan. 26, 2024, 03 pages.
802.15 Wikipedia page available 2011 (Year: 2011).
Australian Patent Office, Australian Examination Report Action mailed on Aug. 16, 2024, issued in connection with Australian Application No. 2023248160, 2 pages.
Australian Patent Office, Australian Examination Report Action mailed on Sep. 18, 2024, issued in connection with Australian Application No. 2020218258, 3 pages.
Australian Patent Office, Australian Examination Report Action mailed on Aug. 19, 2024, issued in connection with Australian Application No. 2023237094, 2 pages.
Australian Patent Office, Australian Examination Report Action mailed on Jan. 23, 2025, issued in connection with Australian Application No. 2020329905, 3 pages.
Australian Patent Office, Australian Examination Report Action mailed on Jul. 29, 2024, issued in connection with Australian Application No. 2023237192, 3 pages.
Bluetooth Wikipedia page available 2011 (Year: 2011).
Bohn, Dieter. The Verge. "Amazon Creates a Huge Alliance to Demand Voice Assistant Compatibility." Sep. 24, 2019, 15 pages. Retrieved from the Internet: URL: https://www.theverge.com/2019/9/24/20881321/amazon-voice-interoperability-initiative-a1exa-microsoft-baidu-inte1-qua1commspotify-assistants.
Canadian Patent Office, Canadian Examination Report mailed on Oct. 1, 2024, issued in connection with Canadian Application No. 3123601, 4 pages.
Canadian Patent Office, Canadian Examination Report mailed on Aug. 12, 2024, issued in connection with Canadian Application No. 3067776, 3 pages.
Canadian Patent Office, Canadian Examination Report mailed on May 17, 2024, issued in connection with Canadian Application No. 3148021, 5 pages.
Canadian Patent Office, Canadian Examination Report mailed on Jun. 18, 2024, issued in connection with Canadian Application No. 3084279, 4 pages.
European Patent Office, European EPC Article 94.3 mailed on Dec. 19, 2024, issued in connection with European Application No. 22153523, 4 pages.
European Patent Office, European EPC Article 94.3 mailed on Jul. 22, 2024, issued in connection with European Application No. 23188226.7, 9 pages.
European Patent Office, European EPC Article 94.3 mailed on Jan. 30, 2024, issued in connection with European Application No. 22155834.9, 4 pages.
European Patent Office, European EPC Article 94.3 mailed on Jun. 4, 2024, issued in connection with European Application No. 21180778.9, 5 pages.
European Patent Office, European Extended Search Report mailed on Dec. 6, 2024, issued in connection with European Application No. 24174559.5, 12 pages.
European Patent Office, European Extended Search Report mailed on Apr. 15, 2024, issued in connection with European Application No. 23212793.6, 9 pages.
European Patent Office, European Extended Search Report mailed on Feb. 24, 2025, issued in connection with European Application No. 24192454.7, 11 pages.
European Patent Office, European Extended Search Report mailed on Jul. 9, 2024, issued in connection with European Application No. 24162741.3, 12 pages.
European Patent Office, Summons to Attend Oral Proceedings mailed on Jun. 26, 2024, issued in connection with European Application No. 19740292.8, 10 pages.
European Patent Office, Summons to Attend Oral Proceedings mailed on Nov. 29, 2024, issued in connection with European Application No. 21193616.6, 9 pages.
European Patent Office, Summons to Attend Oral Proceedings mailed on Aug. 5, 2025, issued in connection with European Application No. 20761443.9, 12 pages.
European Patent Office, Summons to Attend Oral Proceedings mailed on Aug. 6, 2024, issued in connection with European Application No. 18789515.6, 8 pages.
Final Office Action mailed on Aug. 1, 2025, issued in connection with U.S. Appl. No. 19/029,744 , filed on Jan. 17, 2025, 27 pages.
Final Office Action mailed on Sep. 5, 2024, issued in connection with U.S. Appl. No. 18/343,487, filed Jun. 28, 2023, 12 pages.
Final Office Action mailed on Jun. 10, 2025, issued in connection with U.S. Appl. No. 18/308,065, filed Apr. 27, 2023, 18 pages.
Final Office Action mailed on Nov. 13, 2024, issued in connection with U.S. Appl. No. 18/487,290, filed Oct. 16, 2023, 13 pages.
Final Office Action mailed on Mar. 14, 2025, issued in connection with U.S. Appl. No. 18/440,111, filed Feb. 13, 2024, 30 pages.
Final Office Action mailed on Mar. 17, 2025, issued in connection with U.S. Appl. No. 18/356,477, filed Jul. 21, 2023, 25 pages.
Final Office Action mailed on Jul. 18, 2024, issued in connection with U.S. Appl. No. 17/450,925, filed Oct. 14, 2021, 11 pages.
Final Office Action mailed on Aug. 2, 2024, issued in connection with U.S. Appl. No. 18/048,034, filed Oct. 20, 2022, 7 pages.
Final Office Action mailed on Jul. 2, 2024, issued in connection with U.S. Appl. No. 18/308,065, filed Apr. 27, 2023, 17 pages.
Final Office Action mailed on May 20, 2024, issued in connection with U.S. Appl. No. 18/308,087, filed Apr. 27, 2023, 29 pages.
Final Office Action mailed on Oct. 22, 2024, issued in connection with U.S. Appl. No. 17/458,673, filed Aug. 27, 2021, 27 pages.
Final Office Action mailed on Jan. 3, 2024, issued in connection with U.S. Appl. No. 17/807,270, filed Jun. 16, 2022, 22 pages.

(56) References Cited

OTHER PUBLICATIONS

Final Office Action mailed on Jul. 8, 2024, issued in connection with U.S. Appl. No. 17/222,950, filed Apr. 5, 2021, 10 pages.
Final Office Action mailed on May 8, 2024, issued in connection with U.S. Appl. No. 18/189,863, filed Mar. 24, 2023, 28 pages.
International Bureau, International Preliminary Report on Patentability, mailed on Apr. 11, 2024, issued in connection with International Application No. PCT/US2022/077107, filed on Sep. 27, 2022, 9 pages.
International Bureau, International Preliminary Report on Patentability, mailed on Aug. 22, 2024, issued in connection with International Application No. PCT/US2023/062179, filed on Feb. 8, 2023, 8 pages.
International Bureau, International Preliminary Report on Patentability, mailed on Apr. 4, 2024, issued in connection with International Application No. PCT/US2022/076972, filed on Sep. 23, 2022, 14 pages.
International Bureau, International Search Report and Written Opinion mailed on Mar. 23, 2023, issued in connection with International Application No. PCT/US2022/076972, filed on Sep. 23, 2022, 20 pages.
Japanese Patent Office, Decision to Grant a Patent and Translation mailed on Dec. 10, 2024, issued in connection with Japanese Patent Application No. 2022-115789, 5 pages.
Japanese Patent Office, English Translation of Office Action mailed on Apr. 2, 2024, issued in connection with Japanese Application No. 2022-115789, 6 pages.
Japanese Patent Office, Notice of Reasons for Refusal and Translation mailed on Jul. 1, 2025, issued in connection with Japanese Patent Application No. 2023-164165, 10 pages.
Japanese Patent Office, Notice of Reasons for Refusal and Translation mailed on Dec. 10, 2024, issued in connection with Japanese Patent Application No. 2023-149069, 8 pages.
Japanese Patent Office, Notice of Reasons for Refusal and Translation mailed on Dec. 17, 2024, issued in connection with Japanese Patent Application No. 2023-164165, 9 pages.
Japanese Patent Office, Notice of Reasons for Refusal and Translation mailed on Dec. 3, 2024, issued in connection with Japanese Patent Application No. 2023-144379, 12 pages.
Japanese Patent Office, Notice of Reasons for Refusal and Translation mailed on Dec. 3, 2024, issued in connection with Japanese Patent Application No. 2023-144387, 8 pages.
Japanese Patent Office, Office Action and Translation mailed on Jul. 11, 2024, issued in connection with Japanese Application No. 2022-115789, 10 pages.

* cited by examiner

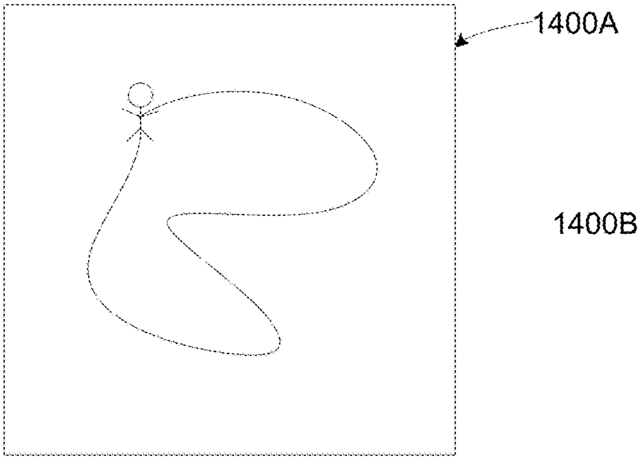
FIGURE 14A
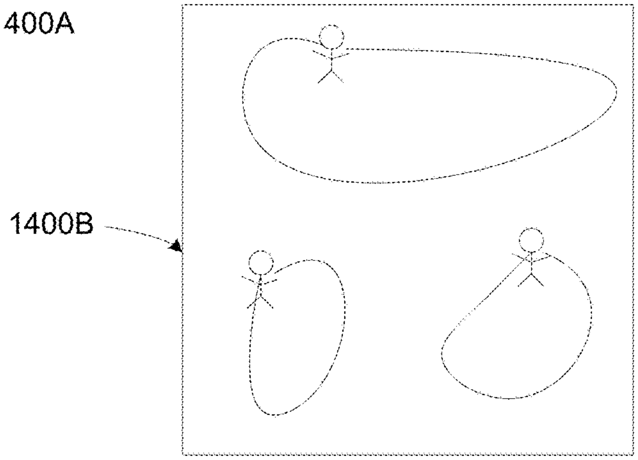
FIGURE 14B
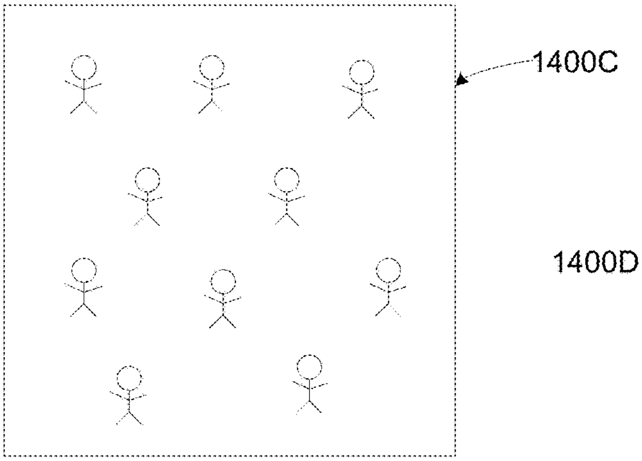
FIGURE 14C
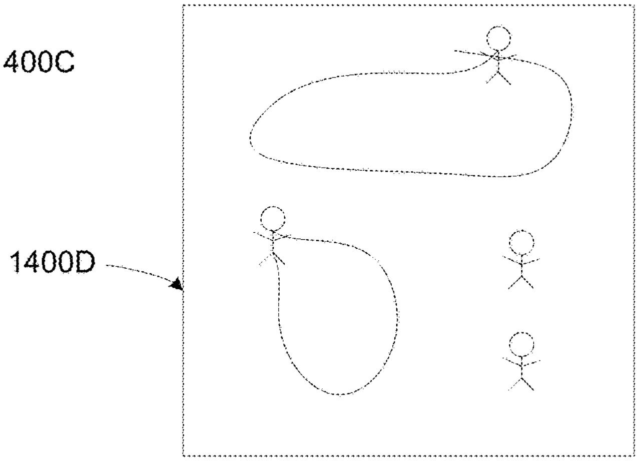
FIGURE 14D

CALIBRATION USING MULTIPLE RECORDING DEVICES

CROSS-REFERENCE TO RELATED APPLICATIONS

This application is a continuation of U.S. patent application Ser. No. 17/816,238, filed on Jul. 29, 2022, issued as U.S. Pat. No. 11,800,306, on Oct. 24, 2023, which is a continuation of U.S. patent application Ser. No. 17/098,134, filed on Nov. 13, 2020, issued as U.S. Pat. No. 11,432,089 on Aug. 30, 2022, which is a continuation of U.S. patent application Ser. No. 16/556,297, filed on Aug. 30, 2019, issued as U.S. Pat. No. 10,841,719 on Nov. 17, 2020, which is a continuation of U.S. patent application Ser. No. 16/113,032, filed on Aug. 27, 2018, issued as U.S. Pat. No. 10,405,117 on Sep. 3, 2019, which is a continuation of U.S. patent application Ser. No. 15/650,386, filed on Jul. 14, 2017, issued as U.S. Pat. No. 10,063,983 on Aug. 28, 2018, which is a continuation of U.S. patent application Ser. No. 14/997,868, filed on Jan. 18, 2016, issued as U.S. Pat. No. 9,743,207 on Aug. 22, 2017, each of which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 14A, 14B, 14C, and 14D illustrates example arrangements of recording devices in example environments;

Figure 1:
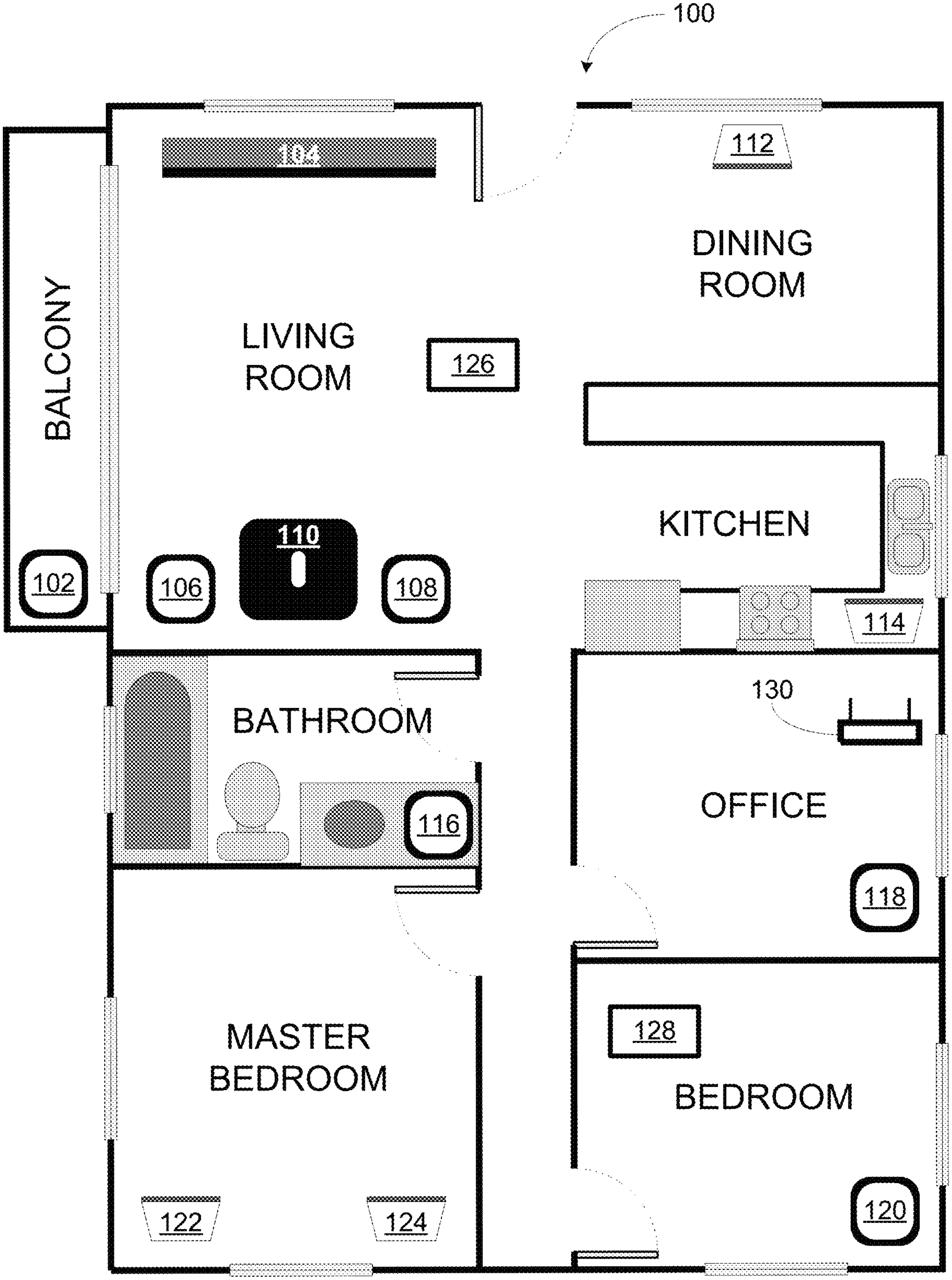
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve, inter alia, techniques to facilitate calibration of a media playback system. Some calibration procedures contemplated herein involve two or more recording devices (e.g., two or more control devices) of a media playback system detecting sound waves (e.g., one or more calibration sounds) that were emitted by one or more playback devices of the media playback system. A processing device, such as one of the two or more recording devices or another device that is communicatively coupled to the media playback system, may analyze the detected sound waves to determine a calibration for the one or more playback devices of the media playback system. Such a calibration may configure the one or more playback devices for a given listening area (i.e., the environment in which the playback device(s) were positioned while emitting the sound waves).

Acoustics of an environment may vary from location to location within the environment. Because of this variation, some calibration procedures may be improved by positioning the playback device to be calibrated within the environment in the same way that the playback device will later be operated. In that position, the environment may affect the calibration sound emitted by a playback device in a similar manner as playback will be affected by the environment during operation.

Further, some example calibration procedures may involve detecting the calibration sound at multiple physical locations within the environment, which may further assist in capturing acoustic variability within the environment. To facilitate detecting the calibration sound at multiple points within an environment, some calibration procedures involve a moving microphone. For example, a microphone that is detecting the calibration sound may be continuously moved through the environment while the calibration sound is emitted. Such continuous movement may facilitate detecting the calibration sounds at multiple physical locations within the environment, which may provide a better understanding of the environment as a whole.

Example calibration procedures that involve multiple recording devices, each with one or more respective microphones, may further facilitate capturing acoustic variability within an environment. For instance, given recording devices that are located at different respective locations within an environment, a calibration sound may be detected at multiple physical locations within the environment without necessarily moving the recording devices during output of the calibration sound by the playback device(s). Alternatively, the recording devices may be moved while the calibration sound is emitted, which may hasten calibration, as each recording device may cover a portion of the environment. In either case, a relatively large listening area, such as an open living area or a commercial space (e.g., a club, amphitheater, or concert hall) can potentially be covered more quickly and/or more completely with multiple recording devices, as more measurements may be made per second.

Yet further, the multiple microphones (of respective recording devices) may include both moving and stationary microphones. For instance, a control device and a playback device of a media playback system may include a first microphone and a second microphone respectively. While the playback device emits a calibration sound, the first microphone may move and the second microphone may remain stationary. In another example, a first control device and a second control device of a media playback system may include a first microphone and a second microphone respectively. While a playback device emits a calibration sound, the first microphone may move and the second microphone may remain relatively stationary, perhaps at a preferred listening location within the environment (e.g., a favorite chair).

As indicated above, example calibration procedures may involve a playback device emitting a calibration sound, which may be detected by multiple recording devices. In some embodiments, the detected calibration sounds may be analyzed across a range of frequencies over which the playback device is to be calibrated (i.e., a calibration range). Accordingly, the particular calibration sound that is emitted by a playback device covers the calibration frequency range. The calibration frequency range may include a range of frequencies that the playback device is capable of emitting (e.g., 15-30,000 Hz) and may be inclusive of frequencies that are considered to be in the range of human hearing (e.g., 20-20,000 Hz). By emitting and subsequently detecting a calibration sound covering such a range of frequencies, a frequency response that is inclusive of that range may be determined for the playback device. Such a frequency response may be representative of the environment in which the playback device emitted the calibration sound.

In some embodiments, a playback device may repeatedly emit the calibration sound during the calibration procedure such that the calibration sound covers the calibration frequency range during each repetition. With a moving microphone, repetitions of the calibration sound are continuously detected at different physical locations within the environment. For instance, the playback device might emit a periodic calibration sound. Each period of the calibration sound may be detected by the recording device at a different physical location within the environment thereby providing a sample (i.e., a frame representing a repetition) at that location. Such a calibration sound may therefore facilitate a space-averaged calibration of the environment. When multiple microphones are utilized, each microphone may cover a respective portion of the environment (perhaps with some overlap).

As indicated above, respective versions of the calibration sounds may be analyzed to determine a calibration. In some implementations, each recording device may determine a response of the given environment to the calibration sound(s) as detected by the respective recording device. A processing device (which may be one of the recording devices) may then determine a calibration for the playback device(s) based on a combination of these multiple responses. Alternatively, the data representing the recorded calibration sounds may be sent to the processing device for analysis.

Within examples, respective responses as detected by the multiple recording devices may be normalized. For instance, where the multiple microphones are different types, respective correction curves may be applied to the responses to offset the particular characteristics of each microphone. As another example, the responses may be normalized based on the respective spatial areas traversed during the calibration procedure. Further, the responses may be weighted based on the time duration that each recording device was detecting the calibration sounds (e.g., the number of repetitions that were detected). Yet further, the responses may be normalized based on the degree of variance between samples (frames) captured by each recording device. Other factors may influence normalization as well.

Example techniques may include room calibration that involves multiple recording devices. A first implementation may include detecting, via a microphone, at least a portion of one or more calibration sounds as emitted by one or more playback devices of one or more zones during a calibration sequence. The implementation may further include determining a first response, the first response representing a response of a given environment to the one or more calibration sounds as detected by the first control device and receiving data indicating a second response, the second response representing a response of the given environment to the one or more calibration sounds as detected by a second control device. The implementation may also include determining a calibration for the one or more playback devices based on the first response and the second response and sending, to at least one of the one or more zones, an instruction that applies the determined calibration to playback by the one or more playback devices.

A second implementation may include detecting initiation of a calibration sequence to calibrate one or more zones of a media playback system for a given environment, the one or more zones including one or more playback devices. The implementation may also include detecting, via a user interface, input indicating an instruction to include the first network device in the calibration sequence and sending, to a second network device, a message indicating that the first network device is included in the calibration sequence. The implementation may further include detecting, via a microphone, at least a portion of one or more calibration sounds as emitted by the one or more playback devices during the calibration sequence. The implementation may include detecting, via a microphone, at least a portion of one or more calibration sounds as emitted by the one or more playback devices during the calibration sequence and sending the determined response to the second network device.

A third implementation includes receiving first response data from a first control device and second response data from a second control device after one or more playback devices of a media playback system begin output of a calibration sound during a calibration sequence, the first response data representing a response of a given environment to the calibration sound as detected by the first control device and the second response data representing a response of the given environment to the calibration sound as detected by the second control device. The implementation also includes normalizing the first response data relative to at least the second response data and the second response data relative to at least the first response data. The implementation further includes determining a calibration that offsets acoustic characteristics of the given environment when applied to playback by the one or more playback devices based on the normalized first response data and the normalized second response data. The implementation may also include sending, to the zone, an instruction that applies the determined calibration to playback by the one or more playback devices.

Each of the these example implementations may be embodied as a method, a device configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
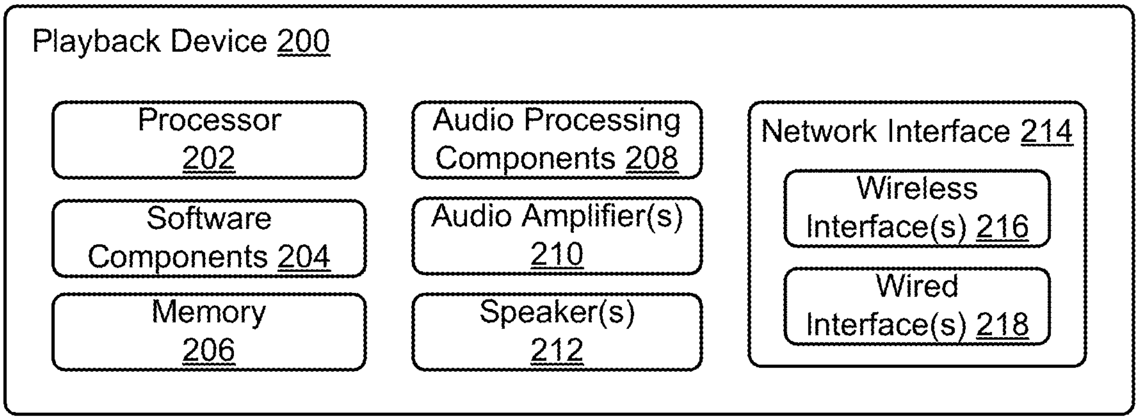
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
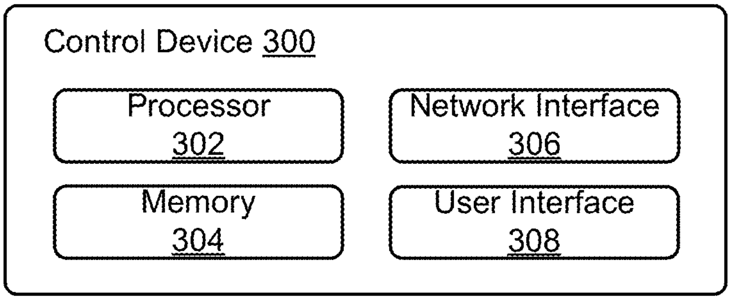
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
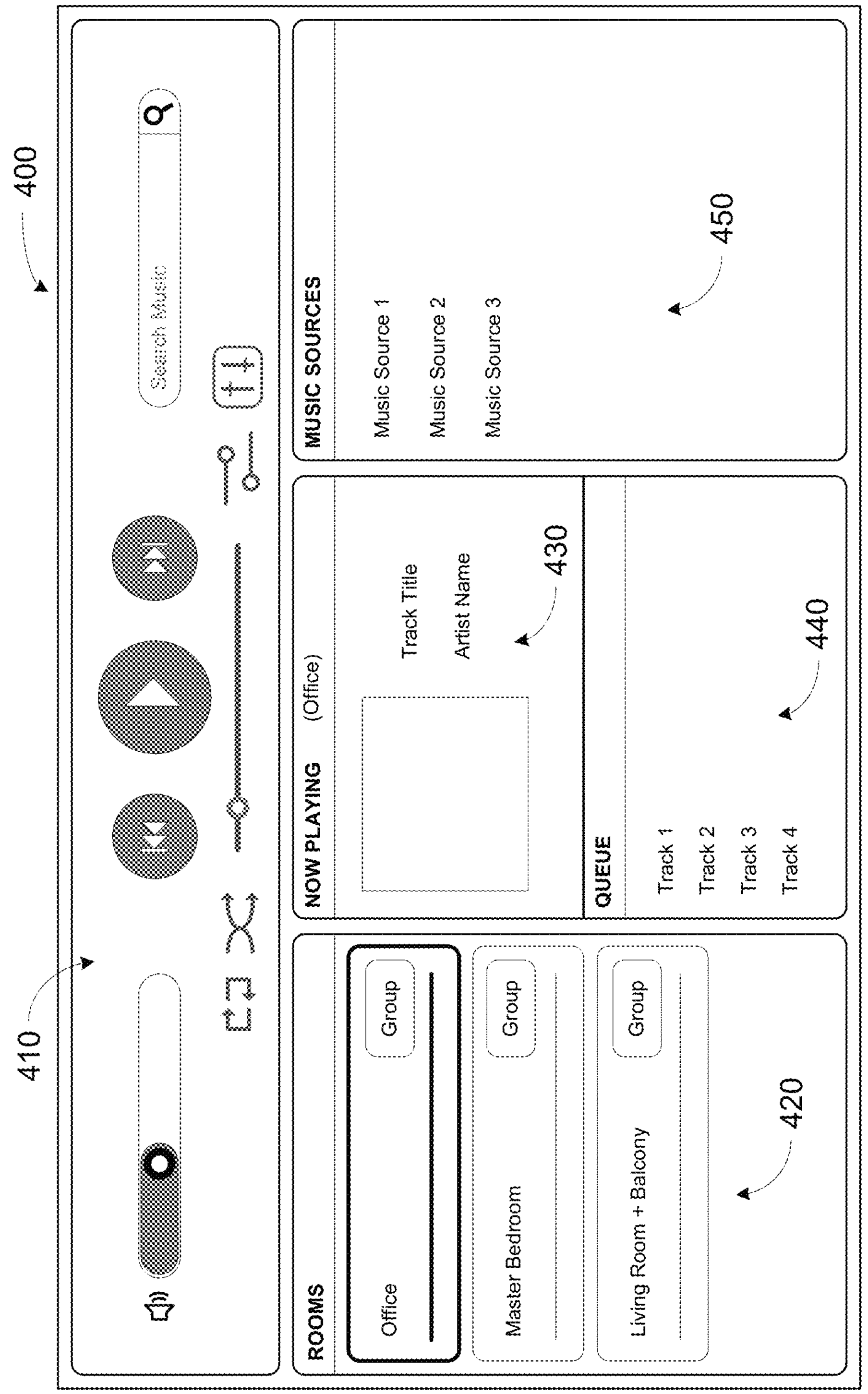
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

Figure 5:
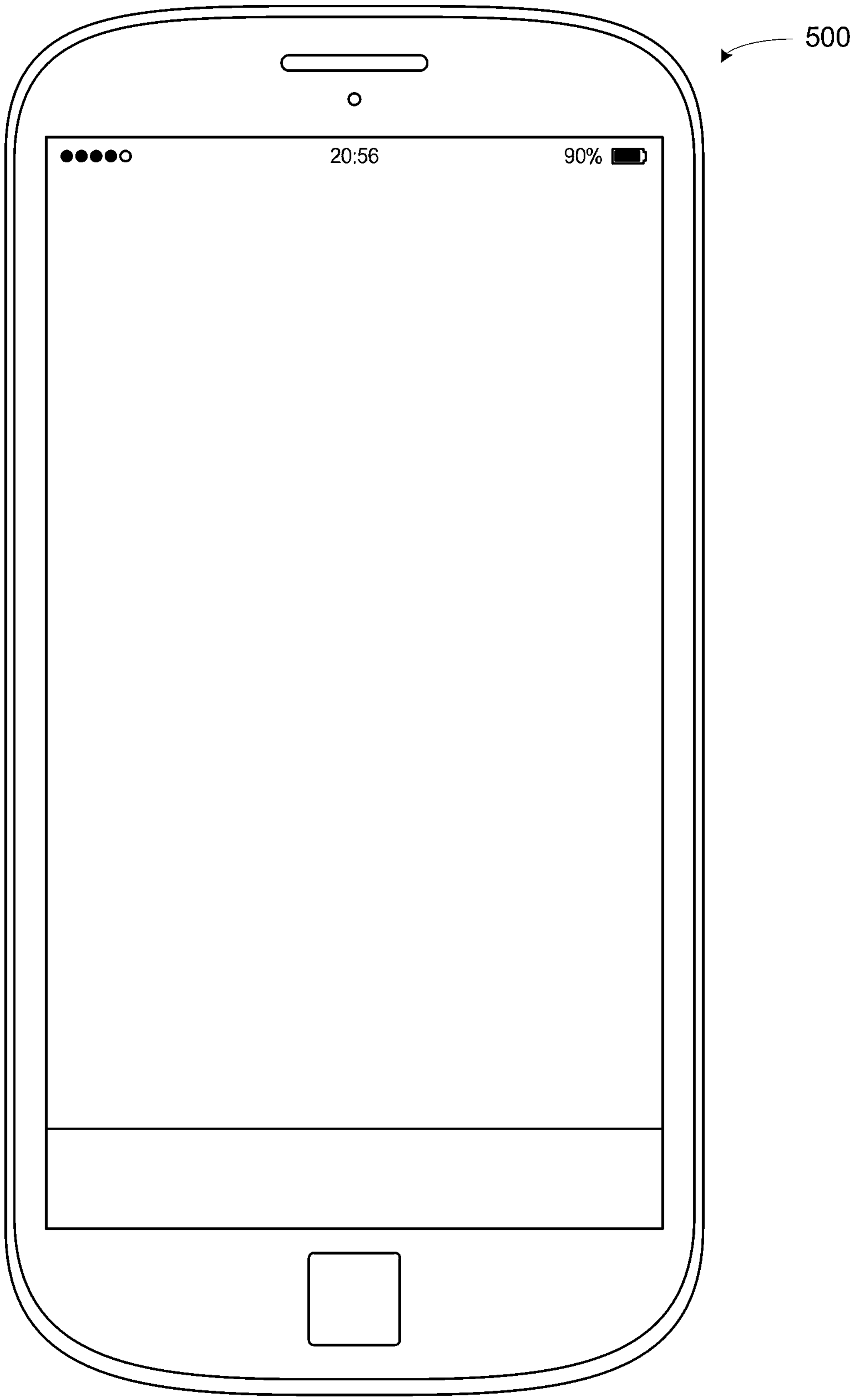
FIG. 5 shows an example control device.

FIG. 5 depicts a smartphone 500 that includes one or more processors, a tangible computer-readable memory, a network interface, and a display. Smartphone 500 might be an example implementation of control device 126 or 128 of FIG. 1, or control device 300 of FIG. 3, or other control devices described herein. By way of example, reference will be made to smartphone 500 and certain control interfaces, prompts, and other graphical elements that smartphone 500 may display when operating as a control device of a media playback system (e.g., of media playback system 100). Within examples, such interfaces and elements may be displayed by any suitable control device, such as a smartphone, tablet computer, laptop or desktop computer, personal media player, or a remote control device.

While operating as a control device of a media playback system, smartphone 500 may display one or more controller interface, such as controller interface 400. Similar to playback control region 410, playback zone region 420, playback status region 430, playback queue region 440, and/or audio content sources region 450 of FIG. 4, smartphone 500 might display one or more respective interfaces, such as a playback control interface, a playback zone interface, a playback status interface, a playback queue interface, and/or an audio content sources interface. Example control devices might display separate interfaces (rather than regions) where screen size is relatively limited, such as with smartphones or other handheld devices.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Calibration Sequence

One or more playback devices of a media playback system may output one or more calibration sounds as part of a calibration sequence or procedure. Such a calibration sequence may calibration the one or more playback devices to particular locations within a listening area. In some cases, the one or more playback devices may be joining into a grouping, such as a bonded zone or zone group. In such cases, the calibration procedure may calibrate the one or more playback devices as a group.

The one or more playback devices may initiate the calibration procedure based on a trigger condition. For instance, a recording device, such as control device 126 of media playback system 100, may detect a trigger condition that causes the recording device to initiate calibration of one or more playback devices (e.g., one or more of playback devices 102-124). Alternatively, a playback device of a media playback system may detect such a trigger condition (and then perhaps relay an indication of that trigger condition to the recording device).

In some embodiments, detecting the trigger condition may involve detecting input data indicating a selection of a selectable control. For instance, a recording device, such as control device 126, may display an interface (e.g., control interface 400 of FIG. 4), which includes one or more controls that, when selected, initiate calibration of a playback device, or a group of playback devices (e.g., a zone).

Figure 6:
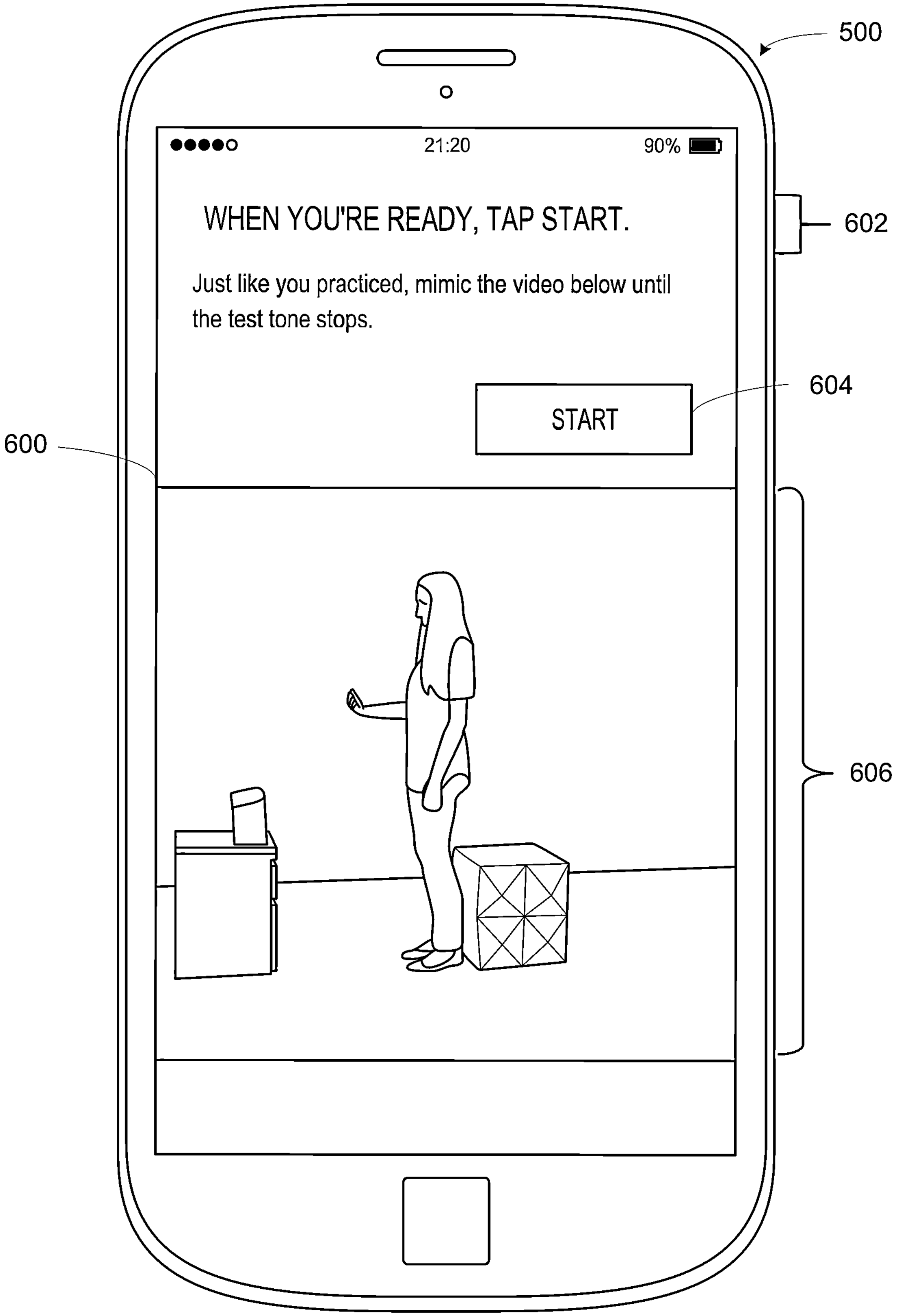
FIG. 6 shows a smartphone that is displaying an example control interface, according to an example implementation.

To illustrate such a control, FIG. 6 shows smartphone 500 which is displaying an example control interface 600. Control interface 600 includes a graphical region 602 that prompts to tap selectable control 604 (Start) when ready. When selected, selectable control 604 may initiate the calibration procedure. As shown, selectable control 604 is a button control. While a button control is shown by way of example, other types of controls are contemplated as well.

Control interface 600 further includes a graphical region 606 that includes a video depicting how to assist in the calibration procedure. Some calibration procedures may involve moving a microphone through an environment in order to obtain samples of the calibration sound at multiple physical locations. In order to prompt a user to move the microphone, the control device may display a video or animation depicting the step or steps to be performed during the calibration.

Figure 7:
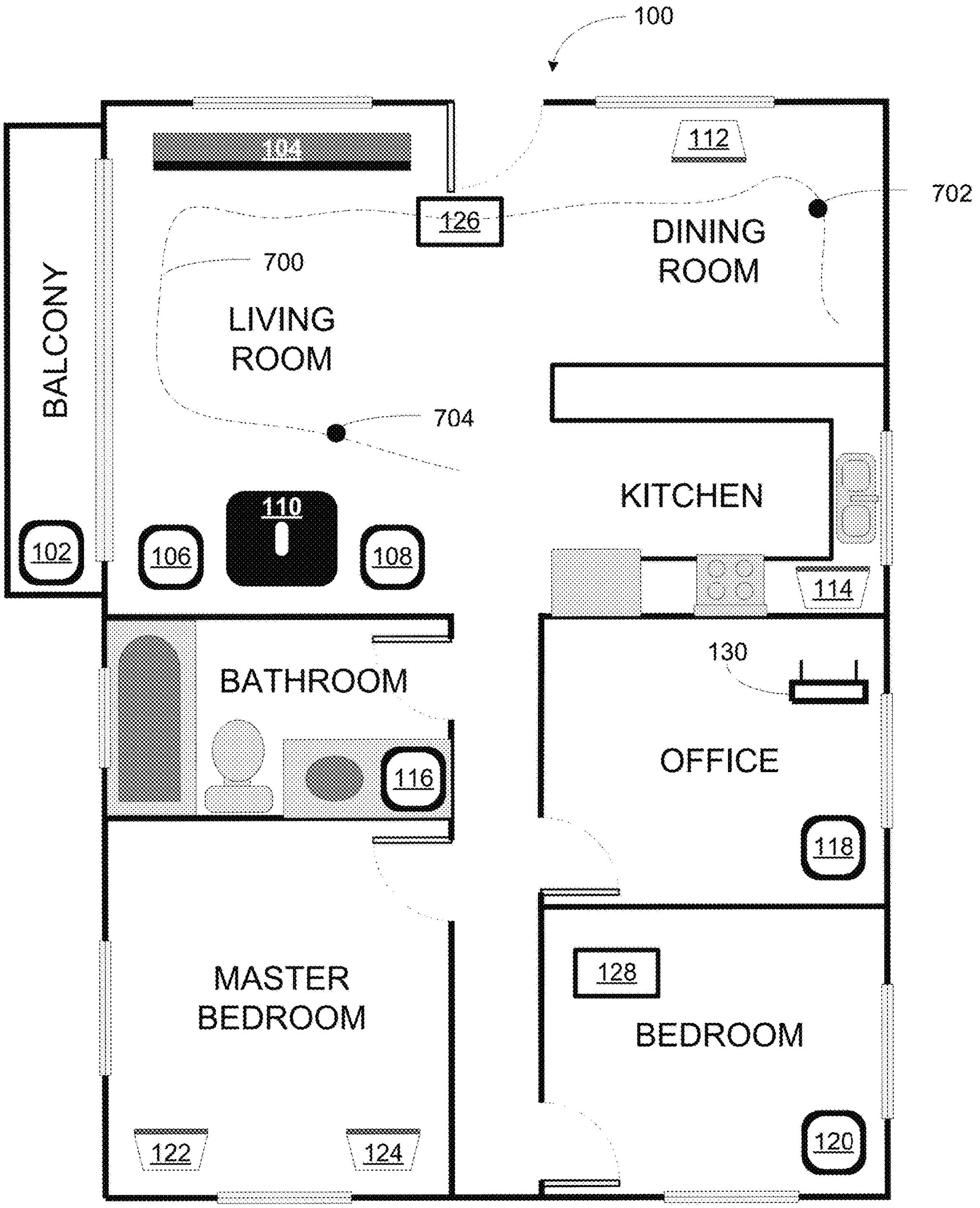
FIG. 7 illustrates an example movement through an example environment in which an example media playback system is positioned.

To illustrate movement of the control device during calibration, FIG. 7 shows media playback system 100 of FIG. 1. FIG. 7 shows a path 700 along which a recording device (e.g., control device 126) might be moved during calibration. As noted above, the recording device may indicate how to perform such a movement in various ways, such as by way of a video or animation, among other examples. A recording device might detect iterations of a calibration sound emitted by one or more playback devices of media playback system 100 at different points along the path 700, which may facilitate a space-averaged calibration of those playback devices.

In other examples, detecting the trigger condition may involve a playback device detecting that the playback device has become uncalibrated, which might be caused by moving the playback device to a different position. For example, the playback device may detect physical movement via one or more sensors that are sensitive to movement (e.g., an accelerometer). As another example, the playback device may detect that it has been moved to a different zone (e.g., from a "Kitchen" zone to a "Living Room" zone), perhaps by receiving an instruction from a control device that causes the playback device to leave a first zone and join a second zone.

In further examples, detecting the trigger condition may involve a recording device (e.g., a control device or playback device) detecting a new playback device in the system. Such a playback device may have not yet been calibrated for the environment. For instance, a recording device may detect a new playback device as part of a set-up procedure for a media playback system (e.g., a procedure to configure one or more playback devices into a media playback system). In other cases, the recording device may detect a new playback device by detecting input data indicating a request to configure the media playback system (e.g., a request to configure a media playback system with an additional playback device).

In some cases, the first recording device (or another device) may instruct the one or more playback devices to emit the calibration sound. For instance, a recording device, such as control device 126 of media playback system 100, may send a command that causes a playback device (e.g., one of playback devices 102-124) to emit a calibration sound. The control device may send the command via a network interface (e.g., a wired or wireless network interface). A playback device may receive such a command, perhaps via a network interface, and responsively emit the calibration sound.

In some embodiments, the one or more playback devices may repeatedly emit the calibration sound during the calibration procedure such that the calibration sound covers the calibration frequency range during each repetition. With a moving microphone, repetitions of the calibration sound are detected at different physical locations within the environment, thereby providing samples that are spaced throughout the environment. In some cases, the calibration sound may be periodic calibration signal in which each period covers the calibration frequency range.

To facilitate determining a frequency response, the calibration sound should be emitted with sufficient energy at each frequency to overcome background noise. To increase the energy at a given frequency, a tone at that frequency may be emitted for a longer duration. However, by lengthening the period of the calibration sound, the spatial resolution of the calibration procedure is decreased, as the moving microphone moves further during each period (assuming a relatively constant velocity). As another technique to increase the energy at a given frequency, a playback device may increase the intensity of the tone. However, in some cases, attempting to emit sufficient energy in a short amount of time may damage speaker drivers of the playback device.

Some implementations may balance these considerations by instructing the playback device to emit a calibration sound having a period that is approximately ⅜th of a second in duration (e.g., in the range of ¼ to 1 second in duration). In other words, the calibration sound may repeat at a frequency of 2-4 Hz. Such a duration may be long enough to provide a tone of sufficient energy at each frequency to overcome background noise in a typical environment (e.g., a quiet room) but also be short enough that spatial resolution is kept in an acceptable range (e.g., less than a few feet assuming normal walking speed).

In some embodiments, the one or more playback devices may emit a hybrid calibration sound that combines a first component and a second component having respective waveforms. For instance, an example hybrid calibration sound might include a first component that includes noises at certain frequencies and a second component that sweeps through other frequencies (e.g., a swept-sine). A noise component may cover relatively low frequencies of the calibration frequency range (e.g., 10-50 Hz) while the swept signal component covers higher frequencies of that range (e.g., above 50 Hz). Such a hybrid calibration sound may combine the advantages of its component signals.

Figure 8:
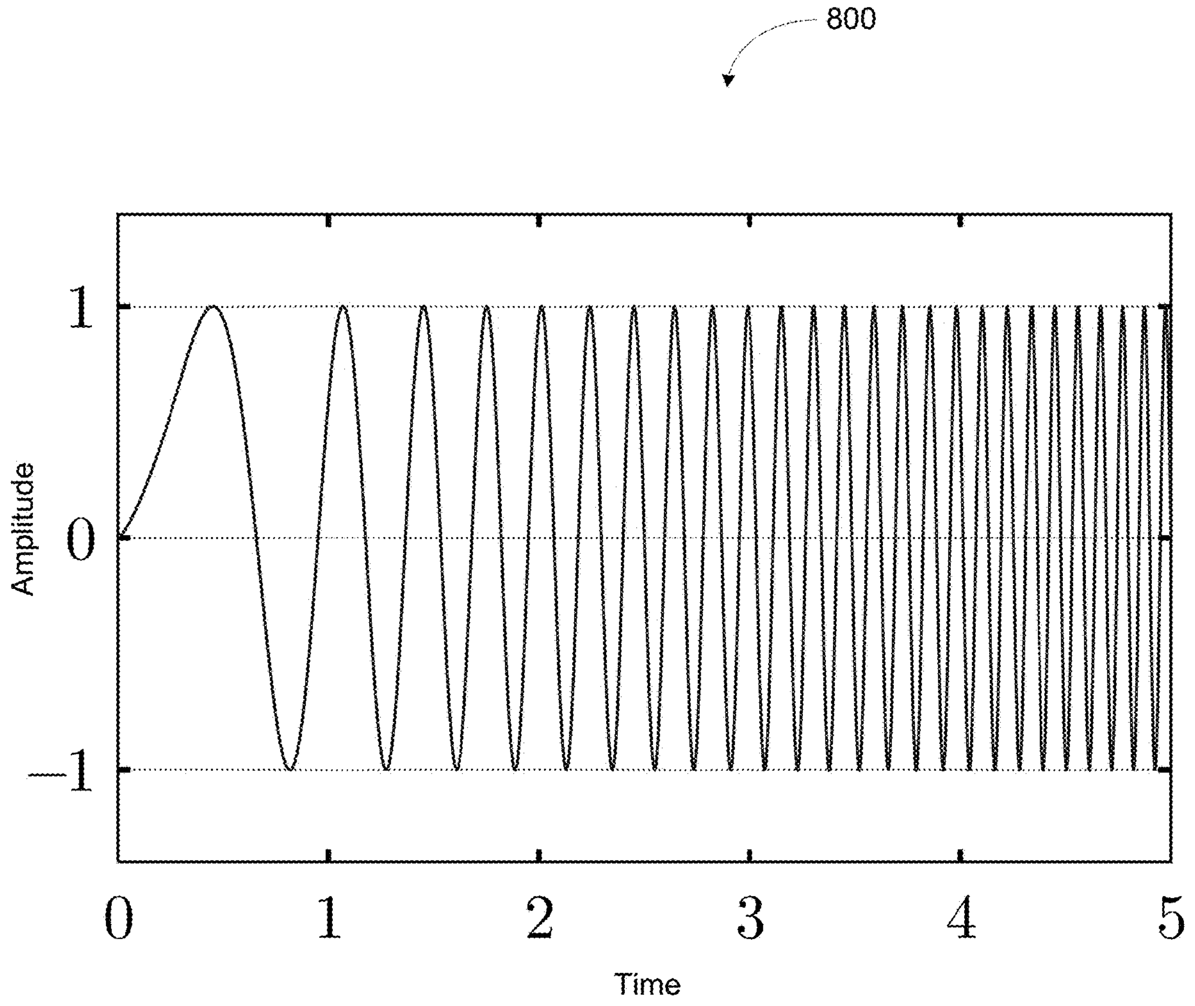
FIG. 8 illustrates an example chirp that increases in frequency over time.

A swept signal (e.g., a chirp or swept sine) is a waveform in which the frequency increases or decreases with time. Including such a waveform as a component of a hybrid calibration sound may facilitate covering a calibration frequency range, as a swept signal can be chosen that increases or decreases through the calibration frequency range (or a portion thereof). For example, a chirp emits each frequency within the chirp for a relatively short time period such that a chirp can more efficiently cover a calibration range relative to some other waveforms. FIG. 8 shows a graph 800 that illustrates an example chirp. As shown in FIG. 8, the frequency of the waveform increases over time (plotted on the X-axis) and a tone is emitted at each frequency for a relatively short period of time.

However, because each frequency within the chirp is emitted for a relatively short duration of time, the amplitude (or sound intensity) of the chirp must be relatively high at low frequencies to overcome typical background noise. Some speakers might not be capable of outputting such high intensity tones without risking damage. Further, such high intensity tones might be unpleasant to humans within audible range of the playback device, as might be expected during a calibration procedure that involves a moving microphone. Accordingly, some embodiments of the calibration sound might not include a chirp that extends to relatively low frequencies (e.g., below 50 Hz). Instead, the chirp or swept signal may cover frequencies between a relatively low threshold frequency (e.g., a frequency around 50-100 Hz) and a maximum of the calibration frequency range. The maximum of the calibration range may correspond to the physical capabilities of the channel(s) emitting the calibration sound, which might be 20,000 Hz or above.

A swept signal might also facilitate the reversal of phase distortion caused by the moving microphone. As noted above, a moving microphone causes phase distortion, which may interfere with determining a frequency response from a detected calibration sound. However, with a swept signal, the phase of each frequency is predictable (as Doppler shift). This predictability facilitates reversing the phase distortion so that a detected calibration sound can be correlated to an emitted calibration sound during analysis. Such a correlation can be used to determine the effect of the environment on the calibration sound.

As noted above, a swept signal may increase or decrease frequency over time. In some embodiments, the recording device may instruct the one or more playback devices to emit a chirp that descends from the maximum of the calibration range (or above) to the threshold frequency (or below). A descending chirp may be more pleasant to hear to some listeners than an ascending chirp, due to the physical shape of the human ear canal. While some implementations may use a descending swept signal, an ascending swept signal may also be effective for calibration.

As noted above, example calibration sounds may include a noise component in addition to a swept signal component. Noise refers to a random signal, which is in some cases filtered to have equal energy per octave. In embodiments where the noise component is periodic, the noise component of a hybrid calibration sound might be considered to be pseudorandom. The noise component of the calibration sound may be emitted for substantially the entire period or repetition of the calibration sound. This causes each frequency covered by the noise component to be emitted for a longer duration, which decreases the signal intensity typically required to overcome background noise.

Moreover, the noise component may cover a smaller frequency range than the chirp component, which may increase the sound energy at each frequency within the range. As noted above, a noise component might cover frequencies between a minimum of the frequency range and a threshold frequency, which might be, for example around a frequency around 50-100 Hz. As with the maximum of the calibration range, the minimum of the calibration range may correspond to the physical capabilities of the channel(s) emitting the calibration sound, which might be 20 Hz or below.

Figure 9:
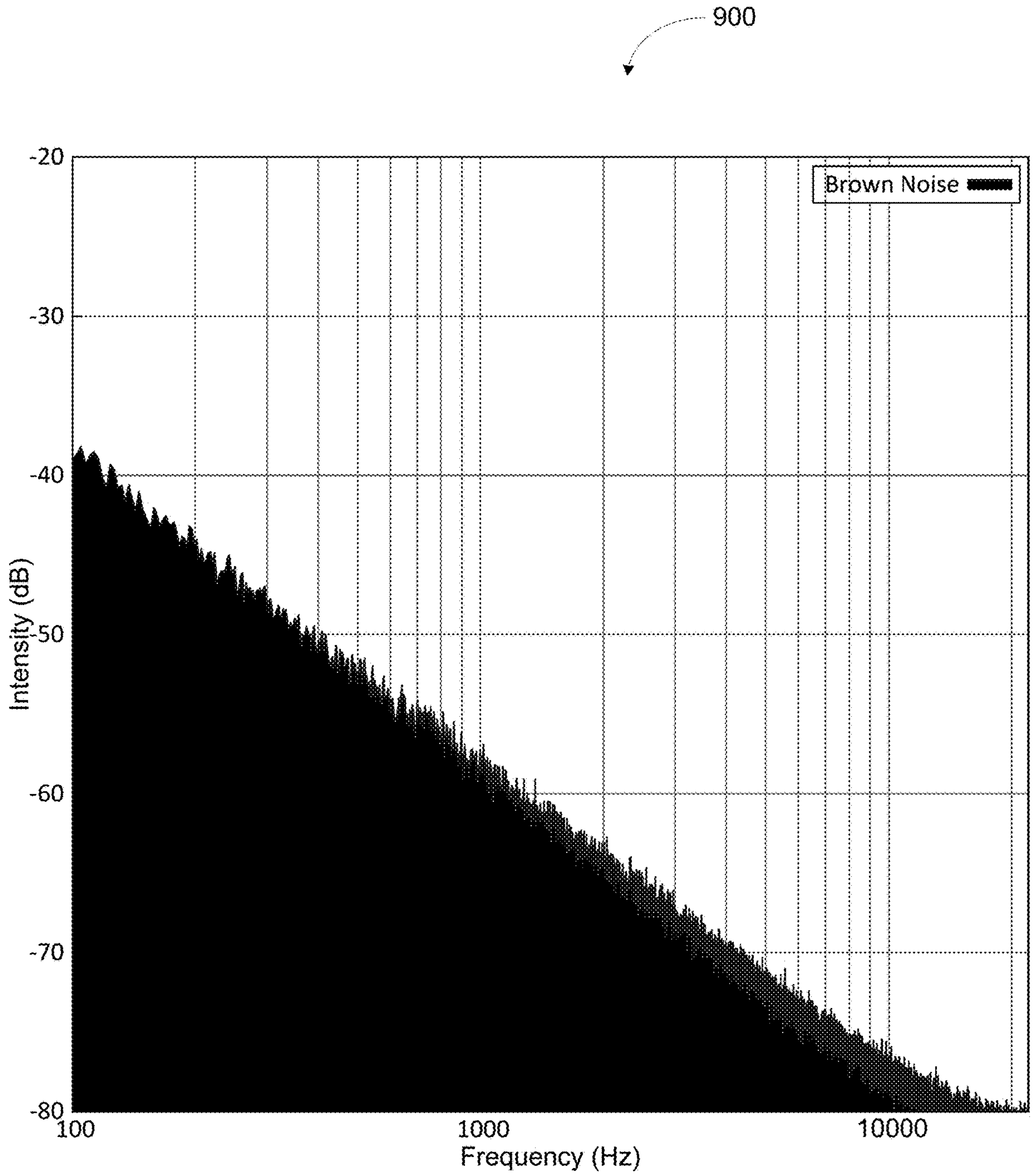
FIG. 9 shows an example brown noise spectrum.

FIG. 9 shows a graph 900 that illustrates an example brown noise. Brown noise is a type of noise that is based on Brownian motion. In some cases, the playback device may emit a calibration sound that includes a brown noise in its noise component. Brown noise has a "soft" quality, similar to a waterfall or heavy rainfall, which may be considered pleasant to some listeners. While some embodiments may implement a noise component using brown noise, other embodiments may implement the noise component using other types of noise, such as pink noise or white noise. As shown in FIG. 9, the intensity of the example brown noise decreases by 6 dB per octave (20 dB per decade).

Some implementations of a hybrid calibration sound may include a transition frequency range in which the noise component and the swept component overlap. As indicated above, in some examples, the control device may instruct the playback device to emit a calibration sound that includes a first component (e.g., a noise component) and a second component (e.g., a sweep signal component). The first component may include noise at frequencies between a minimum of the calibration frequency range and a first threshold frequency, and the second component may sweep through frequencies between a second threshold frequency and a maximum of the calibration frequency range.

To overlap these signals, the second threshold frequency may a lower frequency than the first threshold frequency. In such a configuration, the transition frequency range includes frequencies between the second threshold frequency and the first threshold frequency, which might be, for example, 50-100 Hz. By overlapping these components, the playback device may avoid emitting a possibly unpleasant sound associated with a harsh transition between the two types of sounds.

Figure 10A:
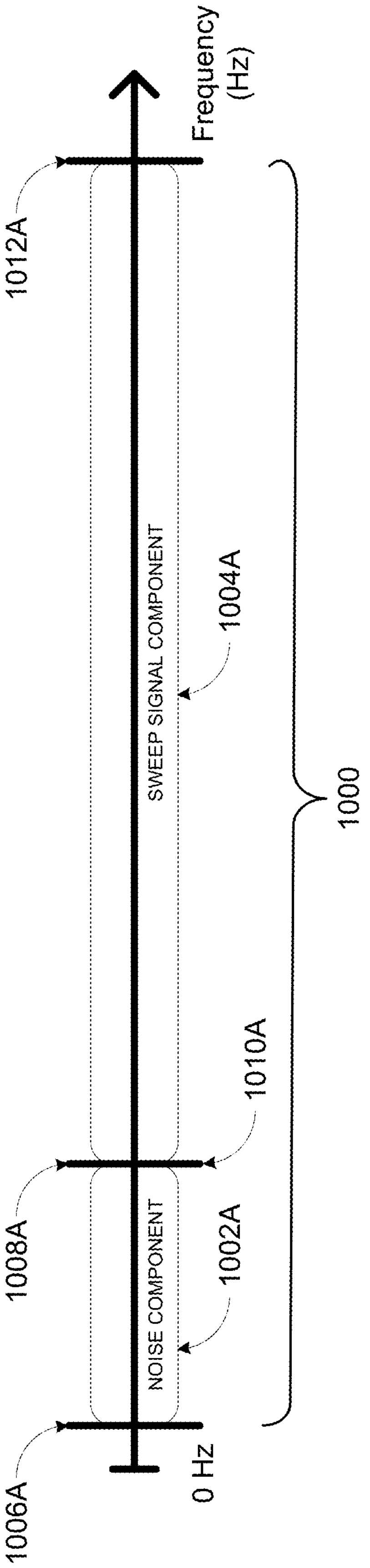
FIGS. 10A and 10B illustrate transition frequency ranges of example hybrid calibration sounds.
Figure 10B:
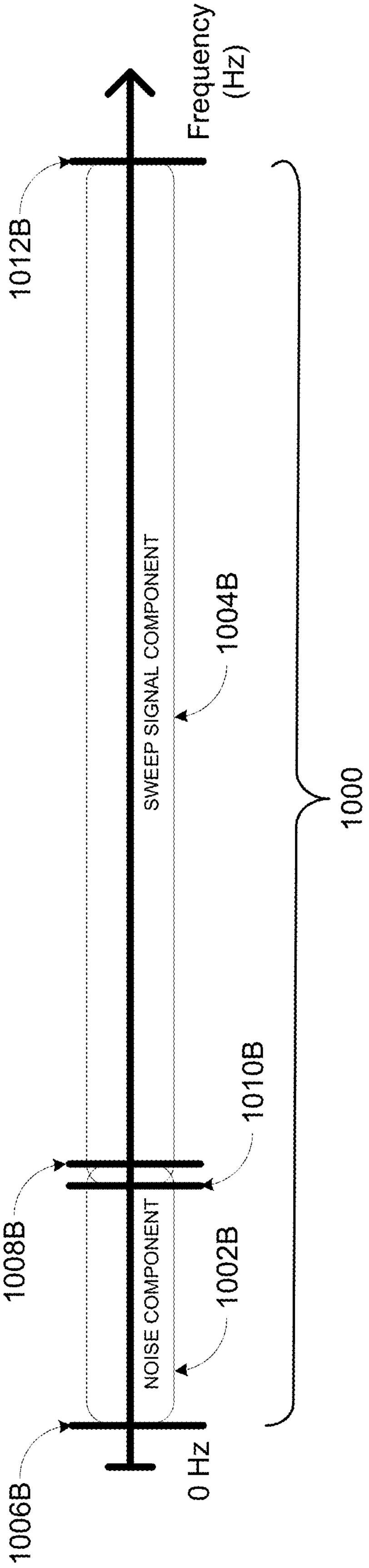

FIGS. 10A and 10B illustrate components of example hybrid calibration signals that cover a calibration frequency range 1000. FIG. 10A illustrates a first component 1002A (i.e., a noise component) and a second component 1004A of an example calibration sound. Component 1002A covers frequencies from a minimum 1008A of the calibration range 1000 to a first threshold frequency 1008A. Component 1004A covers frequencies from a second threshold 1010A to a maximum of the calibration frequency range 1000. As shown, the threshold frequency 1008A and the threshold frequency 1010A are the same frequency.

FIG. 10B illustrates a first component 1002B (i.e., a noise component) and a second component 1004B of another example calibration sound. Component 1002B covers frequencies from a minimum 1008B of the calibration range 1000 to a first threshold frequency 1008A. Component 1004A covers frequencies from a second threshold 1010B to a maximum 1012B of the calibration frequency range 1000. As shown, the threshold frequency 1010B is a lower frequency than threshold frequency 1008B such that component 1002B and component 1004B overlap in a transition frequency range that extends from threshold frequency 1010B to threshold frequency 1008B.

Figure 11:
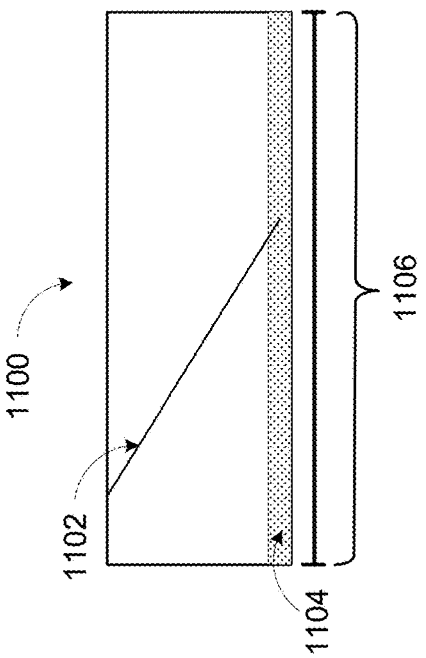
FIG. 11 shows a frame illustrating an iteration of an example periodic calibration sound.

FIG. 11 illustrates one example iteration (e.g., a period or cycle) of an example hybrid calibration sound that is represented as a frame 1100. The frame 1100 includes a swept signal component 1102 and noise component 1104. The swept signal component 1102 is shown as a downward sloping line to illustrate a swept signal that descends through frequencies of the calibration range. The noise component 1104 is shown as a region to illustrate low-frequency noise throughout the frame 1100. As shown, the swept signal component 1102 and the noise component overlap in a transition frequency range. The period 1106 of the calibration sound is approximately ⅜ths of a second (e.g., in a range of ¼ to ½ second), which in some implementation is sufficient time to cover the calibration frequency range of a single channel.

Figure 12:
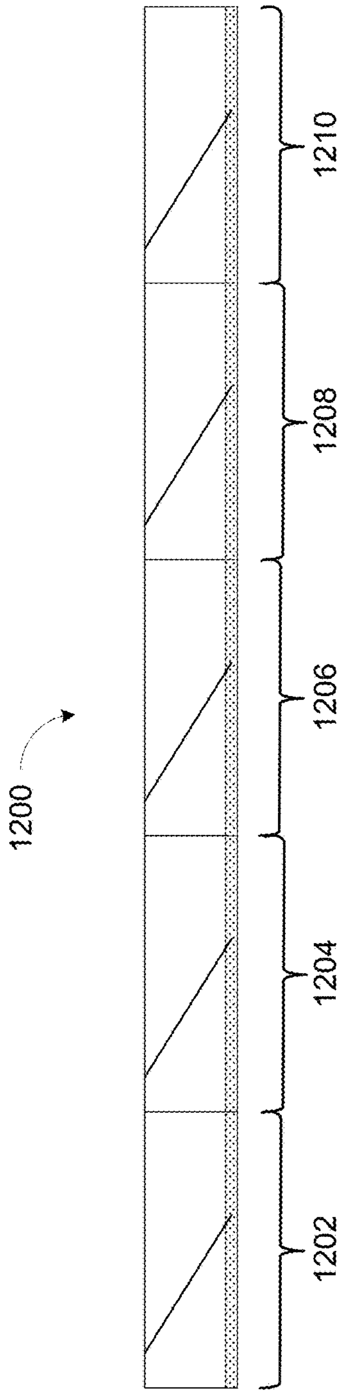
FIG. 12 shows a series of frames illustrating iterations of an example periodic calibration sound.

FIG. 12 illustrates an example periodic calibration sound 1200. Five iterations (e.g., periods) of hybrid calibration sound 1100 are represented as a frames 1202, 1204, 1206, 1208, and 1210. In each iteration, or frame, the periodic calibration sound 1200 covers a calibration frequency range using two components (e.g., a noise component and a swept signal component).

In some embodiments, a spectral adjustment may be applied to the calibration sound to give the calibration sound a desired shape, or roll off, which may avoid overloading speaker drivers. For instance, the calibration sound may be filtered to roll off at 3 dB per octave, or 1/f. Such a spectral adjustment might not be applied to vary low frequencies to prevent overloading the speaker drivers.

In some embodiments, the calibration sound may be pre-generated. Such a pre-generated calibration sound might be stored on the control device, the playback device, or on a server (e.g., a server that provides a cloud service to the media playback system). In some cases, the control device or server may send the pre-generated calibration sound to the playback device via a network interface, which the playback device may retrieve via a network interface of its own. Alternatively, a control device may send the playback device an indication of a source of the calibration sound (e.g., a URI), which the playback device may use to obtain the calibration sound.

Alternatively, the control device or the playback device may generate the calibration sound. For instance, for a given calibration range, the control device may generate noise that covers at least frequencies between a minimum of the calibration frequency range and a first threshold frequency and a swept sine that covers at least frequencies between a second threshold frequency and a maximum of the calibration frequency range. The control device may combine the swept sine and the noise into the periodic calibration sound by applying a crossover filter function. The cross-over filter function may combine a portion of the generated noise that includes frequencies below the first threshold frequency and a portion of the generated swept sine that includes frequencies above the second threshold frequency to obtain the desired calibration sound. The device generating the calibration sound may have an analog circuit and/or digital signal processor to generate and/or combine the components of the hybrid calibration sound.

Further example calibration procedures are described in U.S. patent application Ser. No. 14/805,140 filed Jul. 21, 2015, entitled "Hybrid Test Tone For Space-Averaged Room Audio Calibration Using A Moving Microphone," U.S. patent application Ser. No. 14/805,340 filed Jul. 21, 2015, entitled "Concurrent Multi-Loudspeaker Calibration with a Single Measurement," and U.S. patent application Ser. No. 14/864,393 filed Sep. 24, 2015, entitled "Facilitating Calibration of an Audio Playback Device," which are incorporated herein in their entirety.

Calibration may be facilitated via one or more control interfaces, as displayed by one or more devices. Example interfaces are described in U.S. patent application Ser. No. 14/696,014 filed Apr. 24, 2015, entitled "Speaker Calibration," and U.S. patent application Ser. No. 14/826,873 filed Aug. 14, 2015, entitled "Speaker Calibration User Interface," which are incorporated herein in their entirety.

Figure 13:
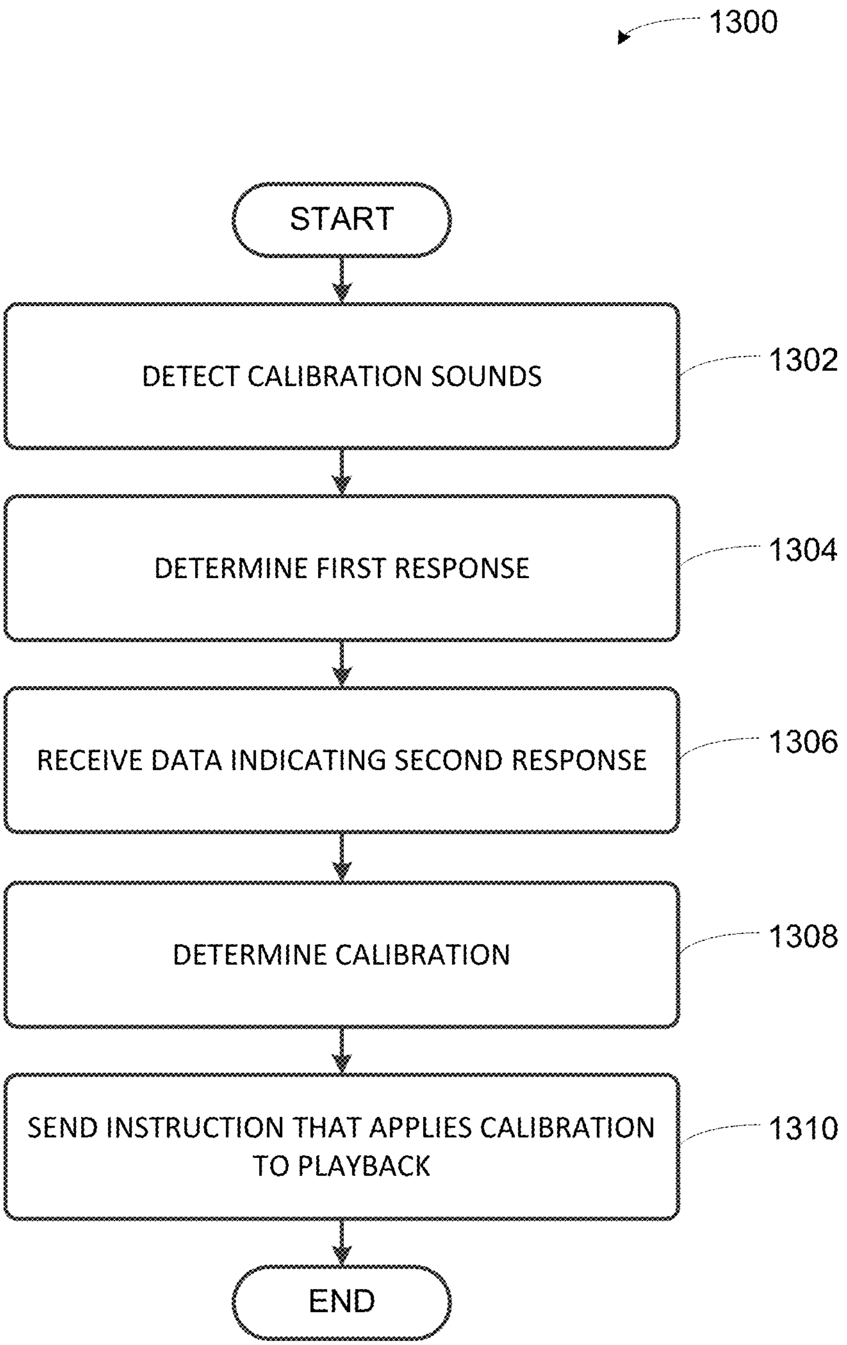
FIG. 13 shows an example flow diagram to facilitate the calibration of playback devices using multiple recording devices.
Figure 15:
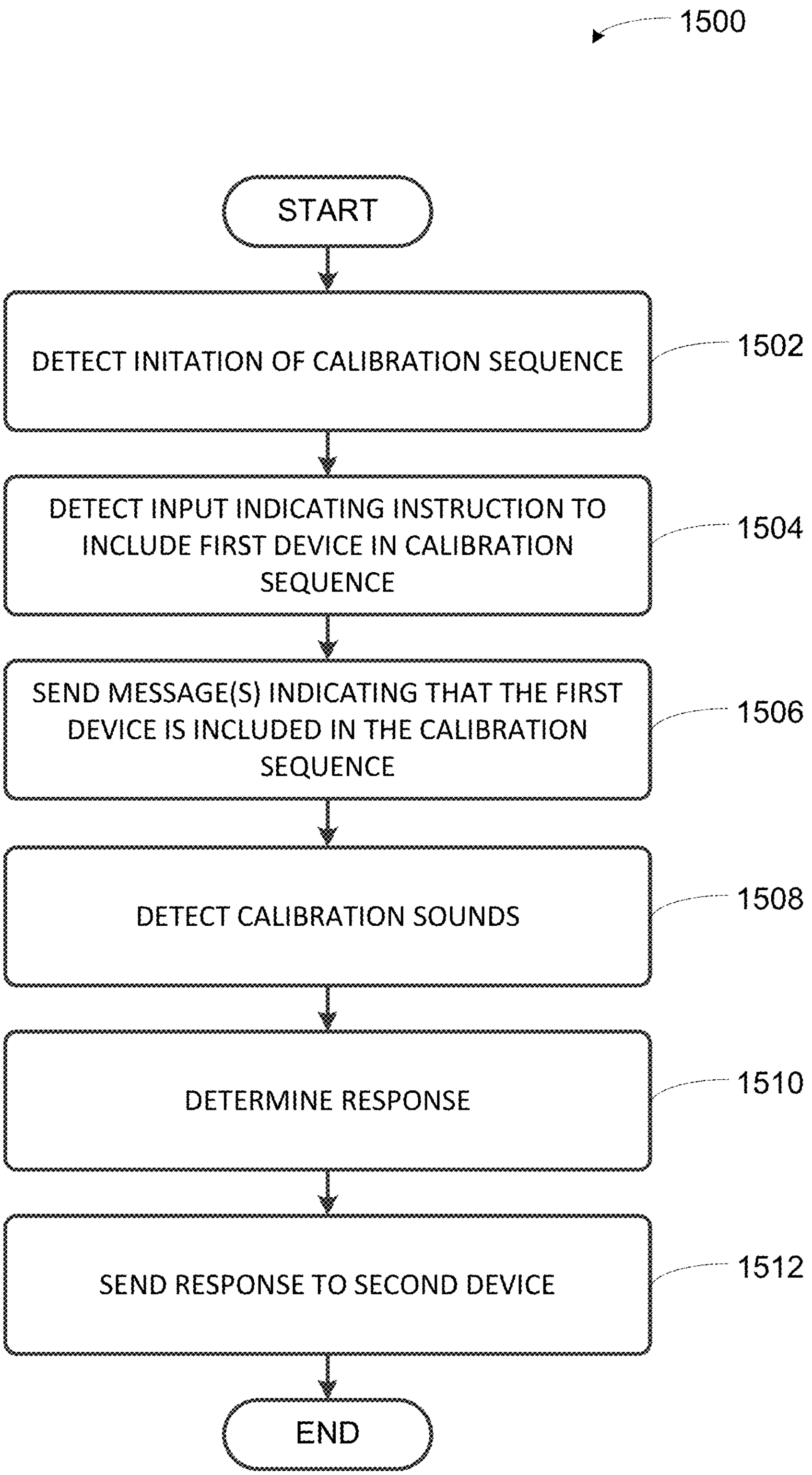
FIG. 15 shows an example flow diagram to facilitate the calibration of playback devices using multiple recording devices.
Figure 17:
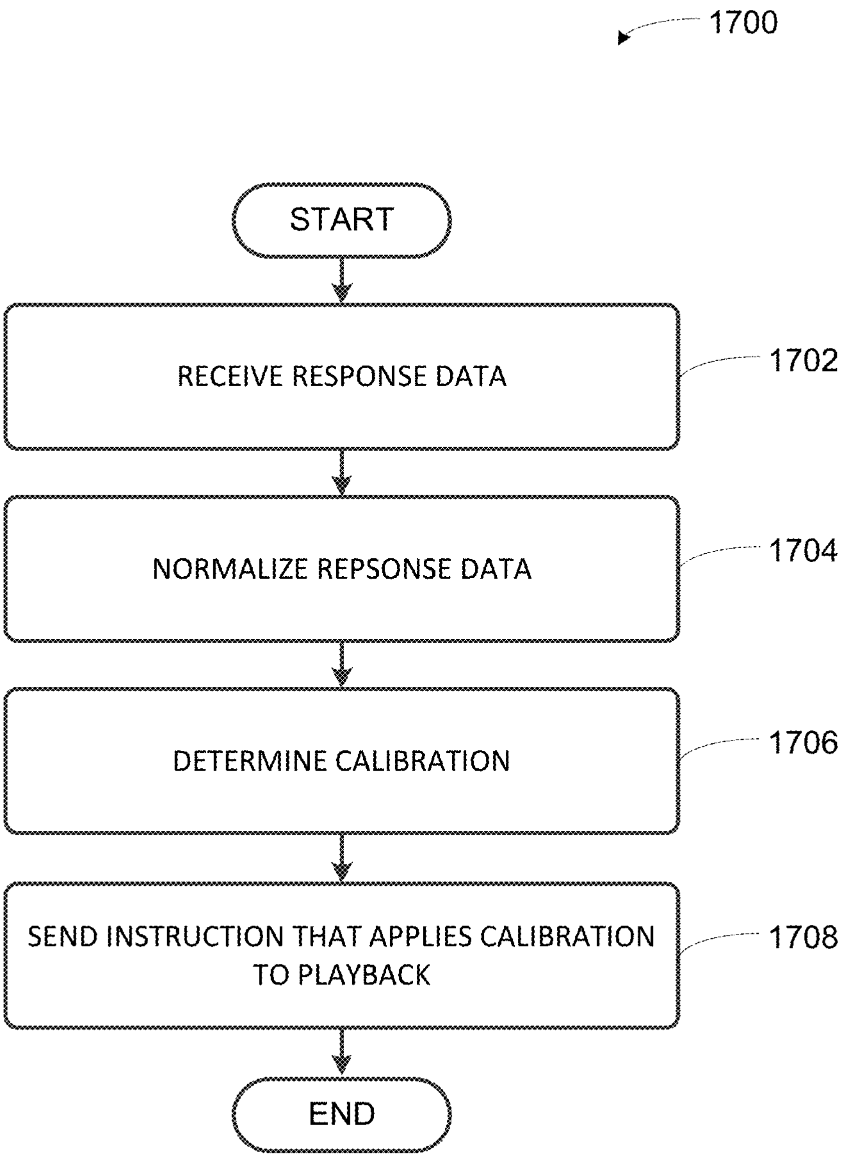
FIG. 17 shows an example flow diagram to facilitate the calibration of playback devices using multiple recording devices.

Moving now to several example implementations, implementations 1300, 1500 and 1700 shown in FIGS. 13, 15 and 17, respectively present example embodiments of techniques described herein. These example embodiments that can be implemented within an operating environment including, for example, the media playback system 100 of FIG. 1, one or more of the playback device 200 of FIG. 2, or one or more of the control device 300 of FIG. 3, as well as other devices described herein and/or other suitable devices. Further, operations illustrated by way of example as being performed by a media playback system can be performed by any suitable device, such as a playback device or a control device of a media playback system. Implementations 1300, 1500 and 1700 may include one or more operations, functions, or actions as illustrated by one or more of blocks shown in FIGS. 13, 15 and 17. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

III. First Example Techniques to Facilitate Calibration Using Multiple Recording Devices As discussed above, embodiments described herein may facilitate the calibration of one or more playback devices using multiple recording devices. FIG. 13 illustrates an example implementation 1300 by which a first device and a second device detect calibration sounds emitted by one or more playback devices and determine respective responses. The first device determines a calibration for the one or more playback devices based on the responses.

a. Detect Calibration Sounds as Emitted by Playback Device(s)

At block 1302, implementation 1300 involves detecting one or more calibration sounds as emitted by one or more playback devices during a calibration sequence. For instance, a first recording device (e.g., control device 126 or 128 of FIG. 1) may detect one or more calibration sounds as emitted by playback devices of a media playback system (e.g., media playback system 100) via a microphone. In practice, some of the calibration sound may be attenuated or drowned out by the environment or by other conditions, which may prevent the recording device from detecting all of the calibration sound. As such, the recording device may capture a portion of the calibration sounds as emitted by playback devices of a media playback system. The calibration sound(s) may be any of the example calibration sounds described above with respect to the example calibration procedure, as well as any suitable calibration sound.

Given that the first recording device may be moving throughout the calibration environment, the recording device may detect iterations of the calibration sound at different physical locations of the environment, which may provide a better understanding of the environment as a whole. For example, referring back to FIG. 7, control device 126 may detect calibration sounds emitted by one or more playback devices (e.g., playback device 108) at various points along the path 700 (e.g., at point 702 and/or point 704). Alternatively, the control device may record the calibration signal along the path. As noted above, in some embodiment, a playback device may output a periodic calibration signal (or perhaps repeat the same calibration signal) such that the playback device records a repetition of the calibration signal at different points along the paths. Each recorded repetition may be referred to as a frame. Comparison of such frames may indicate how the acoustic characteristics change from one physical location in the environment to another, which influences the calibration settings chosen for the playback device in that environment.

While the first recording device is detecting the one or more calibration sounds, movement of that recording device through the listening area may be detected. Such movement may be detected using a variety of sensors and techniques. For instance, the first recording device may receive movement data from a sensor, such as an accelerometer, GPS, or inertial measurement unit. In other examples, a playback device may facilitate the movement detection. For example, given that a playback device is stationary, movement of the recording device may be determined by analyzing changes in sound propagation delay between the recording device and the playback device.

b. Determine First Response

In FIG. 13, at block 1304, implementation 1300 involves determining a first response. For instance, the first recording device may determine a first response based on the detected portion of the one or more calibration sounds as emitted by the one or more playback devices in a given environment (e.g., one or more rooms of a home or other building, or outdoors). Such a response may represent the response of the given environment to the one or more calibration sounds (i.e., how the environment attenuated or amplified the calibration sound(s) at different frequencies). Given a suitable calibration sound, the recordings of the one or more calibration sounds as measured by the first recording device may represent the response of the given environment to the one or more calibration sounds. The response may be represented as a frequency response or a power-spectral density, among other types of responses.

As noted above, in some embodiments, the first recording device may detect multiple frames, each representing a repetition of a calibration sound. Given that the first recording device was moving during the calibration sequence, each frame may represent the response of the given environment to the one or more calibration sounds at a respective position within the environment. To determine the first response, the first recording device may combine these frames (perhaps by averaging) to determine a space-averaged response of the given environment as detected by the first recording device.

In some cases, the first recording device may offload some or all processing to a processing device, such as a server. In such embodiments, determining a first response may involve the first recording device sending measurement data representing the detected calibration sounds to the processing device. From the processing device, the first recording device may receive data representing a response, or data that facilitates the first recording device determining the response (e.g., measurement data).

Although some example calibration procedures contemplated herein suggest movement by the recording devices, such movement is not necessary. A response of the given environment as detected by a stationary recording device may represent the response of the given environment to the one or more calibration sounds at a particular position within the environment. Such a position might be a preferred listening location (e.g., a favorite chair). Further, by distributing stationary recording devices throughout an environment, a space-averaged response may be determined by combining respective responses as detected by the distributed recording devices.

To illustrate, FIGS. 14A, 14B, 14C, and 14D depict example environments 1400A, 1400B, 1400C, 1400D respectively. In FIGS. 14A, 14B, 14C, and 14D, recording devices are represented by a stick figure symbol. As shown in FIG. 14A, a recording device may move along a path within environment 1400A to measure the response of environment 1400A. Next, in FIG. 14B, three recording devices move along respective paths to measure the response of respective portions of environment 1400B. As shown in FIG. 14C, stationary recording devices are distributed within environment 1400C to measure the response of environment 1400C at different locations. Lastly, in FIG. 14D, two first recording devices measure the response of environment 1400D while moving along respective paths and two second recording devices measure the response of the room in stationary locations.

c. Receive Second Response

Referring back to FIG. 13, at block 1306, implementation 1300 involves receiving a second response. For instance, the first recording device may receive data representing a second response via a network interface. The second response may represent a response of the given environment to the one or more calibration sounds as detected by a second recording device. In some cases, the first recording device may receive data representing a determined response (e.g., as determined by the second recording device). Alternatively, the first recording device may receive measurement data (e.g., data representing the one or more calibration sounds as detected by the second recording device) and determine the second response from such data. Yet further, the first recording device may receive a calibration determined from a response measured by the second recording device).

During a calibration sequence, the one or more playback devices may output the calibration sound(s) for a certain time period. The first recording device and the second recording device may each detect these calibration sounds for at least a portion of the time period. The respective portions of the time period that each of the first recording device and the second recording device detected the calibration sound(s) may overlap or they might not. Further the first and second playback devices may measure respective responses of the given environment to the one or more calibration sounds at one or more respective positions within the environment (e.g., overlap). Some of these positions may overlap, depending on how each recording device moved during the calibration sequence.

In some examples, additional recording devices may measure the calibration sounds. In such examples, the first recording device may receive data representing a plurality of responses, perhaps from respective recording devices. Each response may represent the response of the environment to the one or more calibrations sounds as detected by a respective recording device.

To facilitate a calibration sequence that involves one or more (e.g., a plurality of) second recording devices, the first recording device may coordinate participation by such devices. For instance, the first recording device may receive acknowledgments that a given number of recording devices will measure the calibration sounds as such sounds are emitted from the playback devices. In some cases, the first recording device may accept participation from a threshold number of devices. The first recording device may request recording devices to participate, perhaps requesting participation from recording devices until a certain number of devices has confirmed participation. Other examples are possible as well.

To illustrate, referring back to FIG. 14C, environment 1400C may correspond to a concert venue, a lecture hall, or other space. The recording devices distributed through environment 1400C may be personal devices (e.g., smartphones or tablet computers) of attendees, patrons, students, or others gathered in such spaces. To calibrate such a space for a given event, such personal devices may participate in a calibration sequence as recording devices. The owners of such devices may provide input to opt-in to the calibration sequence, thereby instructing their device to measure the calibration sounds. Such devices mays measure the calibration sound, perhaps process the measurement data into a response, and send the raw or processed data to a processing device to facilitate calibration. Such techniques may also be used in residential applications (e.g., by a gathering of people in a home or outside in a yard) or in a public space such as a park.

d. Determine Calibration

At block 1308, implementation 1300 involves determining a calibration. For instance, the first recording device may determine a calibration for the one or more playback devices based on the first response and the second response. In some cases, when applied to playback by the one or more playback devices, the calibration may offset acoustics characteristics of the environment to achieve a given response (e.g., a flat response). For instance, if a given environment attenuates frequencies around 500 Hz and amplifies frequencies around 14000 Hz, a calibration might boost frequencies around 500 Hz and cut frequencies around 14000 Hz so as to offset these environmental effects.

Some examples techniques for determining a calibration are described in U.S. patent application Ser. No. 13/536,493 filed Jun. 28, 2012, entitled “System and Method for Device Playback Calibration,” U.S. patent application Ser. No. 14/216,306 filed Mar. 17, 2014, entitled “Audio Settings Based On Environment,” and U.S. patent application Ser. No. 14/481,511 filed Sep. 9, 2014, entitled “Playback Device Calibration,” which are incorporated herein in their entirety.

The first recording device may determine the calibration by combining the first response and the second response. For instance, the first recording device may average the first response and the second response to yield a response of the given environment as detected by both the first recording device and the second recording device. Then the first recording device may determine a response that offsets certain characteristics of the environment that are represented in the combined response.

As noted above, during the calibration sequence, each of the first recording device and the second recording device may move across respective portions of the environment, the same portions of the environment, or might not move at all. The recording devices might move at different speeds. They might stop and start during the calibration sequence. Such differences in movement may affect the response measured by each recording device. As such, one or more of the responses may be normalized, which may offset some of the differences in the responses caused by the respective movements of the multiple recording devices (or lack thereof). Normalizing the responses may yield responses that more accurately represent the response of the environment as a whole, which may improve a calibration that is based off that response.

As noted above, while the first recording device detects the calibration sounds, its movement relative to the given environment may be detected. Likewise, the movement of the second recording device relative to the given environment may be also detected. To adjust for the respective movements of each recording device during the calibration sequence, the first response may be normalized to the detected movement of the first recording device. Further, the second response may be normalized to the detected movement of the second recording device. Such normalization may offset some or all of the differences in movements that the respective recording devices experienced while detecting the calibration sounds.

More particularly, in some embodiments, the first response and the second response may be normalized to the respective spatial areas covered by the first recording device and the second recording devices. Spatial area covered by a recording device may be determined based on movement data representing the movement of the recording device. For instance, an accelerometer may produce acceleration data and gravity data. By computing the dot product of the acceleration data and gravity data, a recording device may yield a matrix indicating acceleration of the recording device with respect to gravity. Position of the recording device over time (i.e., during the calibration sequence) may be determined by computing the double-integral of the acceleration. From such a data set, the recording device may determine a boundary line indicating the extent of the captured positions within the environment, perhaps by identifying the minimum and maximum horizontal positions for a given vertical height (e.g., arm height) and the minimum and maximum vertical positions for a given horizontal position for each data point. The area covered by the recording device is then the integral of the resulting boundary line.

Given the spatial areas covered by the first recording device and the second recording device can be normalized by weighting the first response and/or the second response according to the respective spatial areas covered by the first and/or second recording devices, respectively. Although one technique has been described by way of example, those having skill in the art will understand that other techniques to determine spatial area covered by a recording device are possible as well, such as using respective propagation delays from one or more playback devices to the recording device.

In some examples, the responses may be normalized according to the spatial distance(s) and angle(s) between the recording device and the playback devices and/or the spatial distance and angle(s) between the recording device and the center of the environment. For instance, in practice, a recording device that is positioned a few feet in front of a playback device may be weighed differently than a recording device that is positioned ten or more feet to the side of the playback device. Differences in angles and/or distance between a playback device and two or more recording devices may be adjusted for using equal-energy normalization. As such, the first device may weigh, as respective portions of the calibration, the first response and the second response according to the respective average angles of the first control device and the second control device from the respective output directions of the one or more playback devices and/or according to the respective average distances of the first control device and the second control device from the one or more playback devices.

The responses may be normalized according to the time duration that each recording device was measuring the response of the environment to the calibration sounds. Within examples, each recording device may start and/or stop detecting the calibration sounds at different times, which may lead to different measurement durations. Where the first recording device detect the calibration sounds for a longer duration than the second recording device, the longer may correspond to more confidence in the response measured by the first recording device. During a longer measurement duration, the first recording device may measure a relatively more samples (e.g., a greater number of frames, each representing a repetition of the calibration sound). As such, the first response (as measured by the first recording device) may be weighed more heavily than the second response (as measured by the second recording device). For instance, each response may be weighted in proportion to the respective measurement duration, or perhaps according to the number of samples or frames, among other examples.

In further aspects, the responses may be normalized according to the variance among measured samples (e.g., frames). Given that each recording device covers roughly similar area per second, samples with less variance may correspond to greater confidence in the measurement. As such a response with relatively less variance among the samples may be weighed more heavily in determining the calibration than a response with relatively more variance.

In one example, the first and the second recording devices may measure first and second samples representing the one or more calibration sounds as measured by the respective devices. The samples may represent respective frames (i.e., a repetition or period of the calibration sound). The first recording device may determine respective average variances between the first samples and between the second samples. The first response and/or the second response may then be normalized according to the ratio between the average variances.

In some cases, the first and second recording devices may have different microphones. Each microphone may have its own characteristics, such that it responds to the calibration sounds in a particular manner. In other words, a given microphone might be more or less sensitive to certain frequencies. To offset these characteristics, a correction curve may be applied to the responses measured by each recording device. Each correction curve may correspond to the microphone of the respective recording device.

Although implementation 1300 has been described with respect to a first and second response to illustrate example techniques, some embodiments may involve additional responses as measured by further recording devices. For instance, two or more second recording devices may measure responses and send those responses to a first recording device for analysis. Yet further, three or more recording devices may measure responses and send those responses to a computing system for analysis. Other examples are possible as well.

e. Send Instruction that Applies Calibration to Playback

At block 1310, implementation 1300 involves sending an instruction that applies a calibration to playback by the one or more playback devices. For instance, the first recording device may send a message that instructs the one or more playback devices to apply the calibration to playback. In operation, when playing back media, the calibration may adjust output of the playback devices.

As noted above, playback devices undergoing calibration may be a member of a zone (e.g., the zones of media playback system 100). Further, such playback devices may be joined into a grouping, such as a bonded zone or zone group and may undergo calibration as the grouping. In such embodiments, the instruction that applies the calibration may be directed to the zones, zone groups, bonded zones, or other configuration into which the playback devices are arranged.

Within examples, a given calibration may be applied by multiple playback devices, such as the playback devices of a bonded zone or zone group. Further, a given calibration may include respective calibrations for multiple playback devices, perhaps adjusted for the types or capabilities of the playback device. Alternatively, a calibration may be applied to an individual playback device. Other examples are possible as well.

In some examples, the calibration or calibration state may be shared among devices of a media playback system using one or more state variables. Some examples techniques involving calibration state variables are described in U.S. patent application Ser. No. 14/793,190 filed Jul. 7, 2015, entitled "Calibration State Variable," and U.S. patent application Ser. No. 14/793,205 filed Jul. 7, 2015, entitled "Calibration Indicator," which are incorporated herein in their entirety.

IV. Second Example Techniques to Facilitate Calibration Using Multiple Devices As discussed above, embodiments described herein may facilitate the calibration of one or more playback devices using multiple recording devices. FIG. 15 illustrates an example implementation 1500 by which a first device measures a response of an environment to one or more calibrations sounds and send the response to a second device for analysis. The second device determines a calibration for one or more playback devices based the response from the first device and perhaps measurement data and/or one or more additional responses from additional devices.

a. Detect Initiation of Calibration Sequence

At block 1502, implementation 1500 involves detecting initiation of a calibration sequence. For instance, a first device (e.g., a recording device such as smartphone 500 shown in FIG. 5), may detect initiation of a calibration sequence to calibrate one or more zones of a media playback system for a given environment. As noted above, such zones may include one or more respective playback devices.

The one or more playback devices may initiate the calibration procedure based on a trigger condition. For instance, a recording device, such as control device 126 of media playback system 100, may detect a trigger condition that causes the recording device to initiate calibration of one or more playback devices (e.g., one or more of playback devices 102-124). Alternatively, a playback device of a media playback system may detect such a trigger condition (and then perhaps relay an indication of that trigger condition to the recording device).

As described above in connection with example calibration procedures, detecting the trigger condition may be performed using various techniques. For instance, detecting the trigger condition may involve detecting input data indicating a selection of a selectable control. For instance, a recording device, such as control device 126, may display an interface (e.g., control interface 400 of FIG. 4), which includes one or more controls that, when selected, initiate calibration of a playback device, or a group of playback devices (e.g., a zone). In other examples, detecting the trigger condition may involve a playback device detecting that the playback device has become uncalibrated or that a new playback device is available in the system, as described above.

A given calibration sequence may calibrate multiple playback channels. A given playback device may include multiple speakers. In some embodiments, these multiple channels may be calibrated individually as respective channels. Alternatively, the multiple speakers of a playback device may be calibrated together as one channel. In further cases, groups of two or more speakers may be calibrated together as respective channels. For instance, some playback devices, such as sound bars intended for use with surround sound systems, may have groupings of speakers designed to operate as respective channels of a surround sound system. Each grouping of speakers may be calibrated together as one playback channel (or each speaker may be calibrated individually as a separate channel).

As indicated above, detecting the trigger condition may involve detecting a trigger condition that initiates calibration of a particular zone. As noted above in connection with the example operating environment, playback devices of a media playback system may be joined into a zone in which the playback devices of that zone operate jointly in carrying out playback functions. For instance, two playback devices may be joined into a bonded zone as respective channels of a stereo pair. Alternatively, multiple playback devices may be joined into a zone as respective channels of a surround sound system. Some example trigger conditions may initiate a calibration procedure that involves calibrating the playback devices of a zone. As noted above, within various implementations, a playback device with multiple speakers may be treated as a mono playback channel or each speaker may be treated as its own channel, among other examples.

In further embodiments, detecting the trigger condition may involve detecting a trigger condition that initiates calibration of a particular zone group. Two or more zones, each including one or more respective playback devices, may be joined into a zone group of playback devices that are configured to play back media in synchrony. In some cases, a trigger condition may initiate calibration of a given device that is part of such a zone group, which may initiate calibration of the playback devices of the zone group (including the given device).

Various types of trigger conditions may initiate the calibration of the multiple playback devices. In some embodiments, detecting the trigger condition involves detecting input data indicating a selection of a selectable control. For instance, a control device, such as control device 126, may display an interface (e.g., control interface 600 of FIG. 6), which includes one or more controls that, when selected, initiate calibration of a playback device, or a group of playback devices (e.g., a zone). Alternatively, detecting the trigger condition may involve a playback device detecting that the playback device has become uncalibrated, which might be caused by moving the playback device to a different position or location within the calibration environment. For instance, an example trigger condition might be that a physical movement of one or more of the plurality of playback devices has exceeded a threshold magnitude. In further examples, detecting the trigger condition may involve a device (e.g., a control device or playback device) detecting a change in configuration of the media playback system, such as a new playback device being added to the system. Other examples are possible as well.

b. Detect Input Indicating Instruction to Include First Device in Calibration Sequence At block 1504, implementation 1500 involves detecting input indicating an instruction to include the first device in the calibration sequence. For instance, the first device (e.g., smartphone 500) may display an interface that prompts to include or exclude the first device from the calibration sequence. Within examples, by inclusion in the calibration sequence, the first device is caused to measure the response of the environment to one or more calibration sounds.

Figure 16:
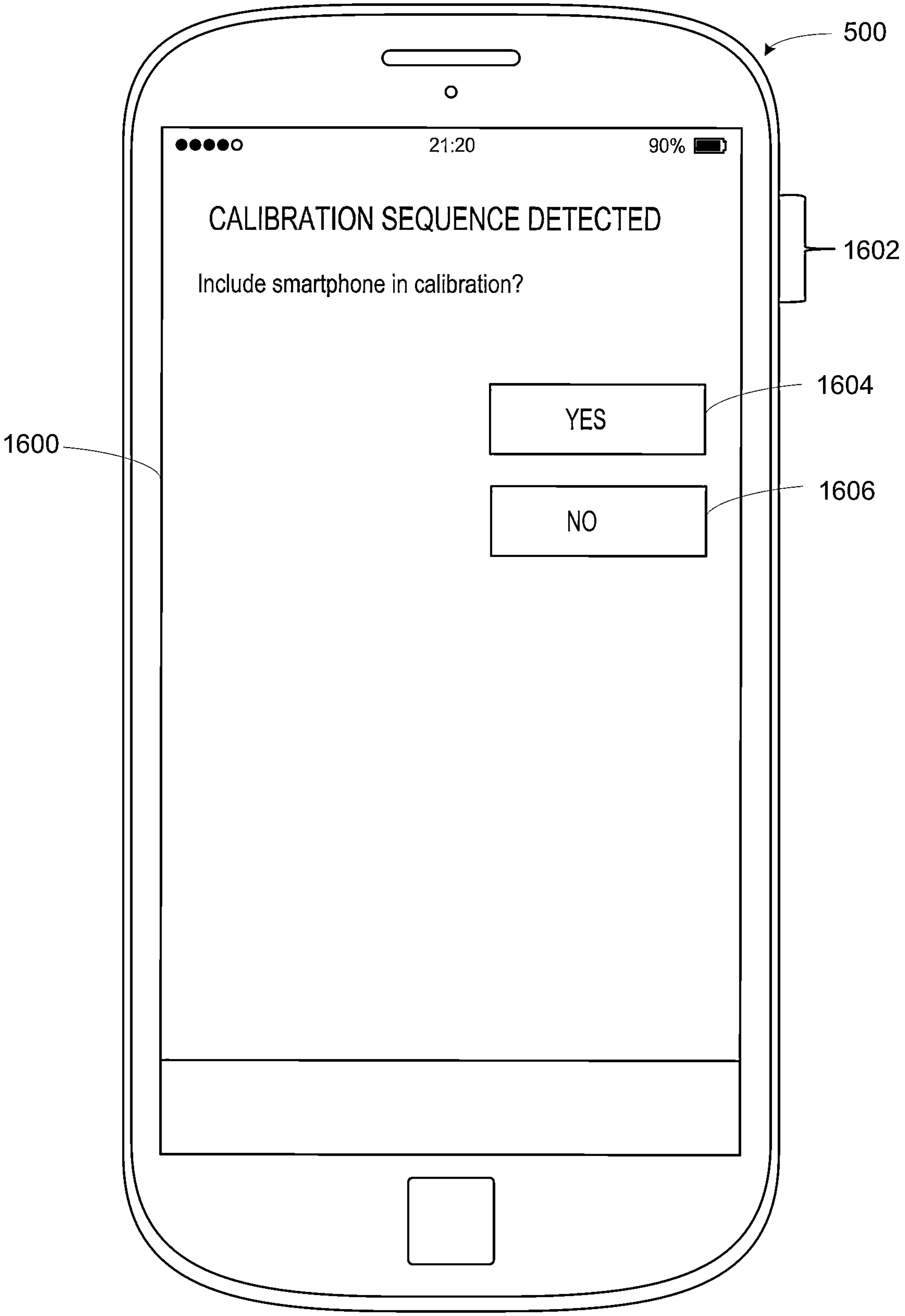
FIG. 16 shows a smartphone that is displaying an example control interface, according to an example implementation.

To illustrate such an interface, FIG. 16 shows smartphone 500 which is displaying an example control interface 1600. Control interface 1600 includes a graphical region 1602 that indicates that a calibration sequence was detected. Such a control interface may also indicate that the calibration sequence was initiated by a particular device (e.g., another smartphone or other device). Yet further, the control interface may indicate that the calibration sequence is for calibration of one or more particular playback devices (e.g., one or more particular zones or zone groups).

In some cases, smartphone 500 may detect input indicating an instruction to include the first device in the calibration sequence by detecting selection of selectable control 1604. Selection of selectable control 1604 may indicate an instruction to include smartphone 500 in the detected calibration sequence. Conversely, selection of selectable control 1606 may indicate an instruction to exclude smartphone 500 in the detected calibration sequence.

As noted above, in some examples, a first device, such as smartphone 500, may initiate the calibration sequence. In such cases, the first device may detect input indicating an instruction to include the first device in the calibration sequence by detecting input indicating an instruction to initiate the calibration sequence. For instance, referring back to FIG. 6, smartphone 500 may detect selection of selectable control 604. As noted above, when selected, selectable control 604 may initiate a calibration procedure.

c. Send Message(s) Indicating that the First Device is Included in the Calibration Sequence Referring again to FIG. 15, at block 1506, implementation 1500 involves sending one or more messages indicating that the first device is included in the calibration sequence. By sending such messages, the first device may notify other devices of the media playback system that the first device will participate in the calibration sequence, which may facilitate the first playback coordinating with these devices. Such devices of the media playback system may include the one or more of playback devices under calibration, other recording devices, and/or a processing device, among other examples. The first device may send such messages via a communications interface, such as a network interface.

d. Detect Calibration Sounds

In FIG. 15, at block 1508, implementation 1500 involves detecting the one or more calibration sounds. For instance, the first device may detect, via a microphone, at least a portion of the one or more calibration sounds as emitted by the one or more playback devices during the calibration sequence. The first device may detect the calibration sounds using any of the techniques described above with respect to block 1302 of implementation 1300, as well as any other suitable technique.

e. Determine Response

In FIG. 15, at block 1506, implementation 1500 involves determining a response. For instance, the first device may determine a response of the given environment to the one or more calibration sounds as detected by the first control device. The first device may measure a response using any of the techniques described above with respect to block 1304 of implementation 1300.

Determining the response may involve normalization of the response. As described above in connection with block 1308 of implementation 1300, a response may be normalized according to a variety of factors. For instance, a response may be normalized according to movement of the recording device while measuring the response (e.g., according to spatial area covered or according to distance and/or angle relative to the playback device(s) and/or the environment). Other factors may include duration of measurement time or variation among measured samples, among other examples. A response may be adjusted according to the type of microphone used to measure the response. Other examples are possible as well.

f. Send Response to Second Device

In FIG. 15, at block 1510, implementation 1500 involves sending the response to the second device. For instance, the first device may send the response to a processing device via a network interface. In some cases, the processing device may be a control device or a playback device of the media playback system. Alternatively, the processing device may be a server (e.g., a server that is providing a cloud service to the media playback system). Other examples are possible as well. As will be described below, a processing device may receive multiple responses and/or measurement data and determine a calibration for the one or more playback devices based on such measurement information.

V. Third Example Techniques to Facilitate Calibration Using Multiple Devices

As noted above, embodiments described herein may facilitate the calibration of one or more playback devices using multiple recording devices. FIG. 17 illustrates an example implementation 1700 by which a processing device determines a calibration based on response data from multiple recording devices.

a. Receive Response Data

At block 1702, implementation 1700 involves receiving response data. For instance, a processing device may receive first response data from a first recording device and second response data from second recording device. The processing device may receive the response data via a network interface. The first response data and the second response data may represent responses of a given environment to a calibration sound emitted by one or more playback devices as measured by the first recording device and the second recording device, respectively. Example calibration sounds are described above. While first response data and second response data are described by way of example, the processing device may receive response data measured by any number of recording devices.

The processing device may be implemented in various devices. In some cases, the processing device may be a control device or a playback device of the media playback system. Such a device may operate also as a recording device. Alternatively, the processing device may be a server (e.g., a server that is providing a cloud service to the media playback system via the Internet). Other examples are possible as well.

The processing device may receive the response data after the one or more playback devices begin output of the calibration sound. In some implementations, the recording devices may send samples (e.g., frames) during the calibration sequence (i.e., while the one or more playback devices are emitting the calibration sound(s)). As noted above, some calibration sounds may repeat and recording devices may detect multiple iterations of the calibration sound as frames of data. Each frame may represent a response. Given that a recording device is moving, each frame may represent a response in a given location within the environment. In some cases, the recording device may combine frames (e.g., by averaging) before sending such response data to the processing device. Alternatively, recording devices may stream the response data to the processing device (e.g., as respective frames or in groups of frames). In other cases, the recording devices may send the response data after the playback devices finish outputting calibration sound(s) or after the recording devices finish recording (which may or may not be at the same time).

b. Normalize Response Data

Referring still to FIG. 17, at block 1704, implementation 1700 involves normalizing the response data. For instance, the processing device may normalize the first response data relative to at least the second response data and the second response data relative to at least the first response data. In some cases, normalization might not be necessary, perhaps as the response data is normalized by the recording device.

As described above in connection with block 1308 of implementation 1300, a response may be normalized according to a variety of factors. For instance, a response may be normalized according to movement of the recording device while measuring the response (e.g., according to spatial area covered or according to distance and/or angle relative to the playback device(s) and/or the environment). Other factors may include duration of measurement time or variation among measured samples, among other examples. A response may be adjusted according to the type of microphone used to measure the response. Other examples are possible as well.

c. Determine Calibration

Referring still to FIG. 17, at block 1706, implementation 1700 involves determining a calibration. For example, the processing device may determine a calibration for the one or more playback devices. When applied to playback by the one or more playback devices, such a calibration may offset certain acoustic characteristics of the environment. Examples techniques to determine a calibration are described with respect to block 1308 of implementation 1300.

d. Send Instruction that Applies Calibration to Playback

At block 1708, implementation 1700 involves sending an instruction that applies the calibration to playback by the one or more playback devices. For instance, the processing device may send a message via a network interface that instructs the one or more playback devices to apply the calibration to playback. In operation, when playing back media, the calibration may adjust output of the playback devices. Examples of such instructions are described in connection with block 1310 of implementation 1300.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A processor configured for: detecting, via a microphone, first data including at least a portion of one or more calibration sounds emitted by one or more playback devices of one or more zones during a calibration sequence; determining a first response representing a response of a given environment to the one or more calibration sounds as detected by the first control device; receiving second data indicating a second response representing a response of the given environment to the one or more calibration sounds as detected by a second control device; determining a calibration for the one or more playback devices based on the first and second responses; and sending, to at least one of the one or more zones, an instruction to apply the determined calibration to playback by the one or more playback devices.

(Feature 2) The processor of feature 1, further configured for: detecting first movement data indicating movement of the first control device relative to the given environment during the calibration sequence; and receiving second movement data indicating movement of the second control device relative to the given environment during the calibration sequence; and wherein determining the calibration comprises normalizing the first and second responses to the movements of the first and second control devices, respectively.

(Feature 3) The processor of feature 2, wherein: the processor is further configured for determining, based on the first and second movement data, first and second spatial areas, respectively, of the given environment in which the respective first and second control devices were moved during the calibration sequence, and normalizing the first and second responses comprises weighing, as respective portions of the calibration, the first and second responses according to the first and second spatial areas, respectively.

(Feature 4) The processor of feature 2, wherein: the processor is further configured for determining, based on the first and second movement data, first and second average distances between the respective first and second control devices and one or more playback devices, and normalizing the first and second responses comprises weighing, as respective portions of the calibration, the first and second responses according to the respective first and second average distances.

(Feature 5) The processor of feature 2, wherein: the processor is further configured for determining, based on the first and second movement data, respective first and second average angles between the first and second control devices and a respective output direction in which the one or more playback devices output the one or more calibration sounds; and normalizing the first and second responses comprises weighing, as respective portions of the calibration, the first and second responses to the respective first and second average angles.

(Feature 6) The processor of any preceding feature, wherein the processor is further configured for determining a first and a second duration of time over which the first and second data, respectively, were obtained; and determining the calibration comprises: normalizing the first response according to the ratio of the first duration of time to the second duration of time and normalizing the second response according to the ratio of the second duration of time relative to the first duration of time.

(Feature 7) The processor of any preceding feature, wherein: detecting the first data comprises detecting first samples representing the one or more calibration sounds as detected by first control device; receiving the second data comprises receiving second samples representing the one or more calibration sounds as detected by second control device; the processor is further configured for determining first and second average variances of the first and second samples, respectively; and determining the calibration comprises: normalizing the first response according to a ratio of the first average variance to the second average variance and normalizing the second response according to a ratio of the second average variance to the first average variance.

(Feature 8) A processor configured for: detecting initiation of a calibration sequence to calibrate one or more zones of a media playback system for a given environment, wherein the one or more zones include one or more playback devices; detecting, via a user interface, an input indicating an instruction to include a first network device that comprises the processor in the calibration sequence; sending, to a second network device, a message indicating that the first network device is included in the calibration sequence; detecting, via a microphone, data including at least a portion of one or more calibration sounds as emitted by the one or more playback devices during the calibration sequence; determining a response of a given environment to the one or more calibration sounds as detected by the first control device based on the detected data; and sending the determined response to the second network device.

(Feature 9) The processor of feature 8, wherein: the processor is further configured for, during the calibration sequence, detecting movement of the first network device relative to the given environment, and determining the response comprises normalizing the response to the detected movement.

(Feature 10) The processor of feature 8, further configured for: receiving sensor data indicating movement of the first network device relative to the given environment during the calibration sequence; determining, based on the received sensor data, that the movement of the first network device during the calibration sequence covered a given spatial area of the given environment, and sending, to the second network device, a message indicating the given spatial area.

(Feature 11) The processor of feature 8, further configured for: determining respective distances of the first network device to the one or more playback devices during the calibration sequence based on the detected data; and sending, to the second network device, a message indicating the determined respective distances.

(Feature 12) The processor of feature 8, further configured for: receiving sensor data indicating movement of the first network device relative to the given environment during the calibration sequence; determining respective average angles between the first network device and respective output directions of the one or more calibration sounds output by the one or more playback devices based on the received sensor data; and sending, to the second network device, a message indicating the determined respective average angles.

(Feature 13) The processor of feature 8, further configured for: determining a given duration of time over which the first network device detected the data, and sending, to the second network device, a message indicating the given duration of time.

(Feature 14) The processor of feature 8, wherein: detecting the data comprises detecting samples representing the one or more calibration sounds as detected by first network device; and the processor is further configured for: determining an average variance of the detected samples; and sending, to the second network device, a message indicating the determined average variance.

(Feature 15) The processor of feature 8, wherein determining the response comprises offsetting acoustic characteristics of a particular type of microphone comprised by the first network device by applying, to the response, a correction curve that corresponds to the particular type of microphone.

(Feature 16) A system comprising a first control device comprising the processor of one of claims 1 to 7 and a second control device comprising the processor of one of claims 8 to 15.

(Feature 17) The system of feature 16, further comprising at least one playback device, wherein the playback device is configured to output audio data calibrated according to the determined calibration.

(Feature 18) A method comprising: receiving, from first and second control devices, respective first and second response data representing a response of a given environment to a calibration sound output by one or more playback devices of a media playback system during a calibration sequence as detected by the respective first and second control devices; and normalizing the first response data relative to at least the second response data and the second response data relative to at least the first response data; based on the normalized first and second response data, determining a calibration that offsets acoustic characteristics of the given environment when applied to playback by the one or more playback devices; and sending, to the zone, an instruction that applies the determined calibration to playback by the one or more playback devices.

(Feature 19) The method of feature 18, further comprising: receiving data indicating that the first and second control devices moved across first and second spatial areas, respectively, of the given environment during the calibration sequence, wherein normalizing the first and second response data comprises weighing, as respective portions of the calibration, the first and second response data according to a ratio between the first and second spatial areas.

(Feature 20) The method of feature 18, further comprising: determining that the first response data and the second response data indicate a first sound intensity and a second sound intensity, respectively, of the one or more calibration sounds as detected by the respective first and second control devices, wherein normalizing the first and second response data comprises weighing, as respective portions of the calibration, the first response data and the second response data according to a ratio between first sound intensity and the second sound intensity.

(Feature 21) The method of feature 18, further comprising: receiving data indicating that the first and second control devices detected the one or more calibration sounds for a first and a second duration of time, respectively, wherein normalizing the first and second response data comprises weighing, as respective portions of the calibration, the first response data and the second response data according to a ratio between the first and second durations of time.

(Feature 22) The method of feature 18, wherein: the first and second response data comprise first and second samples, respectively, representing the one or more calibration sounds as detected by the respective first and second control devices, normalizing the first and second response data comprises weighing, as respective portions of the calibration, the first and second response data according to a ratio between an average variance of the first samples and an average variance of the second samples.

(Feature 23) The method of feature 18, wherein: the first and second control devices comprise a first and a second type of microphone, respectively, normalizing the first and second response data comprises applying first and second correction curves to the first and second response data, respectively, to offset acoustic characteristics of the respective first and second type of microphone.

(Feature 24) The method of one of features 18 to 23, further comprising outputting, by at least one of the plurality of playback devices, audio data calibrated according to the determined calibration.

Example techniques may involve room calibration with multiple recording devices. A first implementation may include detecting, via a microphone, at least a portion of one or more calibration sounds as emitted by one or more playback devices of one or more zones during a calibration sequence. The implementation may further include determining a first response, the first response representing a response of a given environment to the one or more calibration sounds as detected by the first control device and receiving data indicating a second response, the second response representing a response of the given environment to the one or more calibration sounds as detected by a second control device. The implementation may also include determining a calibration for the one or more playback devices based on the first response and the second response and sending, to at least one of the one or more zones, an instruction that applies the determined calibration to playback by the one or more playback devices.

A second implementation may include detecting initiation of a calibration sequence to calibrate one or more zones of a media playback system for a given environment, the one or more zones including one or more playback devices. The implementation may also include detecting, via a user interface, input indicating an instruction to include the first network device in the calibration sequence and sending, to a second network device, a message indicating that the first network device is included in the calibration sequence. The implementation may further include detecting, via a microphone, at least a portion of one or more calibration sounds as emitted by the one or more playback devices during the calibration sequence. The implementation may include detecting, via a microphone, at least a portion of one or more calibration sounds as emitted by the one or more playback devices during the calibration sequence and sending the determined response to the second network device.

A third implementation includes receiving first response data from a first control device and second response data from a second control device after one or more playback devices of a media playback system begin output of a calibration sound during a calibration sequence, the first response data representing a response of a given environment to the calibration sound as detected by the first control device and the second response data representing a response of the given environment to the calibration sound as detected by the second control device. The implementation also includes normalizing the first response data relative to at least the second response data and the second response data relative to at least the first response data. The implementation further includes determining a calibration that offsets acoustic characteristics of the given environment when applied to playback by the one or more playback devices based on the normalized first response data and the normalized second response data. The implementation may also include sending, to the zone, an instruction that applies the determined calibration to playback by the one or more playback devices.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A system comprising:

a first playback device comprising at least one first audio transducer;

a second playback device comprising a first network interface, at least one second audio transducer and at least one microphone;

a control device comprising a second network interface;

at least one processor; and at least one non-transitory computer-readable medium comprising program instructions that are executable by the at least one processor such that the system is configured to:

play back calibration audio via the at least one first audio transducer of the first playback device in a listening environment;

capture, via the at least one microphone of the second playback device, audio data representing at least a portion of the calibration audio played back via the at least one first audio transducer of the first playback device;

send, via the first network interface to the control device, data representing the captured audio;

determine, via the control device, a calibration that, when applied to playback by the first playback device, at least partially offsets acoustic characteristics of the listening environment as represented in the captured audio data; and cause, via the second network interface, the first playback device to apply the determined calibration.

2. The system of claim 1, further comprising a third playback device comprising at least one third audio transducer and at least one additional microphone, wherein the at least one non-transitory computer-readable medium further comprises program instructions that are executable by the at least one processor such that the system is configured to:

capture, via the at least one additional microphone of the third playback device, additional audio data representing at least an additional portion of the calibration audio played back via the at least one first audio transducer of the first playback device, wherein the program instructions that are executable by the at least one processor such that the system is configured to determine the calibration comprise program instructions that are executable by the at least one processor such that the system is configured to:

determine the calibration to at least partially offset the acoustic characteristics of the listening environment as represented in the audio data and the captured additional audio data.

3. The system of claim 2, wherein the at least one non-transitory computer-readable medium further comprises program instructions that are executable by the at least one processor such that the system is configured to:

normalize the additional audio data to offset one or more differences in capture of the additional audio data as compared with capture of the audio data.

4. The system of claim 1, wherein the at least one processor comprises a first processor, a second processor, and a third processor, wherein the first playback device comprises the first processor, the second playback device comprises the second processor, and the control device comprises the third processor, and wherein the program instructions that are executable by the at least one processor such that the system is configured to determine the calibration comprise program instructions that are executable by the at least one processor such that the system is configured to:

determine, via the third processor of the control device, the calibration.

5. The system of claim 1, wherein the first network interface comprises an IEEE 802.15-compatible wireless network interface, and wherein the program instructions that are executable by the at least one processor such that the system is configured to send, via the first network interface to the control device, the data representing the captured audio comprise program instructions that are executable by the at least one processor such that the system is configured to:

send, via the IEEE 802.15-compatible wireless network interface to the control device, data representing the captured audio.

6. The system of claim 1, wherein the second playback device is a wireless headphone.

7. The system of claim 1, wherein the at least one non-transitory computer-readable medium further comprises program instructions that are executable by the at least one processor such that the system is configured to:

form a synchrony group including the first playback device and the second playback device.

8. The system of claim 1, wherein the program instructions that are executable by the at least one processor such that the system is configured to play back calibration audio via the at least one first audio transducer of the first playback device in the listening environment comprise program instructions that are executable by the at least one processor such that the system is configured to:

play back calibration audio via the at least one first audio transducer of the first playback device in the listening environment in synchrony with one or more additional playback devices that are configured in a bonded room configuration with the first playback device, and wherein the at least one non-transitory computer-readable medium further comprises program instructions that are executable by the at least one processor such that the system is configured to:

determine one or more additional calibrations that, when applied to playback by the one or more additional playback devices, at least partially offsets acoustic characteristics of the listening environment as represented in the captured audio data.

9. The system of claim 1, wherein the at least one non-transitory computer-readable medium further comprises program instructions that are executable by the at least one processor such that the system is configured to:

detect a trigger condition that triggers calibration of the first playback device; and based on detection of the trigger condition, cause the first playback device to output the calibration audio and the second playback device to capture the audio data.

10. The system of claim 9, wherein the program instructions that are executable by the at least one processor such that the system is configured to detect the trigger condition that triggers calibration of the first playback device comprise program instructions that are executable by the at least one processor such that the system is configured to:

detect that a previous calibration is no longer valid.

11. At least one non-transitory computer-readable medium comprising program instructions that are executable by at least one processor such that a system is configured to:

play back calibration audio via at least one first audio transducer of a first playback device in a listening environment, wherein the first playback device comprises the at least one first audio transducer;

capture, via at least one microphone of a second playback device, audio data representing at least a portion of the calibration audio played back via the at least one first audio transducer of the first playback device, wherein the second playback device comprises a first network interface, at least one second audio transducer, and the at least one microphone;

send, via the first network interface to a control device, data representing the captured audio, wherein the control device comprises a second network interface;

determine, via the control device, a calibration that, when applied to playback by the first playback device, at least partially offsets acoustic characteristics of the listening environment as represented in the captured audio data; and cause, via the second network interface, the first playback device to apply the determined calibration.

12. The at least one non-transitory computer-readable medium of claim 11, further comprising a third playback device comprising at least one third audio transducer and at least one additional microphone, wherein the at least one non-transitory computer-readable medium further comprises program instructions that are executable by the at least one processor such that the system is configured to:

capture, via the at least one additional microphone of the third playback device, additional audio data representing at least an additional portion of the calibration audio played back via the at least one first audio transducer of the first playback device, wherein the program instructions that are executable by the at least one processor such that the system is configured to determine the calibration comprise program instructions that are executable by the at least one processor such that the system is configured to:

determine the calibration to at least partially offset the acoustic characteristics of the listening environment as represented in the audio data and the captured additional audio data.

13. The at least one non-transitory computer-readable medium of claim 12, wherein the at least one non-transitory computer-readable medium further comprises program instructions that are executable by the at least one processor such that the system is configured to:

normalize the additional audio data to offset one or more differences in capture of the additional audio data as compared with capture of the audio data.

14. The at least one non-transitory computer-readable medium of claim 11, wherein the at least one processor comprises a first processor, a second processor, and a third processor, wherein the first playback device comprises the first processor, the second playback device comprises the second processor, and the control device comprises the third processor, and wherein the program instructions that are executable by the at least one processor such that the system is configured to determine the calibration comprise program instructions that are executable by the at least one processor such that the system is configured to:

determine, via the third processor of the control device, the calibration.

15. The at least one non-transitory computer-readable medium of claim 11, wherein the first network interface comprises an IEEE 802.15-compatible wireless network interface, and wherein the program instructions that are executable by the at least one processor such that the system is configured to send, via the first network interface to the control device, the data representing the captured audio comprise program instructions that are executable by the at least one processor such that the system is configured to:

send, via the IEEE 802.15-compatible wireless network interface to the control device, data representing the captured audio.

16. The at least one non-transitory computer-readable medium of claim 11, wherein the second playback device is a wireless headphone.

17. The at least one non-transitory computer-readable medium of claim 11, wherein the program instructions that are executable by the at least one processor such that the system is configured to play back calibration audio via the at least one first audio transducer of the first playback device in the listening environment comprise program instructions that are executable by the at least one processor such that the system is configured to:

play back calibration audio via the at least one first audio transducer of the first playback device in the listening environment in synchrony with one or more additional playback devices that are configured in a bonded room configuration with the first playback device, and wherein the at least one non-transitory computer-readable medium further comprises program instructions that are executable by the at least one processor such that the system is configured to:

determine one or more additional calibrations that, when applied to playback by the one or more additional playback devices, at least partially offsets acoustic characteristics of the listening environment as represented in the captured audio data.

18. The at least one non-transitory computer-readable medium of claim 11, wherein the at least one non-transitory computer-readable medium further comprises program instructions that are executable by the at least one processor such that the system is configured to:

detect a trigger condition that triggers calibration of the first playback device; and based on detection of the trigger condition, cause the first playback device to output the calibration audio and the second playback device to capture the audio data.

19. The at least one non-transitory computer-readable medium of claim 18, wherein the program instructions that are executable by the at least one processor such that the system is configured to detect the trigger condition that triggers calibration of the first playback device comprise program instructions that are executable by the at least one processor such that the system is configured to:

detect that a previous calibration is no longer valid.

20. A method comprising:

playing back calibration audio via at least one first audio transducer of a first playback device in a listening environment, wherein the first playback device comprises the at least one first audio transducer;

capturing, via at least one microphone of a second playback device, audio data representing at least a portion of the calibration audio played back via the at least one first audio transducer of the first playback device, wherein the second playback device comprises a first network interface, at least one second audio transducer, and the at least one microphone;

sending, via the first network interface to a control device, data representing the captured audio, wherein the control device comprises a second network interface;

determining, via the control device, a calibration that, when applied to playback by the first playback device, at least partially offsets acoustic characteristics of the listening environment as represented in the captured audio data; and causing, via the second network interface, the first playback device to apply the determined calibration.

* * * * *